(12) United States Patent
Kubo

(10) Patent No.: US 7,499,136 B2
(45) Date of Patent: Mar. 3, 2009

(54) LIQUID CRYSTAL DISPLAY DEVICE

(75) Inventor: Masumi Kubo, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 562 days.

(21) Appl. No.: 11/114,022

(22) Filed: Apr. 26, 2005

(65) Prior Publication Data

US 2005/0237463 A1   Oct. 27, 2005

(30) Foreign Application Priority Data

Apr. 26, 2004   (JP)   .............................. 2004-129248

(51) Int. Cl.
*G02F 1/1343* (2006.01)
(52) U.S. Cl. .................. 349/139; 349/130; 349/138
(58) Field of Classification Search ................. 349/139, 349/123, 129, 130, 138, 106
See application file for complete search history.

(56) References Cited

U.S. PATENT DOCUMENTS

| | | | |
|---|---|---|---|
| 4,368,523 A | 1/1983 | Kawate | |
| 4,437,731 A | 3/1984 | Sudo et al. | |
| 4,955,698 A | 9/1990 | Knoll et al. | |
| 5,132,819 A | 7/1992 | Noriyama et al. | |
| 5,164,851 A | 11/1992 | Kanemori et al. | |
| 5,179,456 A | 1/1993 | Aizawa et al. | |
| 5,182,664 A | 1/1993 | Clerc | |
| 5,245,450 A | 9/1993 | Ukai et al. | |
| 5,260,818 A | 11/1993 | Wu | |
| 5,289,174 A | 2/1994 | Suzuki | |
| 5,309,264 A | 5/1994 | Lien et al. | |
| 5,331,447 A | 7/1994 | Someya et al. | |
| 5,363,294 A | 11/1994 | Yamamoto et al. | |
| 5,408,345 A | 4/1995 | Mitsui et al. | |
| 5,414,547 A | 5/1995 | Matsuo et al. | |
| 5,434,687 A | 7/1995 | Kawata et al. | |
| 5,477,358 A | 12/1995 | Rosenblatt et al. | |
| 5,512,336 A | 4/1996 | Yamahara | |

(Continued)

FOREIGN PATENT DOCUMENTS

EP   0 884 626 A2   12/1998

(Continued)

OTHER PUBLICATIONS

Thomson-CSFILR, Jan. 2000, "Optical Compensation for Displays" (2 paqges).

(Continued)

*Primary Examiner*—Thoi V Duong
(74) *Attorney, Agent, or Firm*—Nixon & Vanderhye P.C.

(57) ABSTRACT

The LCD of the present invention includes a first substrate, a second substrate, and a vertical alignment type liquid crystal layer provided therebetween. In each picture element region, a first electrode provided on the first substrate on the side of the liquid crystal layer has a solid portion formed of a conductive film and a non-solid portion with no conductive film provided. The liquid crystal layer has an orientation regulated by an inclined electric field produced above the non-solid portion of the first electrode when a voltage is applied. A portion of the liquid crystal layer above the solid portion includes a first region having a first thickness $d_1$ and a second region having a second thickness $d_2$ smaller than the first thickness $d_1$ and located near the non-solid portion.

49 Claims, 27 Drawing Sheets

U.S. PATENT DOCUMENTS

| | | |
|---|---|---|
| 5,558,927 A | 9/1996 | Aruga et al. |
| 5,594,570 A | 1/1997 | Hirata et al. |
| 5,602,662 A | 2/1997 | Rosenblatt et al. |
| 5,608,556 A | 3/1997 | Koma |
| 5,636,043 A | 6/1997 | Uemura et al. |
| 5,646,702 A | 7/1997 | Akinwande et al. |
| 5,666,179 A | 9/1997 | Koma |
| 5,668,651 A | 9/1997 | Yamada et al. |
| 5,673,092 A | 9/1997 | Horie et al. |
| 5,699,137 A | 12/1997 | Kishimoto |
| 5,726,728 A | 3/1998 | Kondo et al. |
| 5,745,197 A | 4/1998 | Leung et al. |
| 5,748,276 A | 5/1998 | Uno et al. |
| 5,753,093 A | 5/1998 | Raguse et al. |
| 5,771,084 A | 6/1998 | Fujimori et al. |
| 5,995,176 A | 11/1999 | Sibahara |
| 6,061,117 A | 5/2000 | Horie et al. |
| 6,097,464 A | 8/2000 | Liu |
| 6,141,077 A | 10/2000 | Hirata et al. |
| 6,169,593 B1 | 1/2001 | Kanaya et al. |
| 6,175,398 B1 | 1/2001 | Yamada et al. |
| 6,195,140 B1 | 2/2001 | Kubo et al. |
| 6,201,592 B1 | 3/2001 | Terashita et al. |
| 6,222,599 B1 | 4/2001 | Yoshida et al. |
| 6,246,453 B1 | 6/2001 | Zhang et al. |
| 6,256,082 B1 | 7/2001 | Suzuki et al. |
| 6,266,122 B1 | 7/2001 | Kishimoto et al. |
| 6,285,431 B2 * | 9/2001 | Lyu et al. .................... 349/143 |
| 6,287,649 B1 | 9/2001 | Fukushima et al. |
| 6,330,047 B1 | 12/2001 | Kubo et al. |
| 6,335,780 B1 | 1/2002 | Kurihara et al. |
| 6,339,462 B1 | 1/2002 | Kishimoto et al. |
| 6,340,998 B1 | 1/2002 | Kim et al. |
| 6,341,002 B1 | 1/2002 | Shimizu et al. |
| 6,342,938 B1 | 1/2002 | Song et al. |
| 6,384,887 B1 | 5/2002 | Yasuda et al. |
| 6,384,889 B1 | 5/2002 | Miyachi et al. |
| 6,504,592 B1 | 1/2003 | Takatori et al. |
| 6,512,564 B1 | 1/2003 | Yoshida et al. |
| 6,542,212 B2 | 4/2003 | Yoshida et al. |
| 6,567,144 B1 * | 5/2003 | Kim et al. .................... 349/128 |
| 6,573,964 B1 | 6/2003 | Takizawa et al. |
| 6,573,965 B1 | 6/2003 | Liu et al. |
| 6,577,366 B1 | 6/2003 | Kim et al. |
| 6,593,982 B2 | 7/2003 | Yoon et al. |
| 6,600,539 B2 | 7/2003 | Song |
| 6,614,497 B2 | 9/2003 | Yamada |
| 6,630,975 B1 | 10/2003 | Terashita |
| 6,657,695 B1 | 12/2003 | Song et al. |
| 6,661,488 B1 | 12/2003 | Takeda et al. |
| 6,710,825 B2 | 3/2004 | Kubo et al. |
| 6,788,375 B2 | 9/2004 | Ogishima et al. |
| 6,812,986 B2 | 11/2004 | Takatori et al. |
| 6,822,723 B2 | 11/2004 | Song et al. |
| 6,862,062 B2 | 3/2005 | Kubo et al. |
| 6,924,856 B2 | 8/2005 | Okumura et al. |
| 6,924,876 B2 | 8/2005 | Kubo et al. |
| 6,950,160 B2 | 9/2005 | Kubo et al. |
| 6,965,422 B2 | 11/2005 | Kubo et al. |
| 2001/0024257 A1 | 9/2001 | Kubo et al. |
| 2001/0040546 A1 | 11/2001 | Ohmuro et al. |
| 2002/0036740 A1 | 3/2002 | Kubo et al. |
| 2002/0036744 A1 | 3/2002 | Kubo et al. |
| 2002/0060764 A1 | 5/2002 | Taniguchi et al. |
| 2002/0063834 A1 | 5/2002 | Sawasaki et al. |
| 2002/0075436 A1 | 6/2002 | Kubo et al. |
| 2002/0149728 A1 | 10/2002 | Kubo et al. |
| 2002/0159012 A1 | 10/2002 | Yamada |
| 2002/0171792 A1 | 11/2002 | Kubota et al. |
| 2003/0107695 A1 | 6/2003 | Kubo et al. |
| 2004/0041770 A1 | 3/2004 | Kubo et al. |
| 2004/0169777 A1 | 9/2004 | Tanaka et al. |
| 2004/0201810 A1 | 10/2004 | Kubo et al. |
| 2005/0001947 A1 | 1/2005 | Ogishima et al. |
| 2005/0001964 A1 | 1/2005 | Kubo et al. |
| 2005/0140876 A1 | 6/2005 | Kubo |
| 2005/0168674 A1 | 8/2005 | Kubo |
| 2005/0174528 A1 | 8/2005 | Kubo et al. |

FOREIGN PATENT DOCUMENTS

| | | |
|---|---|---|
| JP | 03-209440 | 9/1991 |
| JP | 04-139402 | 5/1992 |
| JP | 04-293018 | 10/1992 |
| JP | 04-318816 | 11/1992 |
| JP | 05-289108 | 11/1993 |
| JP | 06-043461 | 2/1994 |
| JP | 6-75238 A | 3/1994 |
| JP | 06-118909 | 4/1994 |
| JP | 06-258649 | 9/1994 |
| JP | 6-301036 A | 10/1994 |
| JP | 07-013164 | 1/1995 |
| JP | 07-036058 | 2/1995 |
| JP | 07-234400 | 9/1995 |
| JP | 07-281176 | 10/1995 |
| JP | 07-311383 | 11/1995 |
| JP | 08-292423 | 11/1996 |
| JP | 09-211445 | 8/1997 |
| JP | 09-258266 | 10/1997 |
| JP | 09-269509 | 10/1997 |
| JP | 10-186330 | 7/1998 |
| JP | 10-301114 A | 11/1998 |
| JP | 11-109417 A | 4/1999 |
| JP | 11-242225 | 9/1999 |
| JP | 2000-47217 A | 2/2000 |
| JP | 2000-47253 | 2/2000 |
| JP | 2000-075296 | 3/2000 |
| JP | 2000-305110 | 11/2000 |
| JP | 2001-343647 A | 12/2001 |
| JP | 2002-055343 A | 2/2002 |
| KR | 1999-0048949 | 7/1999 |
| WO | 00/22677 | 4/2000 |

OTHER PUBLICATIONS

Jisaki et al, "Development of transflective LCD for high contrast and wide viewing angle by using homeotropic alignment", Asia Display/IDW '01, pp. 133-136.

Jignesh Gandhi et al., "Performance Enhancement of refletive CMOS Twistes Nematic Disp Projection Applications Using Compensating Films", pp. 1-6, reprinted from http://www/hanoah.com/publications/sid99 paper Jignesh final pdf. (1999).

* cited by examiner

LIQUID CRYSTAL DISPLAY DEVICE

BACKGROUND OF THE INVENTION

1. Field of the Invention

The present invention relates to a liquid crystal display device, and more particularly to a liquid crystal display device having a wide viewing angle characteristic and being capable of producing a high quality display.

2. Description of the Related Art

In recent years, liquid crystal displays (hereinafter, referred to as "LCDs") have been widely used. Mainstream LCDs so far have been twisted nematic type LCDs in which nematic liquid crystal molecules having a positive dielectric anisotropy are twisted. However, this type of LCDs have a problem of excessive viewing angle dependence, which is caused by the orientation of liquid crystal molecules.

In order to alleviate the viewing angle dependence, alignment-divided vertical alignment type LCDs have been developed, and are now used increasingly widely.

For example, Japanese Patent No. 2947350 discloses an MVA (Multi-domain Vertical Alignment) type LCD, which is one kind of alignment-divided vertical alignment type LCDs. An MVA type LCD displays images in a normally black (NB) mode using a vertical alignment type liquid crystal layer which is provided between a pair of electrodes. The MVA type LCD includes domain-regulating means (slits or ribs), such that liquid crystal molecules fall (are inclined) in a plurality of different directions in each pixel when a voltage is applied.

Japanese Laid-Open Patent Publication No. 2003-43525 discloses a CPA (Continuous Pinwheel Alignment) type LCD, which is one kind of alignment-divided vertical alignment type LCDs. In a CPA type LCD, a pair of electrodes face each other with a vertical alignment type liquid crystal layer interposed therebetween. One of the pair of electrodes includes a portion having no conductive layer (openings or cut-out portions), such that liquid crystal molecules are inclined radially in each pixel when a voltage is applied.

Recently, demands for displaying moving picture information have been rapidly increasing in personal computer monitors and mobile terminal devices (for example, cellular phones and PDAs) as well as in liquid crystal TVs. In order to realize high quality display of moving pictures in an LCD, the response time of the liquid crystal layer needs to be short (i.e., the response speed of the liquid crystal layer needs to be high). More specifically, it is required to reach a predetermined gray level within one-vertical scanning period (typically, within one frame).

As a driving method for improving the response characteristic of LCDs, a method of applying a voltage which is higher than the voltage corresponding to the gray level to be displayed (the predetermined gray level) is known. (The voltage higher than the voltage corresponding to the gray level to be displayed is referred to as an "overshoot voltage", and such a method is referred to as an "overshoot driving".) An application of an overshoot voltage (hereinafter, referred to as an "OS voltage") can improve the response characteristic in gray scale display. For example, Japanese Laid-Open Patent Publication No. 2000-231091 discloses an MVA type LCD which can be driven by overshoot driving (hereinafter, referred to as an "OS driving").

However, in order to drive an LCD by OS driving as disclosed in Japanese Laid-Open Patent Publication No. 2000-231091, a frame memory for storing image information needs to be additionally provided. This increases the production cost.

SUMMARY OF THE INVENTION

In order to overcome the problems described above, preferred embodiments of the present invention improve the response characteristic of an alignment-divided vertical alignment type LCD in a simple manner.

A first liquid crystal display device according to the present invention includes a first substrate; a second substrate; and a vertical alignment type liquid crystal layer provided between the first substrate and the second substrate. A plurality of picture element regions are each defined by a first electrode provided on one surface of the first substrate which is closer to the liquid crystal layer and a second electrode provided on the second substrate and opposing the first electrode with the liquid crystal layer therebetween. In each of the plurality of picture element regions, the first electrode includes a solid portion formed of a conductive film and a non-solid portion with no conductive film provided, and the liquid crystal layer has an orientation which is regulated by an inclined electric field produced above the non-solid portion of the first electrode when a voltage is applied between the first electrode and the second electrode. A portion of the liquid crystal layer above the solid portion of the first electrode includes a first region having a first thickness $d_1$ and a second region having a second thickness $d_2$ which is smaller than the first thickness $d_1$, the second region being located in the vicinity of the non-solid portion. Thus, the above-described objective is achieved.

In a preferable embodiment, when a voltage is applied between the first electrode and the second electrode, the liquid crystal layer forms a plurality of first liquid crystal domains each taking a radially-inclined orientation above the solid portion by the inclined electric field.

In a preferable embodiment, the solid portion of the first electrode includes a plurality of unit solid portions, above each of which a respective first liquid crystal domain of the plurality of first liquid crystal domains is formed; and the second region of the portion of the liquid crystal layer above the solid portion is located above an edge portion of at least one unit solid portion of the plurality of unit solid portions.

A second liquid crystal display device according to the present invention includes a first substrate; a second substrate; and a vertical alignment type liquid crystal layer provided between the first substrate and the second substrate. A plurality of picture element regions are each defined by a first electrode provided on one surface of the first substrate which is closer to the liquid crystal layer and a second electrode provided on the second substrate and opposing the first electrode with the liquid crystal layer therebetween. In each of the plurality of picture element regions, the first electrode includes a solid portion formed of a conductive film and a non-solid portion with no conductive film provided, and when a voltage is applied between the first electrode and the second electrode, the liquid crystal layer forms a plurality of first liquid crystal domains each taking a radially-inclined orientation above the solid portion by an inclined electric field produced above the non-solid portion of the first electrode. The solid portion of the first electrode includes a plurality of unit solid portions, above each of which a respective first liquid crystal domain of the plurality of first liquid crystal domains is formed. A portion of the liquid crystal layer above at least one unit solid portion of the plurality of unit solid portions includes a first region having a first thickness $d_1$ and a second region having a second thickness $d_2$ which is smaller than the first thickness $d_1$, the second region being located above an edge portion of the unit solid portion. Thus, the above-described objective is achieved.

In a preferable embodiment, a height of a surface of a portion of the at least one unit solid portion corresponding to the second region is higher than a height of a surface of a portion of the at least one unit solid portion corresponding to the first region.

In a preferable embodiment, the first substrate includes a transparent substrate and an interlayer insulating film provided between the transparent substrate and the first electrode; the interlayer insulating layer includes an inclining region where a height of one surface thereof closer to the liquid crystal layer continuously changes; and the edge portion of the at least one unit solid portion is located on the inclining region.

In a preferable embodiment, the interlayer insulating film includes a flat region where the height of the surface thereof closer to the liquid crystal layer is substantially constant; and the portion of the at least one unit solid portion corresponding to the first region is located on the flat region.

In a preferable embodiment, the interlayer insulating film is formed of a photosensitive transparent resin.

In a preferable embodiment, light incident on the liquid crystal layer is circularly-polarized light, and display is provided by modulating the circularly-polarized light by the liquid crystal layer.

In a preferable embodiment, an orientation in the plurality of first liquid crystal domains and an orientation in a portion of the liquid crystal layer above the non-solid portion are continuous with each other.

In a preferable embodiment, the plurality of unit solid portions each have a shape having rotational symmetry.

In a preferable embodiment, the plurality of unit solid portions are each generally circular.

In a preferable embodiment, the plurality of unit solid portions are each generally rectangular.

In a preferable embodiment, the plurality of unit solid portions are each generally rectangular with rounded corners.

In a preferable embodiment, the plurality of unit solid portions each have a shape with acute angle corner portions.

In a preferable embodiment, when a voltage is applied between the first electrode and the second electrode, the liquid crystal layer forms at least one second liquid crystal domain taking a radially-inclined orientation above the non-solid portion by the inclined electric field.

In a preferable embodiment, an orientation in the plurality of first liquid crystal domains and an orientation in the at least one second liquid crystal domain are continuous with each other.

In a preferable embodiment, the non-solid portion of the first electrode has at least one opening.

In a preferable embodiment, the at least one opening includes a plurality of openings, and at least a part of the plurality of openings have substantially the same shape and substantially the same size and form at least one unit lattice which is arranged so as to have rotational symmetry.

In a preferable embodiment, the at least a part of the plurality of openings each have a shape having rotational symmetry.

In a preferable embodiment, the non-solid portion of the first electrode has at least one cut-out portion.

In a preferable embodiment, the at least one cut-out portion includes a plurality of cut-out portions, and the plurality of cut-out portions are regularly arranged.

In a preferable embodiment, in each of the plurality of picture element regions, an area of the non-solid portion of the first electrode is smaller than an area of the solid portion of the first electrode.

In a preferable embodiment, the second substrate has an orientation-regulating structure in a region corresponding to at least one first liquid crystal domain of the plurality of first liquid crystal domains, the orientation-regulating structure exerting an orientation-regulating force for placing the liquid crystal molecules in the at least one first liquid crystal domain into a radially-inclined orientation at least in the presence of an applied voltage.

In a preferable embodiment, the orientation-regulating structure is provided in a region corresponding to a central portion of the at least one first liquid crystal domain.

In a preferable embodiment, the orientation-regulating structure exerts an orientation-regulating force for placing the liquid crystal molecules into a radially-inclined orientation also in the absence of an applied voltage.

In a preferable embodiment, the orientation-regulating structure is a protrusion protruding from the second substrate through the liquid crystal layer.

In a preferable embodiment, a thickness of the liquid crystal layer is defined by the protrusion protruding from the second substrate through the liquid crystal layer.

In a preferable embodiment, the non-solid portion of the first electrode is a slit provided in the first electrode.

A third liquid crystal display device according to the present invention includes a first substrate; a second substrate; and a vertical alignment type liquid crystal layer provided between the first substrate and the second substrate. A plurality of picture element regions are each defined by a first electrode provided on one surface of the first substrate which is closer to the liquid crystal layer and a second electrode provided on the second substrate and opposing the first electrode with the liquid crystal layer therebetween. In each of the plurality of picture element regions, the first electrode includes a solid portion formed of a conductive film and a slit, and the liquid crystal layer has an orientation which is regulated by an inclined electric field produced above the slit of the first electrode when a voltage is applied between the first electrode and the second electrode. A portion of the liquid crystal layer above the solid portion of the first electrode includes a first region having a first thickness $d_1$ and a second region having a second thickness $d_2$ which is smaller than the first thickness $d_1$, the second region being located in the vicinity of the slit. Thus, the above-described objective is achieved.

In a preferable embodiment, a height of a surface of a portion of the solid portion of the first electrode corresponding to the second region is higher than a height of a surface of a portion of the solid portion corresponding to the first region.

In a preferable embodiment, the first substrate includes a transparent substrate and an interlayer insulating film provided between the transparent substrate and the first electrode; the interlayer insulating layer includes an inclining region where a height of one surface thereof closer to the liquid crystal layer continuously changes; and the portion of the solid portion of the first electrode corresponding to the second region is located on the inclining region.

In a preferable embodiment, the interlayer insulating film includes a flat region where the height of the surface thereof closer to the liquid crystal layer is substantially constant; and the portion of the solid portion of the first electrode corresponding to the first region is located on the flat region.

In a preferable embodiment, the interlayer insulating film is formed of a photosensitive transparent resin.

In a preferable embodiment, the first substrate includes a transparent substrate and a color filter layer provided between the transparent substrate and the first electrode; the color filter layer includes an inclining region where a height of one surface thereof closer to the liquid crystal layer continuously changes; and the portion of the solid portion of the first electrode corresponding to the second region is located on the inclining region.

In a preferable embodiment, the color filter layer includes a flat region where the height of the surface thereof closer to the liquid crystal layer is substantially constant; and the portion of the solid portion of the first electrode corresponding to the first region is located on the flat region.

In a preferable embodiment, light incident on the liquid crystal layer is circularly-polarized light, and display is provided by modulating the circularly-polarized light by the liquid crystal layer.

In a preferable embodiment, the liquid crystal display device further includes a pair of polarization plates opposing each other with the liquid crystal layer therebetween, the pair of polarization plates have transmission axes generally perpendicular to each other, one of the transmission axes is located horizontal to a display plane, and the slit is extended in a direction which is inclined with respect to the one of the transmission axes.

In a preferable embodiment, the slit is extended in a direction which makes an angle of about 45° with the one of the transmission axes.

In a preferable embodiment, the second substrate has an orientation-regulating structure exerting an orientation-regulating force which is aligned with the orientation-regulating force provided by the inclined electric field at least in the presence of an applied voltage.

In a preferable embodiment, the orientation-regulating structure of the second substrate is a rib.

In a preferable embodiment, the orientation-regulating structure of the second substrate is a slit provided in the second electrode.

In a preferable embodiment, the first substrate further includes a switching element provided in correspondence with each of the plurality of picture element regions; and the first electrode is a picture element electrode provided in correspondence with each of the plurality of picture element regions and electrically connected to the switching element, and the second electrode is at least one counter electrode opposing the plurality of picture element electrodes.

In a preferable embodiment, a portion of the liquid crystal layer above the solid portion of the picture element electrode does not have the second region in the vicinity of an outer periphery of the picture element electrode.

A fourth liquid crystal display device according to the present invention includes a first substrate; a second substrate; and a vertical alignment type liquid crystal layer provided between the first substrate and the second substrate. A plurality of picture element regions are each defined by a first electrode provided on one surface of the first substrate which is closer to the liquid crystal layer and a second electrode provided on the second substrate and opposing the first electrode with the liquid crystal layer therebetween. In each of the plurality of picture element regions, the first electrode includes a solid portion formed of a conductive film and a slit, and the liquid crystal layer has an orientation which is regulated by an inclined electric field produced above the slit of the first electrode when a voltage is applied between the first electrode and the second electrode. The first substrate further includes a switching element provided in correspondence with each of the plurality of picture element regions. The first electrode is a picture element electrode provided in correspondence with each of the plurality of picture element regions and electrically connected to the switching element, and the second electrode is at least one counter electrode opposing the plurality of picture element electrodes. A portion of the liquid crystal layer above the solid portion of the picture element electrode includes a first region having a first thickness $d_1$ and a second region having a second thickness $d_2$ which is larger than the first thickness $d_1$, the second region being located in the vicinity of an outer periphery of the picture element electrode. Thus, the above-described objective is achieved.

In a preferable embodiment, a height of a surface of a portion of the solid portion corresponding to the second region is lower than a height of a surface of a portion of the solid portion corresponding to the first region.

In a preferable embodiment, the first substrate includes a transparent substrate and an interlayer insulating film provided between the transparent substrate and the first electrode; the interlayer insulating layer includes an inclining region where a height of one surface thereof closer to the liquid crystal layer continuously changes; and the portion of the solid portion corresponding to the second region is located on the inclining region.

In a preferable embodiment, the interlayer insulating film includes a flat region where the height of the surface thereof closer to the liquid crystal layer is substantially constant; and the portion of the solid portion corresponding to the first region is located on the flat region.

In a preferable embodiment, the interlayer insulating film is formed of a photosensitive transparent resin.

In a preferable embodiment, the liquid crystal display device further includes a pair of polarization plates opposing each other with the liquid crystal layer therebetween, the pair of polarization plates have transmission axes generally perpendicular to each other, one of the transmission axes is located horizontal to a display plane, and the slit is extended in a direction which is inclined with respect to the one of the transmission axes.

In a preferable embodiment, the slit is extended in a direction which makes an angle of about 45° with the one of the transmission axes.

According to the present invention, the liquid crystal layer above a solid portion of a first electrode has a predetermined thickness distribution. Therefore, the response characteristic of an alignment-divided vertical alignment type LCD can be improved in a simple manner. The present invention is preferably usable to a CPA type LCD and an MVA type LCD.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 1A and FIG. 1B schematically illustrate a structure of an LCD 100 of the present invention, wherein FIG. 1A is a plan view, and FIG. 1B is a cross-sectional view taken along line 1B-1B' of FIG. 1A.

FIG. 14A and FIG. 14B schematically illustrate a CPA type LCD 200 of the present invention, wherein FIG. 14A is a plan view, and FIG. 14B is a cross-sectional view taken along line 14B-14B' of FIG. 14A.

FIG. 15A to FIG. 15C are cross-sectional views schematically illustrating the LCD 200, wherein FIG. 15A illustrates a state in the absence of an applied voltage, FIG. 15B illustrates a state where an orientation has just started to change (initial ON state), and FIG. 15C illustrates a steady state.

FIG. 16A and FIG. 16B schematically illustrate a structure of another CPA type LCD 200' of the present invention, wherein FIG. 16A is a plan view, and FIG. 16B is a cross-sectional view taken along line 16B-16B' of FIG. 16A.

FIG. 17A to FIG. 17C are cross-sectional views schematically illustrating the LCD 200', wherein FIG. 17A illustrates a state in the absence of an applied voltage, FIG. 17B illustrates a state where an orientation has just started to change (initial ON state), and FIG. 17C illustrates a steady state.

FIG. 18A to FIG. 18C are cross-sectional views schematically illustrating an LCD including protrusions (ribs) that function also as spacers, wherein FIG. 18A illustrates a state in the absence of an applied voltage, FIG. 18B illustrates a state where an orientation has just started to change (initial ON state), and FIG. 18C illustrates a steady state.

DETAILED DESCRIPTION OF PREFERRED EMBODIMENTS

Hereinafter, preferred embodiments of the present invention will be described with reference to the accompanying drawings.

The following embodiments of the present invention will be described regarding an active matrix type LCD using thin film transistors (TFTs) as an example, but the present invention is not limited thereto and is also applicable to an active matrix LCD using an MIM structure or a simple matrix LCD. The following description will be given regarding a transmission type LCD as an example, but the present invention is not limited thereto and is also applicable to a reflection type LCD or a transmission-reflection type LCD.

Note that in the present specification, a region of an LCD corresponding to a "picture element", which is the minimum unit of display, will be referred to as a "picture element region". In a color LCD, a plurality of "picture elements" including R, G and B "picture elements" correspond to one "pixel". In an active matrix type LCD, a picture element region is defined by a picture element electrode and a counter electrode opposing the picture element electrode. In a passive matrix type LCD, a picture element region is defined as a region where one of column electrodes arranged in a stripe pattern crosses one of row electrodes also arranged in a stripe pattern perpendicular to the column electrodes. In an arrangement with a black matrix, strictly speaking, a picture element region is a portion, of each region across which a voltage is applied according to the intended display state, that corresponds to an opening of the black matrix.

Embodiment 1

Figure 1A:
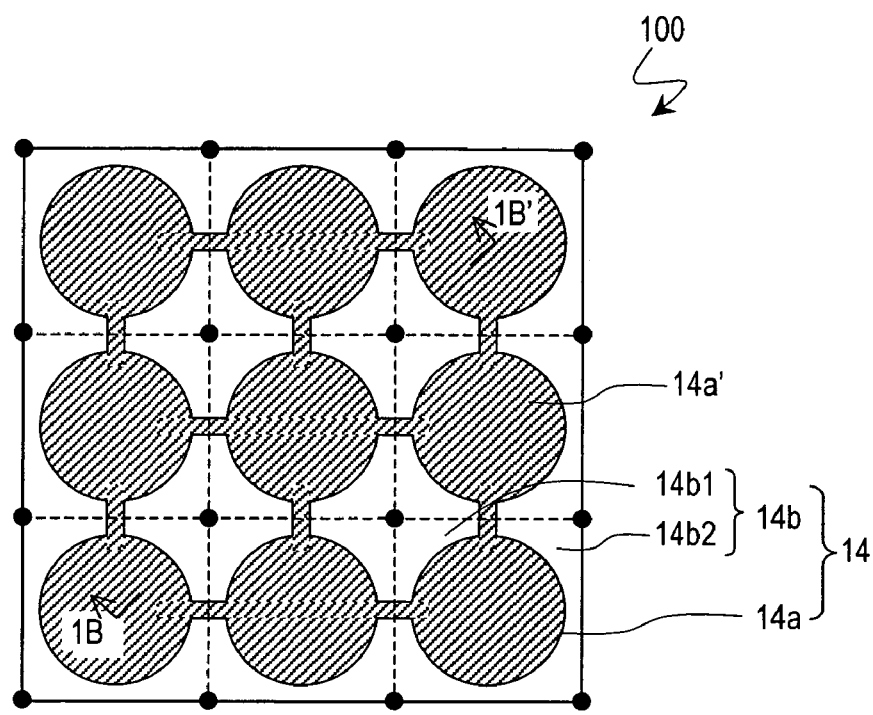
Figure 1B:
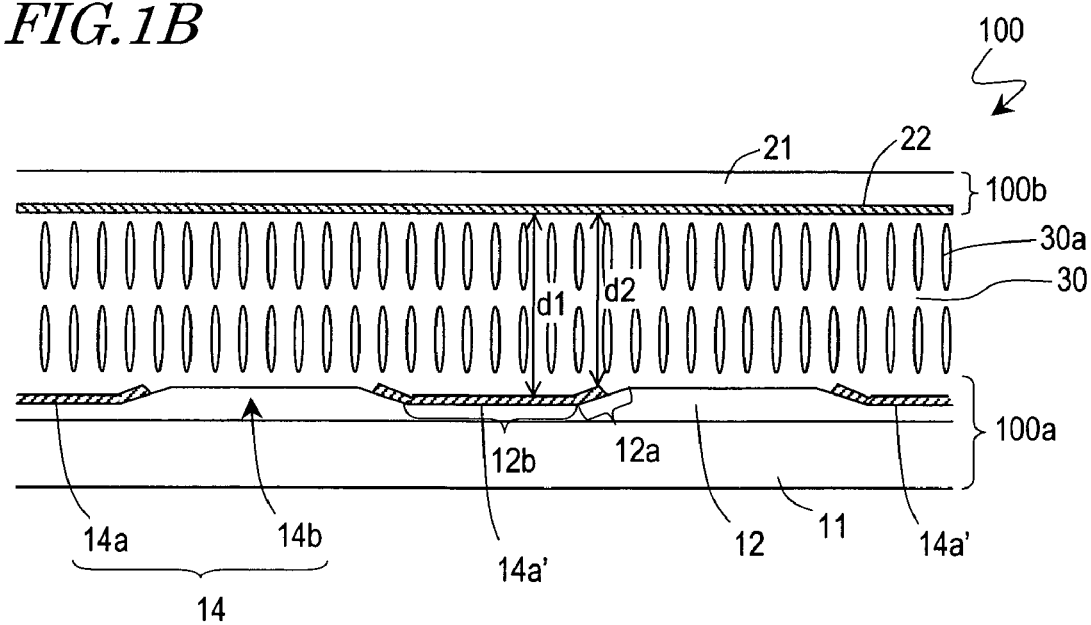

The structure of one picture element region of a CPA type LCD 100 according to the present embodiment will now be described with reference to FIG. 1A and FIG. 1B. In the following description, a color filter and a black matrix are omitted for the sake of simplicity. In the figures, each element having substantially the same function as the corresponding element in the LCD 100 will be denoted by the same reference numeral and will not be further described. FIG. 1A is a plan view illustrating the picture element region of the LCD 100 as viewed in the substrate normal direction, and FIG. 1B is a cross-sectional view taken along line 1B-1B' of FIG. 1A. FIG. 1B illustrates a state where no voltage is applied across a liquid crystal layer.

The LCD 100 includes an active matrix substrate (hereinafter referred to as a "TFT substrate") 100a, a counter substrate (referred to also as a "color filter substrate") 100b, and a liquid crystal layer 30 provided between the TFT substrate 100a and the counter substrate 100b. Liquid crystal molecules 30a of the liquid crystal layer 30 have a negative dielectric anisotropy, and are aligned vertical to the surface of a vertical alignment film (not shown), as illustrated in FIG. 1B, in the absence of an applied voltage across the liquid crystal layer 30 by virtue of the vertical alignment film as a vertical alignment layer, which is provided on one surface of each of the TFT substrate 100a and the counter substrate 100b that is closer to the liquid crystal layer 30. This state is described as the liquid crystal layer 30 being in a vertical alignment. Note, however, that the liquid crystal molecules 30a of the liquid crystal layer 30 in a vertical alignment may slightly incline from the normal to the surface of the vertical alignment film (the surface of the substrate) depending upon the type of vertical alignment film or the type of liquid crystal material used. Generally, a vertical alignment is defined as a state where the axis of the liquid crystal molecules (referred to also as the "axial orientation") is oriented at an angle of about 85° or more with respect to the surface of the vertical alignment film.

The TFT substrate 100a of the LCD 100 includes a transparent substrate (e.g., a glass substrate) 11 and a picture element electrode 14 provided on the surface of the transparent substrate 11. The counter substrate 100b includes a transparent substrate (e.g., a glass substrate) 21 and a counter electrode 22 provided on the surface of the transparent substrate 21. The orientation of the liquid crystal layer 30 changes in each picture element region according to the voltage applied between the picture element electrode 14 and the counter electrode 22, which are arranged so as to oppose each other via the liquid crystal layer 30. A display is produced by utilizing a phenomenon that the polarization or amount of light passing through the liquid crystal layer 30 changes along with the change in the orientation of the liquid crystal layer 30.

Next, the structure and the function of the picture element electrode 14 provided in the CPA type LCD 100 will be described.

As illustrated in FIG. 1A and FIG. 1B, the picture element electrode 14 includes a solid portion 14a formed of a conductive film (e.g., an ITO film or an aluminum film) and a non-solid portion 14b with no conductive film provided therein.

The solid portion 14a includes a plurality of regions each substantially surrounded by the non-solid portion 14b (each of such regions will be referred to as a "unit solid portion 14a'). The unit solid portions 14a' have substantially the same shape and substantially the same size as one another, and each solid portion 14a' has a generally circular shape. Typically, the plurality of unit solid portions 14a' are electrically connected together in each picture element region.

The non-solid portion 14b includes a plurality of openings 14b1, which have substantially the same shape and substantially the same size as one another, and are arranged so that the respective centers thereof form a square lattice pattern. The unit solid portion 14a' at the center of the picture element electrode 14 is substantially surrounded by four openings 14b1 whose respective centers are located at the four lattice points that form one unit lattice. Each of the openings 14b1 has a generally star-like shape having four quarter-arc-shaped sides (edges), with a four-fold rotation axis at the center among the four sides.

The non-solid portion 14b further includes a plurality of cut-out portions 14b2. The plurality of cut-out portions 14b2 are located at edge portions of the picture element region. The cut-out portions 14b2, which are located in areas corresponding to the sides of the picture element region, each have a shape corresponding to about a half of the shape of each opening 14b1. The cut-out portions 14b2, which are located in areas corresponding to the corners of the picture element region, each have a shape corresponding to about a quarter of the shape of each opening 14b1. The unit solid portions 14a' which are located in the edge portions of the picture element region are each substantially surrounded by the respective cut-out portions 14b2 and the respective openings 14b1. The cut-out portions 14b2 are regularly arranged, and the openings 14b1 and the cut-out portions 14b2 form unit lattices in the entirety of the picture element region (to the end portions thereof). The openings 14b1 and the cut-out portions 14b2 are formed by patterning a conductive film which is used for the picture element electrode 14.

When a voltage is applied between the picture element electrode 14 having such a structure as described above and the counter electrode 22, an inclined electric field is produced around (near the outer periphery of) the solid portion 14a, i.e., at the edge portion of the non-solid portion 14b, thereby producing a plurality of liquid crystal domains each taking a radially-inclined orientation. The liquid crystal domain is produced in each region corresponding to the opening 14b1 and in each region corresponding to the unit solid portion 14a'.

The picture element electrode 14 in this embodiment is square, but the shape of the picture element electrode 14 is not limited thereto. A general shape of the picture element electrode 14 is close to a rectangle (encompassing a square and an oblong rectangle), so that the openings 14b1 and the cut-out portions 14b2 can be regularly arranged in a square lattice pattern. Even when the picture element electrode 14 is not rectangular, the effects of the present invention are provided as long as the openings 14b1 and the cut-out portions 14b2 are arranged regularly (e.g., in a square lattice pattern as described above) such that liquid crystal domains are formed in the entirety of the picture element region.

Figure 2A:
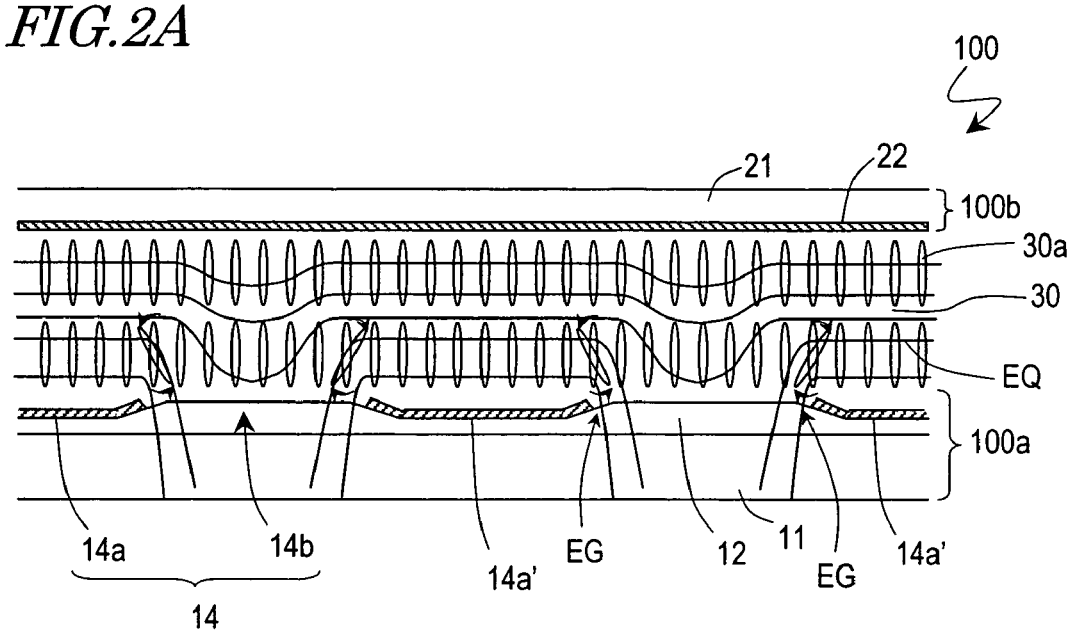
FIG. 2A and FIG. 2B illustrate a liquid crystal layer 30 of the LCD 100 in the presence of an applied voltage thereacross, wherein FIG. 2A schematically illustrates a state where an orientation has just started to change (initial ON state), and FIG. 2B schematically illustrates a steady state.
Figure 2B:
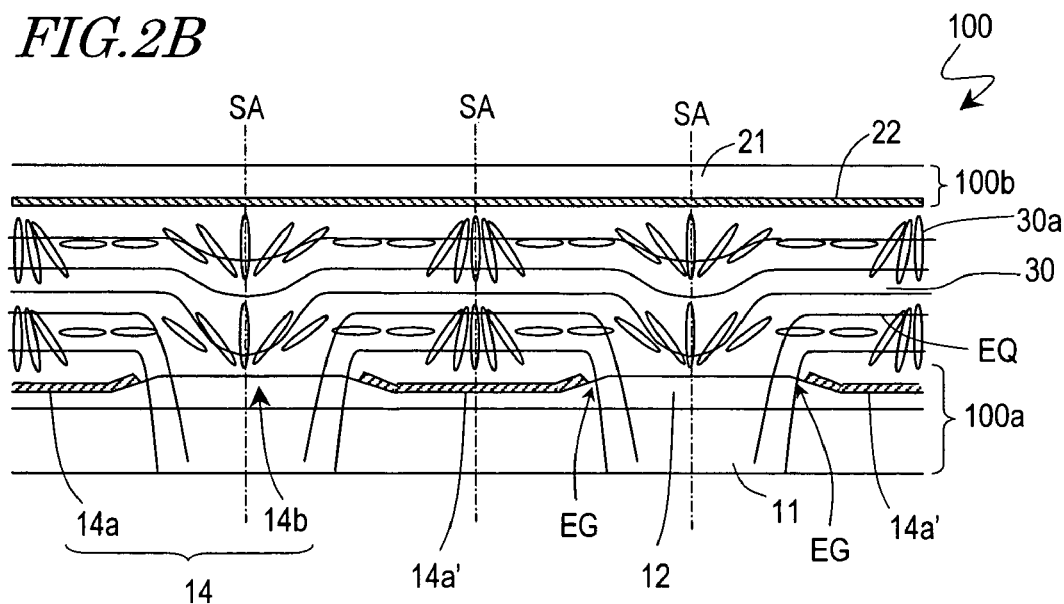

The mechanism by which liquid crystal domains are formed by an inclined electric field as described above will be described with reference to FIG. 2A and FIG. 2B. FIG. 2A and FIG. 2B each illustrate the liquid crystal layer 30 shown in FIG. 1B with a voltage being applied thereacross. FIG. 2A schematically illustrates a state where the orientation of the liquid crystal molecules 30a has just started to change (initial ON state) according to the voltage applied across the liquid crystal layer 30. FIG. 2B schematically illustrates a state where the orientation of the liquid crystal molecules 30a has changed and become steady according to the applied voltage. Curves EQ in FIG. 2A and FIG. 2B denote equipotential lines.

When the picture element electrode 14 and the counter electrode 22 are at the same potential (a state where no voltage is applied across the liquid crystal layer 30), the liquid crystal molecules 30a in each picture element region are aligned vertical to the surfaces of the substrates 11 and 21, as illustrated in FIG. 1B.

When a voltage is applied across the liquid crystal layer 30, a potential gradient represented by the equipotential lines EQ shown in FIG. 2A (perpendicular to the electric force line) is produced. The equipotential lines EQ, in the liquid crystal layer 30 located between the solid portion 14a of the picture element electrode 14 and the counter electrode 22, are parallel to the surfaces of the solid portion 14a and the counter electrode 22; and drop in a region corresponding to the non-solid portion 14b of the picture element region. An inclined electric field represented by an inclined portion of the equipotential lines EQ is produced in the liquid crystal layer 30 above an edge portion EG of the non-solid portion 14b (at the peripheral portion of, and within, the non-solid portion 14b, including the boundary between the solid portion 14a and the non-solid portion 14b).

A torque acts upon the liquid crystal molecules 30a having a negative dielectric anisotropy so as to direct the axial orientation of the liquid crystal molecules 30a to be parallel to the equipotential lines EQ (perpendicular to the electric force line). Therefore, as indicated by arrows in FIG. 2A, the liquid crystal molecules 30a above the right edge portion EG of each non-solid portion 14b incline (rotate) clockwise, and the liquid crystal molecules 30a above the left edge portion EG of each non-solid portion 14b incline (rotate) counterclockwise. As a result, the liquid crystal molecules 30a above the edge portions EG are oriented parallel to the corresponding portions of the equipotential lines EQ.

Referring to FIG. 3A to FIG. 3D, the change in the orientation of the liquid crystal molecules 30a will now be described in greater detail.

Figure 3A:
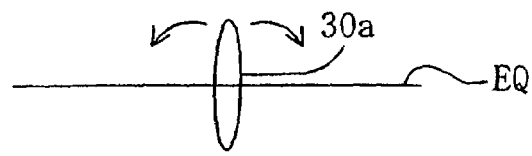
FIG. 3A to FIG. 3D each schematically illustrate the relationship between an electric force line and an orientation of a liquid crystal molecule.

When an electric field is produced in the liquid crystal layer 30, a torque acts upon the liquid crystal molecules 30a having a negative dielectric anisotropy so as to direct the axial orientation thereof to be parallel to an equipotential line EQ. As illustrated in FIG. 3A, when an electric field represented by an equipotential line EQ perpendicular to the axial orientation of the liquid crystal molecule 30a is produced, either a torque urging the liquid crystal molecule 30a to incline clockwise or a torque urging the liquid crystal molecule 30a to incline counterclockwise is produced with the same probability. Therefore, the liquid crystal layer 30 between the pair of parallel plate-shape electrodes opposing each other has some liquid crystal molecules 30a that are subjected to a clockwise torque and some other liquid crystal molecules 30a that are subjected to a counterclockwise torque. As a result, the transition to the intended orientation according to the voltage applied across the liquid crystal layer 30 may not proceed smoothly.

Figure 3B:
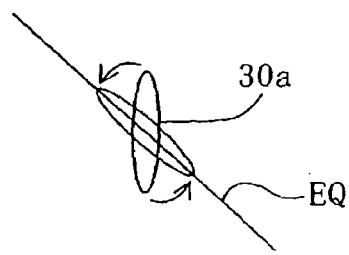
Figure 3C:
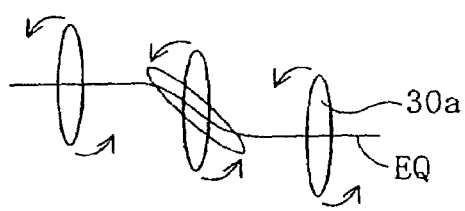
Figure 3D:
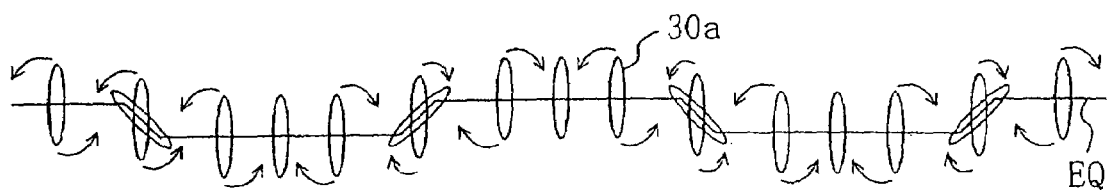

When, as illustrated in FIG. 2A, an electric field represented by a portion of the equipotential lines EQ inclined with respect to the axial orientation of the liquid crystal molecules 30a (an inclined electric field) is produced at the edge portion EG of the non-solid portion 14b of the LCD 100 of the present invention, the liquid crystal molecules 30a incline in whichever direction (the counterclockwise direction in the illustrated example) that requires less rotation for the liquid crystal molecules 30a to be parallel to the equipotential lines EQ, as illustrated in FIG. 3B. The liquid crystal molecules 30a in a region where an electric field represented by an equipotential line EQ perpendicular to the axial orientation of the liquid crystal molecules 30a is inclined in the same direction as the liquid crystal molecules 30a located on the inclined portion of the equipotential lines EQ, so that the orientation thereof is continuous (in conformity) with the orientation of the liquid crystal molecules 30a located on the inclined portion of the equipotential lines EQ as illustrated in FIG. 3C. When, as illustrated in FIG. 3D, an electric field represented by an equipotential line EQ having a continuous concave/convex pattern is produced, the liquid crystal molecules 30a located on a flat portion of the equipotential line EQ are oriented so as to conform with the orientation direction defined by the liquid crystal molecules 30a located on adjacent inclined portions of the equipotential line EQ. The phrase "being located on an equipotential line EQ" as used herein means "being located within an electric field that is represented by the equipotential line EQ".

The change in the orientation of the liquid crystal molecules 30a, starting from those that are located on the inclined portion of the equipotential line EQ, proceeds as described above and reaches a steady state, which is schematically illustrated in FIG. 2B. The liquid crystal molecules 30a located around the central portion of the opening 14b1 are influenced substantially equally by the respective orientations of the liquid crystal molecules 30a at the opposing edge portions EG of the opening 14b1, and therefore retain their orientation perpendicular to the equipotential lines EQ. The liquid crystal molecules 30a away from the center of the opening 14b1 incline by the influence of the orientation of other liquid crystal molecules 30a at the closer edge portion EG, thereby forming an inclined orientation that is symmetric about the center SA (FIG. 2B) of the opening 14b1. The orientation is, as viewed in a direction perpendicular to the display plane of the LCD 100 (a direction perpendicular to the surfaces of the substrates 11 and 21), in a state where the liquid crystal molecules 30a have a radial axial orientation (not shown) about the center of the opening 14b1. In the present specification, such an orientation will be referred to as a "radially-inclined orientation". In addition, a region of the liquid crystal layer 30 that takes a radially-inclined orientation about a single axis will be referred to as a "liquid crystal domain".

A liquid crystal domain in which the liquid crystal molecules 30a take a radially-inclined orientation is formed also in a region corresponding to the unit solid portion 14a' substantially surrounded by the non-solid portion 14b. The liquid crystal molecules 30a in a region corresponding to the unit solid portion 14a' are influenced by the orientation of the liquid crystal molecules 30a at each edge portion EG of the non-solid portion 14b so as to take a radially-inclined orientation that is symmetric about the center SA of the unit solid portion 14a' (corresponding to the center of a unit lattice formed by the non-solid portion 14b).

The radially-inclined orientation in a liquid crystal domain formed above the unit solid portion 14a' and the radially-inclined orientation formed above the opening 14b1 are continuous with each other, and are both in conformity with the orientation of the liquid crystal molecules 30a at the edge portion EG of the non-solid portion 14b. The liquid crystal molecules 30a in the liquid crystal domain formed above the opening 14b1 are oriented in the shape of a cone that spreads upwardly (toward the substrate 100b), and the liquid crystal molecules 30a in the liquid crystal domain formed above the unit solid portion 14a' are oriented in the shape of a cone that spreads downwardly (toward the substrate 100a). The orientation in the liquid crystal domain formed above the unit solid portion 14a' is also in conformity with the orientation of the liquid crystal molecules 30a in the liquid crystal layer 30 above the cut-out portion 14b2. As described above, the radially-inclined orientation in a liquid crystal domain formed above the solid portion 14a and that in a liquid crystal layer formed above the non-solid portion 14b (including the liquid crystal domain formed above the opening 14b1) are continuous with each other. Therefore, no disclination line (orientation defect) is formed along the boundary therebetween. Thus, a decrease in the display quality due to occurrence of a disclination line does not occur.

In order to alleviate the viewing angle dependence of the display quality of an LCD in all azimuth angles, the existence probabilities of the liquid crystal molecules 30a oriented in various azimuth angle directions preferably have rotational symmetry, and more preferably have axial symmetry, in each picture element region. In other words, the liquid crystal domains formed in the entirety of the picture element region are preferably arranged to have rotational symmetry, and further axial symmetry. However, it is not absolutely necessary that the liquid crystal domains have rotational symmetry in the entirety of the picture element region. It is sufficient as long as the liquid crystal layer in the picture element region is formed as a set of liquid crystal domains which are arranged so as to have rotational symmetry (or axial symmetry) (e.g., as a set of a plurality of liquid crystal domains arranged in a square lattice pattern). Therefore, it is not absolutely necessary for the plurality of openings 14b1 in the picture element region to be arranged to have rotational symmetry in the entirety of the picture element region. It is sufficient as long as the picture element region includes a set of openings 14b1 which are arranged so as to have rotational symmetry (or axial symmetry) (e.g., as a set of a plurality of openings arranged in a square lattice pattern). The same is applicable to the unit solid portions 14a' substantially surrounded by the openings 14b1 (and also by the cut-out portions 14b2). The shape of each liquid crystal domain preferably has rotation symmetry and even axial symmetry, and the shape of each opening 14b1 and each unit solid portion 14a' also preferably have rotation symmetry and even axial symmetry.

Note that a sufficient voltage may not be applied across the liquid crystal layer 30 around the central portion of the opening 14b1, and as a result, the liquid crystal layer 30 around the central portion of the opening 14b1 may not contribute to the display. In other words, even if the radially-inclined orientation of the liquid crystal layer 30 around the central portion of the opening 14b1 is disturbed to some extent (e.g., even if the central axis is shifted from the center of the opening 14b1), the display quality may not be decreased. Therefore, as long as the liquid crystal domain is formed at least corresponding to a unit solid portion 14a', it is possible to obtain a continuity of the liquid crystal molecules in each picture element region and to realize a wide viewing angle characteristic and a high display quality.

As described above with reference to FIG. 2A and FIG. 2B, the picture element electrode 14 of the LCD 100 of the present invention includes a non-solid portion 14b with no conductive film, and produces, in the liquid crystal layer 30 in the picture element region, an electric field represented by equipotential lines EQ having inclined portions. The liquid crystal molecules 30a having a negative dielectric anisotropy in the liquid crystal layer 30, which are in a vertical alignment in the absence of an applied voltage, change the orientation direction thereof, with the change in the orientation of those liquid crystal molecules 30a located on the inclined portions of the equipotential lines EQ serving as a trigger. Thus, a liquid crystal domain having a stable radially-inclined orientation is formed above the opening 14b1 and the unit solid portion 14a'. A display is produced by the change in the orientation of the liquid crystal molecules in the liquid crystal domain, the change occurring according to the voltage applied across the liquid crystal layer.

The shape (as viewed in the substrate normal direction) and arrangement of the unit solid portions 14a', the openings 14b1 and the cut-out portions 14b2 of the picture element electrode 14 will be described.

The display characteristics of an LCD exhibit an azimuth angle dependence due to the orientation (optical anisotropy) of the liquid crystal molecules. In order to reduce the azimuth angle dependence of the display characteristics, it is preferred that the liquid crystal molecules are oriented in all azimuth angles with substantially the same probability. More preferably, the liquid crystal molecules in each picture element region are oriented in all azimuth angles with substantially the same probability. Therefore, each unit solid portion 14a' preferably has such a shape that liquid crystal domains are formed so that the liquid crystal molecules 30a in each liquid crystal domain corresponding to the unit solid portion 14a' are oriented in all azimuth angles with substantially the same probability. More specifically, the shape of the unit solid portion 14a' preferably has rotational symmetry (more preferably, symmetry with at least a two-fold rotation axis) about a symmetry axis extending through the center of each unit solid portion 14a' (in the normal direction). The shape of the opening 14b1 also preferably has rotational symmetry, and the openings 14b1 are also preferably arranged so as to have rotational symmetry.

It is not absolutely necessary that the unit solid portions 14a' and the openings 14b1 are arranged to have rotational symmetry in the entirety of the picture element region. The liquid crystal molecules 30a can be oriented in all azimuth angles with substantially the same probability in the entirety of the picture element region as long as, as shown in FIG. 1A, the picture element region is formed of a combination of, for example, a plurality of square lattices (having symmetry with a four-fold rotation axis) as the minimum unit.

The orientation of the liquid crystal molecules 30a when, as illustrated in FIG. 1A, the generally star-shaped openings 14b1 surrounding the generally circular unit solid portion 14a' are arranged in a square lattice pattern will be described with reference to FIG. 4A to FIG. 4C.

Figure 4A:
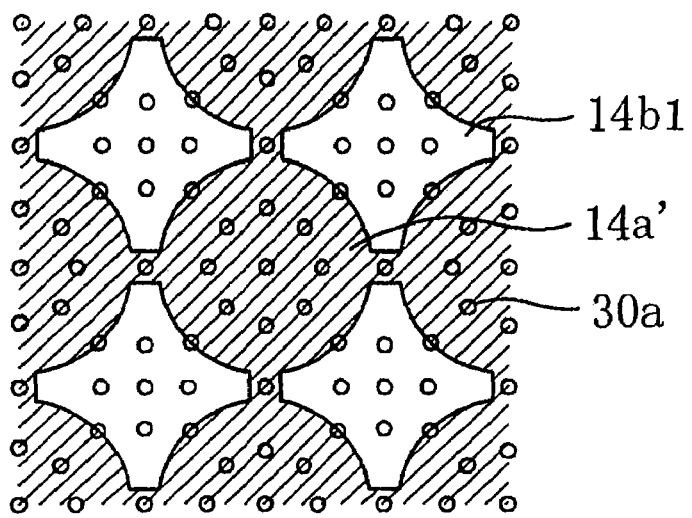
FIG. 4A to FIG. 4C each schematically illustrate an orientation of liquid crystal molecules in the LCD 100 as viewed in a substrate normal direction.
Figure 4B:
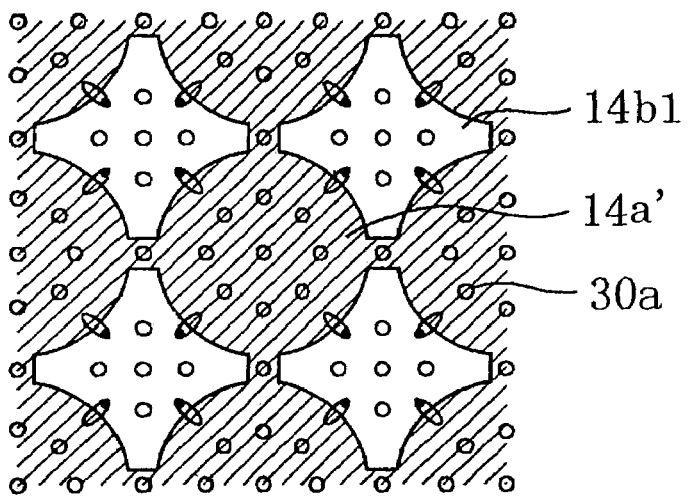
Figure 4C:
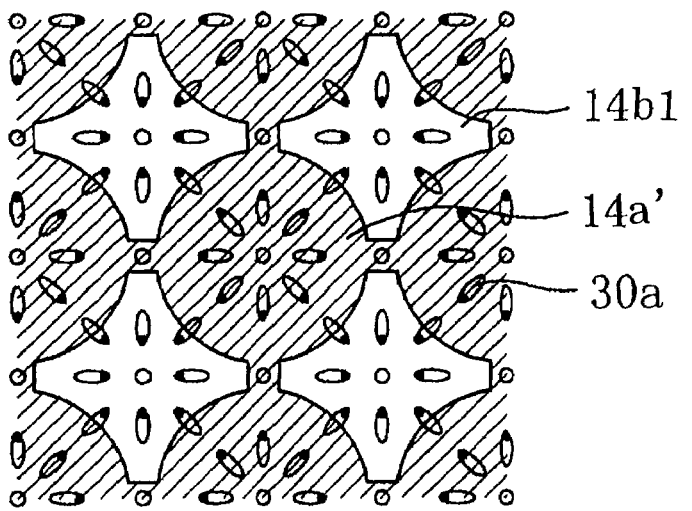

FIG. 4A to FIG. 4C each schematically illustrate an orientation of the liquid crystal molecules 30a as viewed in the substrate normal direction. In figures, such as FIG. 4B and FIG. 4C, illustrating the orientation of the liquid crystal molecules 30a as viewed in the substrate normal direction, a black-spotted end of the liquid crystal molecule 30a drawn as an ellipse indicates that the liquid crystal molecule 30a is inclined so that the end is closer than the other end to the substrate on which the picture element electrode 14 is provided. This applies to all of the subsequent figures. A single unit lattice (formed by four openings 14b1) in the picture element region illustrated in FIG. 1A will be described below. Cross-sectional views taken along the respective diagonals of FIG. 4A to FIG. 4C correspond to FIG. 1B, FIG. 2A and FIG. 2B, respectively, and FIG. 1B, FIG. 2A and FIG. 2B will also be referred to in the following description.

When the picture element electrode 14 and the counter electrode 22 are at the same potential, i.e., in a state where no voltage is applied across the liquid crystal layer 30, the liquid crystal molecules 30a whose orientation direction is regulated by the vertical alignment layer (not shown) provided on one side of each of the TFT substrate 100a and the counter substrate 100b that is closer to the liquid crystal layer 30 take a vertical alignment as illustrated in FIG. 4A.

When an electric field is applied across the liquid crystal layer 30 so as to produce an electric field represented by equipotential lines EQ shown in FIG. 2A, a torque acts upon the liquid crystal molecules 30a having a negative dielectric anisotropy so as to direct the axial orientation thereof to be parallel to the equipotential lines EQ. As described above with reference to FIG. 3A and FIG. 3B, for the liquid crystal molecules 30a under an electric field represented by equipotential lines EQ perpendicular to the molecular axis thereof, the direction in which the liquid crystal molecules 30a are to incline (rotate) is not uniquely defined (FIG. 3A). Thus, the orientation change (inclination or rotation) does not easily occur. In contrast, for the liquid crystal molecules 30a placed under equipotential lines EQ inclined with respect to the molecular axis thereof, the direction of inclination (rotation) is uniquely defined. Thus, the orientation change easily occurs. Therefore, as illustrated in FIG. 4B, the liquid crystal molecules 30a start inclining from the edge portions of the openings 14b1 where the molecular axis of the liquid crystal molecules 30a is inclined with respect to the equipotential lines EQ. Then, as described above with reference to FIG. 3C, the surrounding liquid crystal molecules 30a incline so as to conform with the orientation of the already-inclined liquid crystal molecules 30a at the edge portions of the openings 14b1. Then, the axial orientation of the liquid crystal molecules 30a becomes stable as illustrated in FIG. 4C (radially-inclined orientation).

As described above, when the shape of the openings 14b1 has rotational symmetry, the liquid crystal molecules 30a in the picture element region successively incline, starting from the edge portion of each opening 14b1 toward the center of the opening 14b1 upon application of a voltage. As a result, those liquid crystal molecules 30a around the center of each opening 14b1, where the respective orientation-regulating forces from the liquid crystal molecules 30a at the edge portions are in equilibrium, remain in a vertical alignment with respect to the substrate plane. The surrounding liquid crystal molecules 30a are inclined in a radial pattern about those liquid crystal molecules 30a around the center of each opening 14b1, with the degree of inclination gradually increasing as the liquid crystal molecules 30a are farther from the center of the opening 14b1.

The liquid crystal molecules 30a in a region corresponding to the generally circular unit solid portion 14a' surrounded by the four generally star-shaped openings 14b1 arranged in a square lattice pattern also incline so as to conform with the orientation of the liquid crystal molecules 30a that have been inclined by an inclined electric field produced at the edge portion of each opening 14b1. As a result, those liquid crystal molecules 30a around the center of the unit solid portion 14a', where the respective orientation-regulating forces from the liquid crystal molecules 30a at the edge portions are in equilibrium, remain in a vertical alignment with respect to the substrate plane. The surrounding liquid crystal molecules 30a are inclined in a radial pattern about those liquid crystal molecules 30a around the center of the unit solid portion 14a', with the degree of inclination gradually increasing as the liquid crystal molecules 30a are farther from the center of the unit solid portion 14a'.

As described above, when liquid crystal domains, in each of which the liquid crystal molecules 30a take a radially-inclined orientation, are arranged in a square lattice pattern, the existence probabilities of the liquid crystal molecules 30a of the respective axial orientations have rotational symmetry. As a result, it is possible to realize a high-quality display without non-uniformity for any viewing angle. In order to reduce the viewing angle dependence of a liquid crystal domain taking a radially-inclined orientation, the liquid crystal domain preferably has a high degree of rotational symmetry (preferably with at least a two-fold rotation axis, and more preferably with at least a four-fold rotation axis).

As described above, in the LCD 100, each liquid crystal region includes a non-solid portion 14b including openings 14b1 and cut-out portions 14b2. Owing to such a structure, liquid crystal domains taking a radially-inclined orientation are formed. As a result, a wide viewing angle can be provided.

In the LCD 100 according to the present invention, as shown in, for example, FIG. 1B, the liquid crystal layer 30 above a unit solid portion 14a' has a first region having a first thickness $d_1$ and a second region having a second thickness $d_2$ which is smaller than the first thickness $d_1$. The second region is located above an edge portion of the unit solid portion 14a' (near the outer periphery of the unit solid portion 14a'), and the first region is located inner to the second region. In the LCD 100, the cell gap above the edge portion of the unit solid portion 14a' is smaller than the cell gap above the remaining portion of the unit solid portion 14a'.

In general, the response speed of liquid crystal molecules is higher as the thickness of the liquid crystal layer (cell gap) is smaller because the effect of the electric field is more significant, and the response time of the liquid crystal molecules is generally in proportional to the square of the thickness of the liquid crystal layer. Therefore, the response speed of the second region having a relatively small thickness $d_2$ is higher than the response speed of the first region having a relatively large thickness $d_1$. The liquid crystal molecules 30a in the second region above the edge portion of the unit solid portion 14a' trigger the formation of a radially-inclined orientation. Therefore, when the response speed of the liquid crystal molecules 30a in the second region is higher, a liquid crystal domain is formed more quickly. As a result, the response speed of the entirety of the liquid crystal layer 30 is increased. Thus, the LCD 100 according to the present invention has a superb response characteristic.

While the response speed can be further increased by decreasing the cell gap across the entire picture element region, it is then necessary to increase the refractive index anisotropy (Δn) of the liquid crystal material in order to give a predetermined retardation to light passing through the liquid crystal layer 30. With common liquid crystal materials, however, the viscosity increases as the refractive index anisotropy increases, which cancels out the advantage of an improved response speed obtained by reducing the cell gap. Therefore, it is not possible to sufficiently improve the response speed by simply reducing the thickness of the liquid crystal layer 30 in the entirety of the picture element region. In contrast, in the LCD 100 according to the present invention, the cell gap is reduced only in a portion of the picture element region (a region corresponding to the edge portion of the unit solid portion 14a'). Thus, the response speed can be sufficiently improved with no need to increase the refractive index anisotropy (Δn) of the liquid crystal material.

The effect of improving the response speed is greater as the thickness $d_2$ of the second region is smaller and also as the difference between the thickness $d_1$ of the first region and the thickness $d_2$ of the second region is greater. Specifically, in order to sufficiently improve the response speed, the difference between the thickness $d_1$ of the first region and the thickness $d_2$ of the second region is preferably 0.5 μm or greater, more preferably 1 μm or greater, and further preferably 1.5 μm or greater.

It is not absolutely necessary to reduce the cell gap above the edge portion (thickness $d_2$) of all the unit solid portions 14a' in the picture element region. The effect of improving the response speed is obtained by reducing the cell gap above the edge portion of only a part of the unit solid portions 14a'. In order to improve the response speed, however, it is preferable to reduce the cell gap above the edge portion in as many unit solid portions 14a' as possible of the picture element region. It is most preferable to reduce the cell gap above the edge portion in all the unit solid portions 14a' of the picture element region.

In the present embodiment, as shown in, for example, FIG. 1B, the cell gap above the edge portion of the unit solid portion 14a' is made smaller by setting a surface of the edge portion of the unit solid portion 14a' (corresponding to the second region) to be higher than a surface of the remaining portion of the unit solid portion 14a' (corresponding to the first region). More specifically, an interlayer insulating film 12 is provided between the picture element electrode 14 and the transparent substrate 11, and the height of the surface of the interlayer insulating film 12 is locally changed, such that the surface of the unit solid portion 14a' formed thereon is higher in the edge portion than in the remaining portion of the unit solid portion 14a'.

The interlayer insulating film 12 includes an inclining region 12a where a height of one surface thereof which is closer to the liquid crystal layer 30 changes continuously and a flat region 12b where the height of the surface which is closer to the liquid crystal layer 30 is substantially constant. The edge portion (corresponding to the second region) of the unit solid portion 14a' is located on the inclining region 12a, and the remaining portion (corresponding to the first region) of the unit solid portion 14a' is located on the flat region 12b.

In view of the display quality, it is preferred that the inclination angle of the inclining region 12a of the interlayer insulating film 12 (the inclination angle with respect to the surface of the substrate 11) is small. The vertical alignment film formed on the inclining region 12a has an orientation-regulating force for orienting the liquid crystal molecules 30a vertical to the surface of the vertical alignment film. Therefore, the liquid crystal molecules 30a on the inclining region 12a are oriented in an inclined direction with respect to the surface of the substrate 11. At this point, the degree of inclination of the liquid crystal molecules 30a is larger as the inclination angle of the inclining region 12a is larger. Since the orientation-regulating force of the vertical alignment film acts irrespective of the presence/absence of a voltage application, light leakage occurs in a black display due to the inclined liquid crystal molecules 30a above the inclining region 12a. Therefore, when the inclination angle of the inclining region 12a is excessively large, the contrast ratio decreases. Thus, the inclination angle of the inclining region 12a is preferably small, and the interlayer insulating film 12 preferably has a gentle slope. Specifically, the inclination angle of the inclining region 12a of the interlayer insulating film 12 with respect to the surface of the substrate 11 is preferably 30° or less, and more preferably 20° or less.

Note that if the height of the surface of the unit solid portion 14a' changes continuously across the entire unit solid portion 14a', the retardation of the liquid crystal layer 30 is no longer constant across the unit solid portion 14a', which may deteriorate the display quality. In such a case, it is difficult to suitably compensate for the phase difference by using a phase difference compensator or the like. In the case where the interlayer insulating film 12 includes the flat region 12b where the height of the surface which is closer to the liquid crystal layer 30 is substantially constant as in the present embodiment, generation of such a problem can be suppressed.

The interlayer insulating film 12 having a gentle slope as described above can be formed by, for example, exposing and developing a photosensitive transparent resin film using a photomask and then thermally deforming the film by a heat treatment. Specifically, the interlayer insulating film 12 shown in FIG. 1B is formed as follows. First, a photosensitive resin film is formed on a surface of the transparent substrate 11. Next, the photosensitive resin film is exposed using a photomask, such that a portion of the film corresponding to the non-solid portion 14b is unexposed and a portion of the film corresponding to the solid portion 14a is exposed to a predetermined amount of light. Then, the film is developed and heat-treated at a predetermined temperature. As a result, the shape having a gentle slope as shown in FIG. 1B is obtained. The above-mentioned exposure process is performed with such an exposure value that a portion of the photosensitive resin film corresponding to the solid portion 14a is not completely removed but partially remain after the development process. Such an exposure process is referred to as a "half exposure process".

The interlayer insulating film may also be formed after forming an underlying layer on a portion of the transparent substrate 11 corresponding to the non-solid portion 14b. With this method, the interlayer insulating film is formed such that a part thereof rides on the underlying layer. As a result, the interlayer insulating film having the above-mentioned shape is obtained. When the underlying layer is formed in the same step as, and using the same material as, the black matrix or the lines, an increase of production steps can be restricted.

Figure 5:
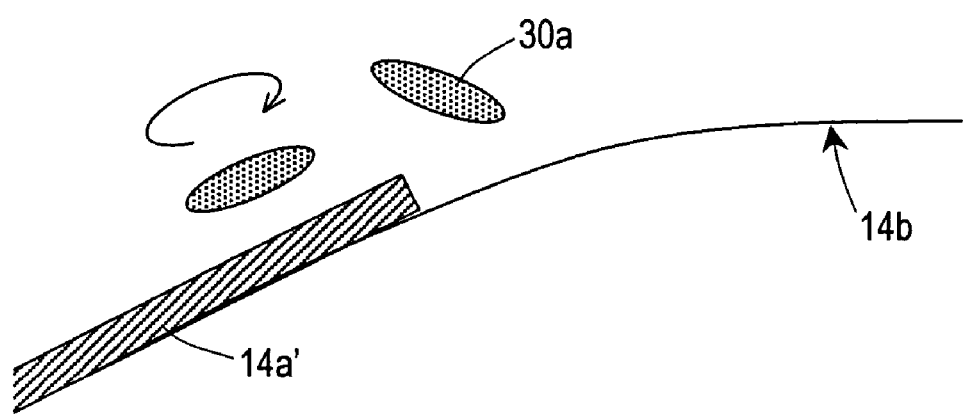
FIG. 5 is an enlarged cross-sectional view of an edge portion and the vicinity thereof of a unit solid portion of the LCD 100.

In the LCD 100 in this embodiment, it is preferable to use a display mode using circularly-polarized light, i.e., a display mode in which light to be incident upon the liquid crystal layer 30 is circularly-polarized light and the circularly-polarized light is modulated by the liquid crystal layer 30 to display an image. Hereinafter, the reason will be described with reference to FIG. 5. FIG. 5 is an enlarged cross-sectional view illustrating an edge portion of the unit solid portion 14a' in the presence of an applied voltage.

As illustrated in FIG. 5, in the case where the edge portion of the unit solid portion 14a' is formed on an inclined surface, the orientation continuity between the liquid crystal molecules 30a above the edge portion of the unit solid portion 14a' and the liquid crystal molecules 30a above the non-solid portion 14b may be deteriorated when a voltage is applied. The liquid crystal molecule 30a above the edge portion once falls down due to the electric field effect, and then slowly changes the azimuth angle of its orientation as indicated by an arrow in FIG. 5 in order to maintain the orientation continuity with the adjacent liquid crystal molecules 30a (in order to be oriented vertical to the sheet of FIG. 5). Thus, the liquid crystal molecules 30a near the edge portion exhibit a two-step response behavior in response to a voltage application. In a display mode using linearly-polarized light, the second step, in which the azimuth angle of orientation changes slowly, changes the transmittance (brightness) and may not provide a sufficient effect of improving the response speed by locally reducing the cell gap above the edge portion of the unit solid portion 14a'. In a display mode using circularly-polarized light, by contrast, the change in the azimuth angle of the liquid crystal molecules 30a does not substantially influence the transmittance. Thus, a great effect of improving the response speed can be provided.

A display mode using circularly-polarized light can be realized by, for example, providing a circular polarization plate (e.g., a combination of a linear polarization plate and a λ/4 plate) on both sides of the liquid crystal layer 30.

Figure 6A:
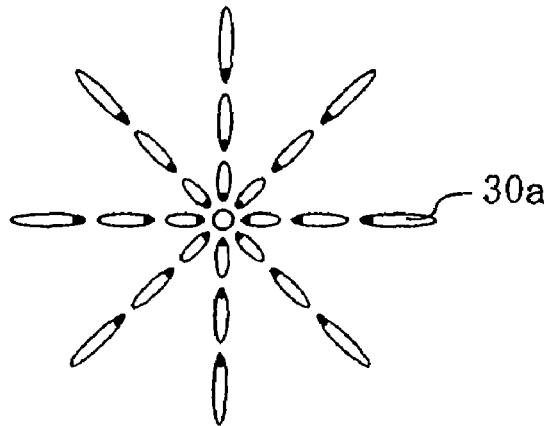
FIG. 6A to FIG. 6C schematically illustrate exemplary radially-inclined orientations of liquid crystal molecules.
Figure 6B:
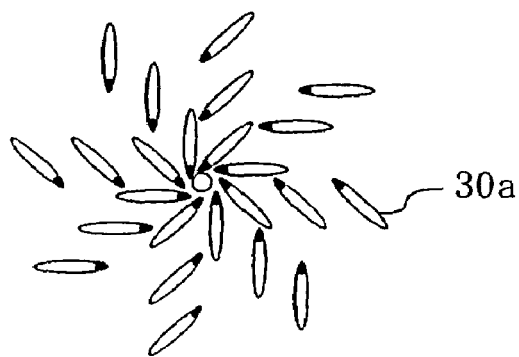
Figure 6C:
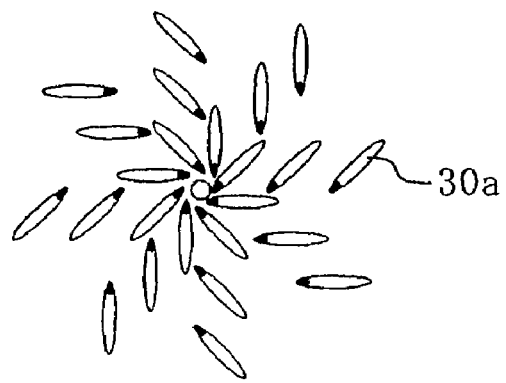

For the radially-inclined orientation of the liquid crystal molecules 30a, a radially-inclined orientation having a counterclockwise or clockwise spiral pattern, as illustrated in FIG. 6B or FIG. 6C respectively, is more stable than the simple radially-inclined orientation as illustrated in FIG. 6A. The spiral orientation is different from a normal twist orientation in which the orientation direction of the liquid crystal molecules 30a spirally changes along the thickness of the liquid crystal layer 30. In the spiral orientation, the orientation direction of the liquid crystal molecules 30a does not substantially change along the thickness of the liquid crystal layer 30 for a minute region. In other words, the orientation in a cross section (in a plane parallel to the layer plane) at any thickness of the liquid crystal layer 30 is as illustrated in FIG. 6B or FIG. 6C, with substantially no twist deformation along the thickness of the liquid crystal layer 30. For a liquid crystal domain as a whole, however, there may be a certain degree of twist deformation.

When a material obtained by adding a chiral agent to a nematic liquid crystal material having a negative dielectric anisotropy is used, the liquid crystal molecules 30a take a radially-inclined orientation of a counterclockwise or clockwise spiral pattern about the opening 14b1 or the unit solid portion 14a', as illustrated in FIG. 6B or FIG. 6C, respectively, in the presence of an applied voltage. Whether the spiral pattern is counterclockwise or clockwise is determined by the type of chiral agent used. Thus, by controlling the liquid crystal layer 30 above the opening 14b1 or the unit solid portion 14a' into a radially-inclined orientation of a spiral pattern in the presence of an applied voltage, the direction of the spiral pattern of the radially-inclined liquid crystal molecules 30a, about other liquid crystal molecules 30a standing vertical to the substrate plane, can be constant in all the liquid crystal domains. Therefore, it is possible to realize a uniform display without display non-uniformity. Since the direction of the spiral pattern around the liquid crystal molecules 30a standing vertical to the substrate plane is definite, the response speed upon application of a voltage across the liquid crystal layer 30 is also improved.

Moreover, when a larger amount of a chiral agent is added, the orientation of the liquid crystal molecules 30a changes in a spiral pattern along the thickness of the liquid crystal layer 30 as in a normal twisted orientation. Where the orientation of the liquid crystal molecules 30a does not change in a spiral pattern along the thickness of the liquid crystal layer 30, the liquid crystal molecules 30a which are oriented perpendicular or parallel to the polarization axis of the polarization plate do not give a phase difference to the incident light. Therefore, incident light passing through a region of such an orientation does not contribute to the transmittance. In contrast, where the orientation of the liquid crystal molecules 30a changes in a spiral pattern along the thickness of the liquid crystal layer 30, the liquid crystal molecules 30a that are oriented perpendicular or parallel to the polarization axis of the polarization plate also give a phase difference to the incident light, and the optical rotatory power can also be utilized. Therefore, incident light passing through a region of such an orientation also contributes to the transmittance. Thus, it is possible to obtain an LCD capable of producing a bright display.

FIG. 1A illustrates an example in which the unit solid portions 14a' each have a generally circular shape and the openings 14b1 each have a generally star-like shape and are arranged in a square lattice pattern. However, the shape of the unit solid portions 14a' and the shape and arrangement of the openings 14b1 are not limited to those of the example above.

Figure 7A:
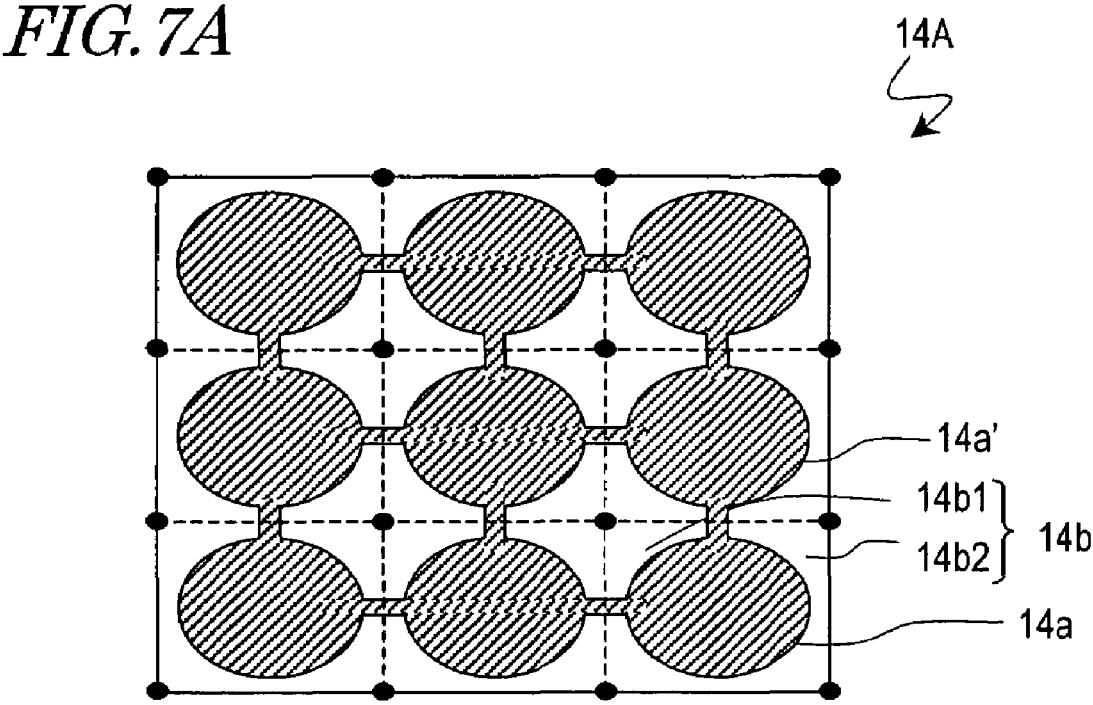
FIGS. 7A and 7B are plan views each schematically illustrating another picture element electrode usable in an LCD of the present invention.
Figure 7B:
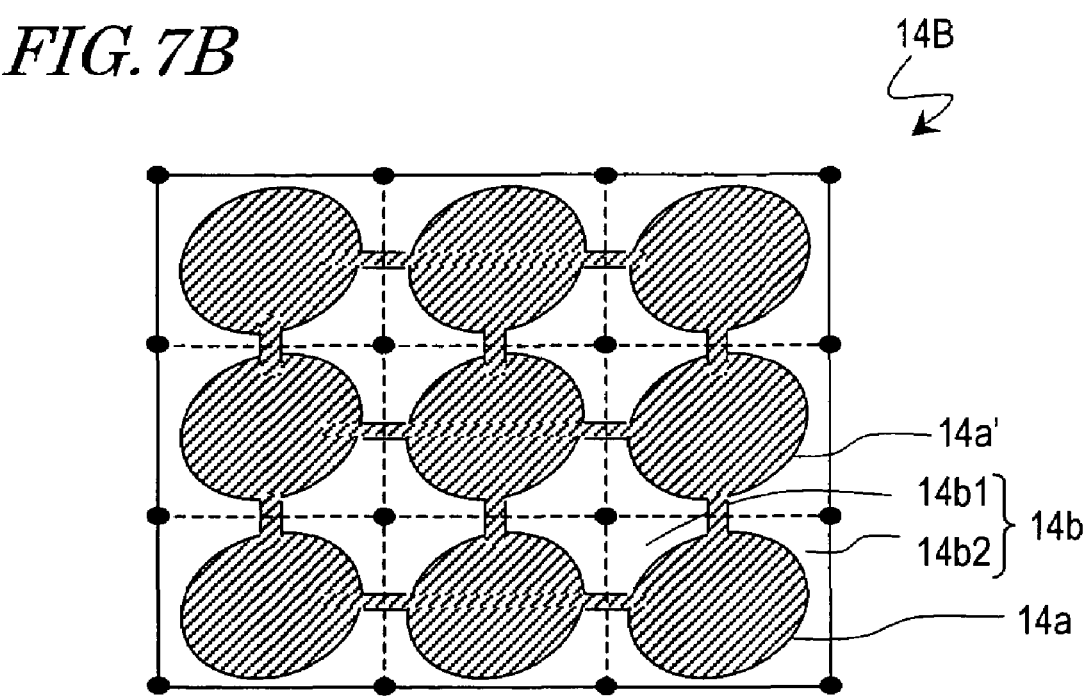

FIG. 7A and FIG. 7B are plan views respectively illustrating the picture element electrodes 14A and 14B having respective openings 14b1 and the unit solid portions 14a' of different shapes.

The openings 14b1 and the unit solid portions 14a' of the picture element electrodes 14A and 14B illustrated in FIG. 7A and FIG. 7B, respectively, are slightly distorted from the openings 14b1 and the unit solid portions 14a' illustrated in FIG. 1A. The openings 14b1 and the unit solid portions 14a' of the picture element electrodes 14A and 14B are regularly arranged so as to have a two-fold rotation axis (not a four-fold rotation axis) to form oblong rectangular unit lattices. In both of the picture element electrodes 14A and 14B, the openings 14b1 have a distorted star-like shape, and the unit solid portions 14a' have a generally elliptical shape (a distorted circular shape). The picture element electrodes 14A and 14B also provide an LCD having a high display quality and a desirable viewing angle characteristic.

Figure 8A:
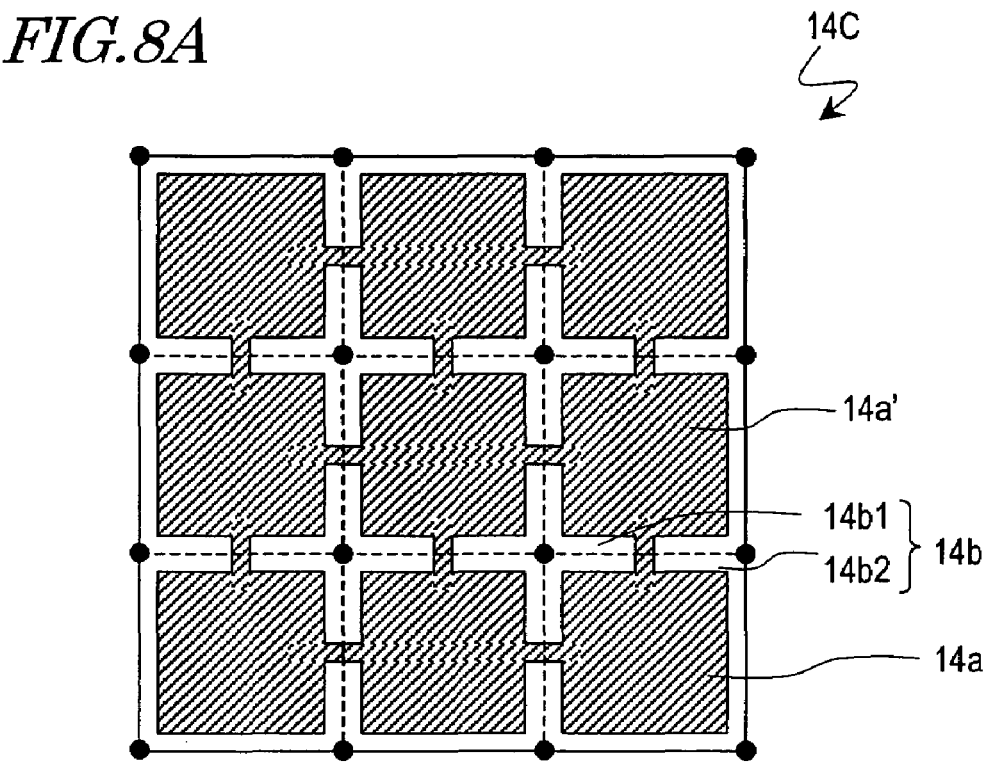
FIGS. 8A and 8B are plan views each schematically illustrating still another picture element electrode usable in an LCD of the present invention.
Figure 8B:
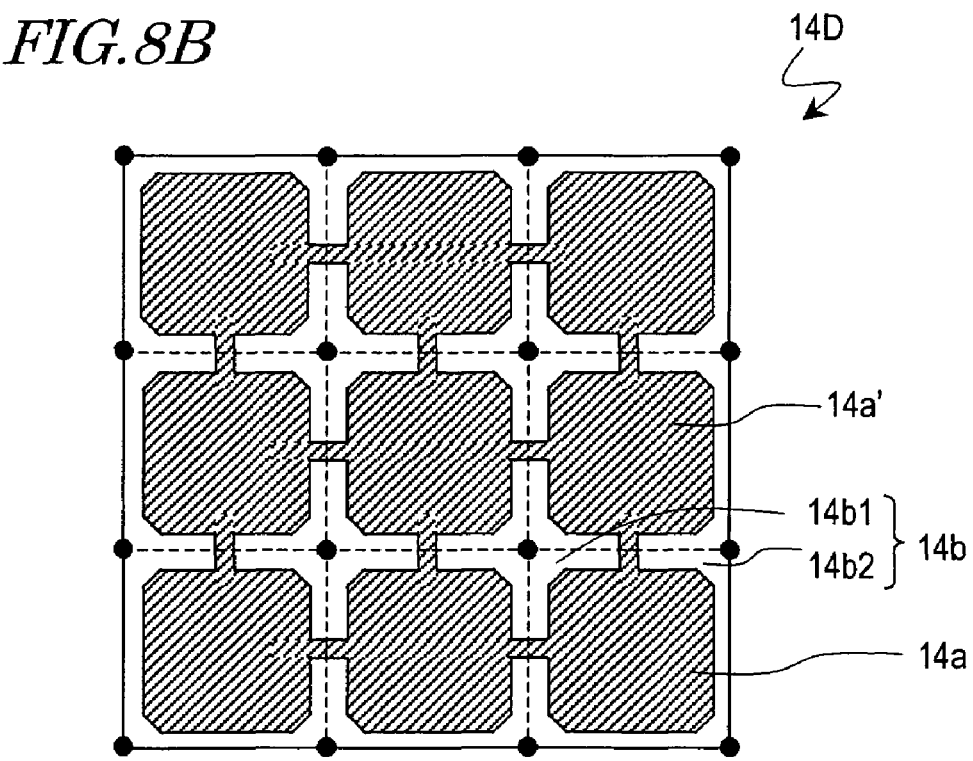

Moreover, picture element electrodes 14C and 14D as illustrated in FIG. 8A and FIG. 8B, respectively, are also usable.

In the picture element electrodes 14C and 14D, generally cross-shaped openings 14b1 are arranged in a square lattice pattern so that each unit solid portion 14a' has a generally square shape. Of course, these patterns may be distorted so that there are oblong rectangular unit lattices. As described above, an LCD having a high display quality and a desirable viewing angle characteristic can be obtained alternatively by regularly arranging the generally rectangular (encompassing square and oblong rectangular) unit solid portions 14a'.

Notably, the shape of the openings 14b1 and/or the unit solid portions 14a' is preferably a circle or an ellipse than a rectangle, in order to stabilize the radially-inclined orientation. A conceivable reason for this is that with a circular or elliptical shape, the edge of each opening 14b1 and/or each unit solid portion 14a' is more continuous (smooth) and thus the orientation direction of the liquid crystal molecules 30a changes more continuously (smoothly).

Figure 9A:
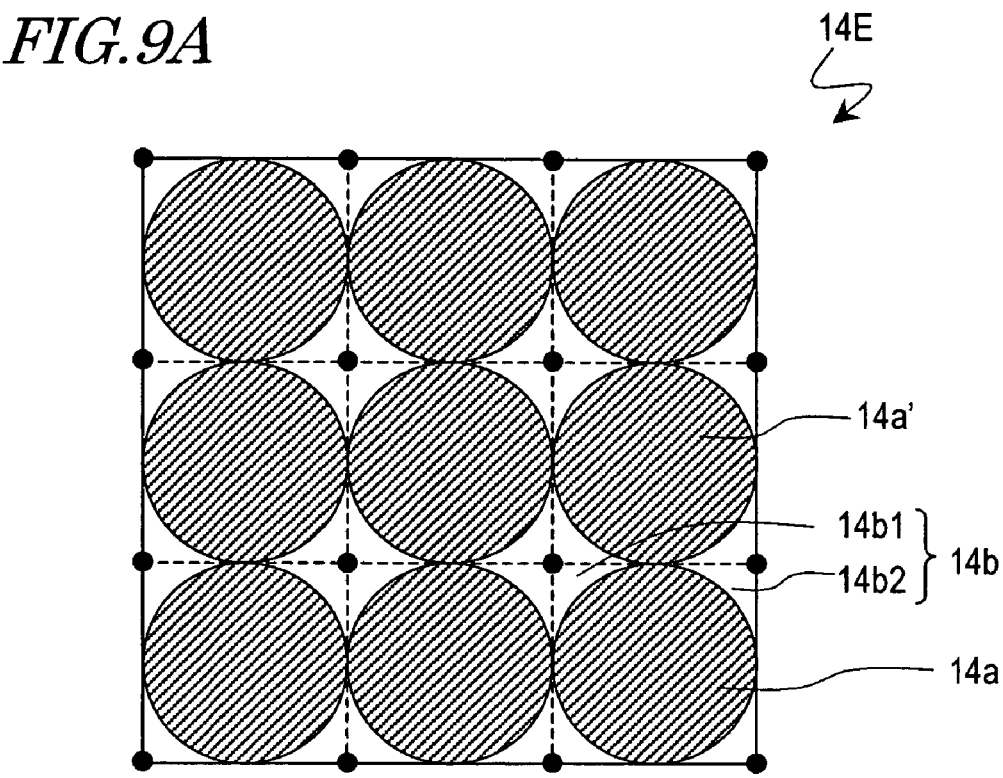
FIGS. 9A and 9B are plan views each schematically illustrating still another picture element electrode usable in an LCD of the present invention.
Figure 9B:
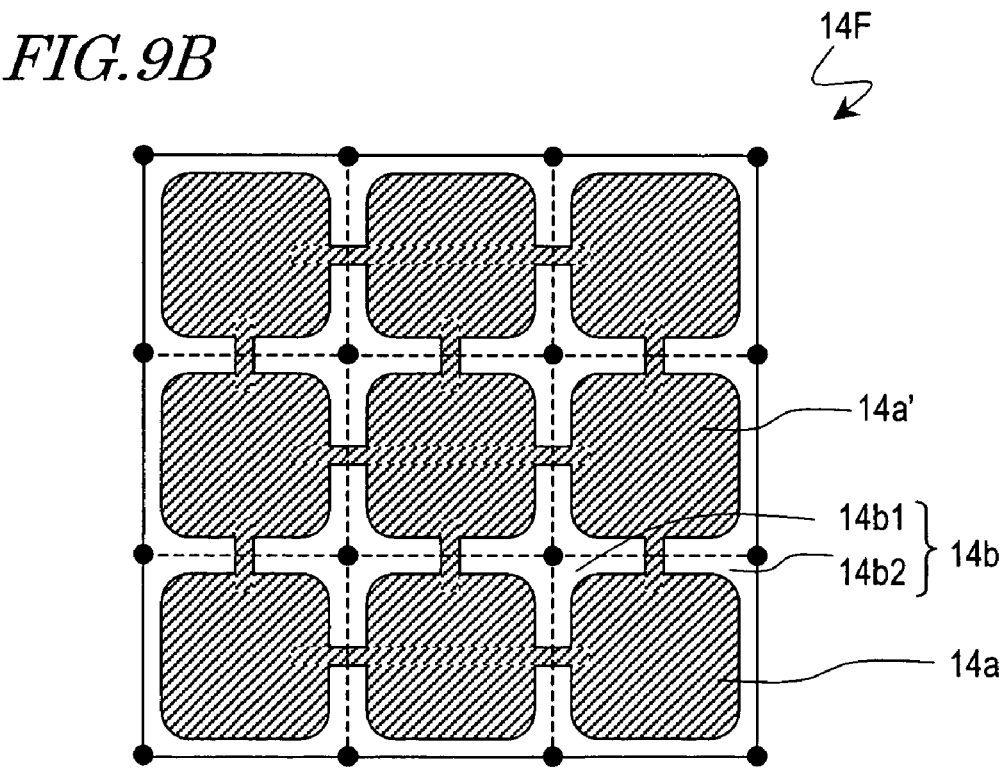

In view of the continuity of the orientation direction of the liquid crystal molecules 30a described above, picture element electrodes 14E and 14F as illustrated in FIG. 9A and FIG. 9B respectively are also usable. The picture element electrode 14E illustrated in FIG. 9A is a variation of the picture element electrode 14A illustrated in FIG. 1A, and has openings 14b1 defined only by four arcs. The picture element electrode 14F illustrated in FIG. 9B is a variation of the picture element electrode 14D illustrated in FIG. 8B, and the sides of the openings 14b1 bordered with the unit solid portions 14a' are in an arc. In both of the picture element electrodes 14E and 14F, the openings 14b1 and the unit solid portions 14a' are arranged in a square lattice pattern and have a four-fold rotation axis. Alternatively, as illustrated in FIG. 7A and FIG. 7B, the openings 14b1 and the unit solid portions 14a' may be distorted to be arranged in an oblong rectangular lattice pattern and to have a two-fold rotation axis.

Figure 10A:
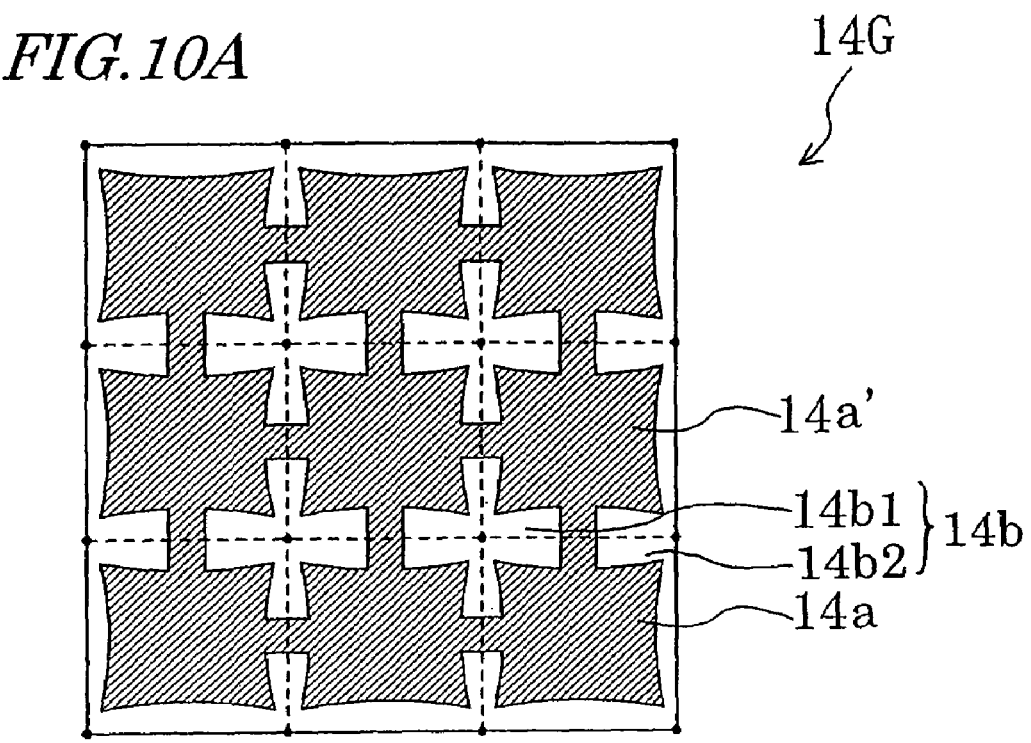
FIGS. 10A and 10B are plan views each schematically illustrating still another picture element electrode usable in an LCD of the present invention.
Figure 10B:
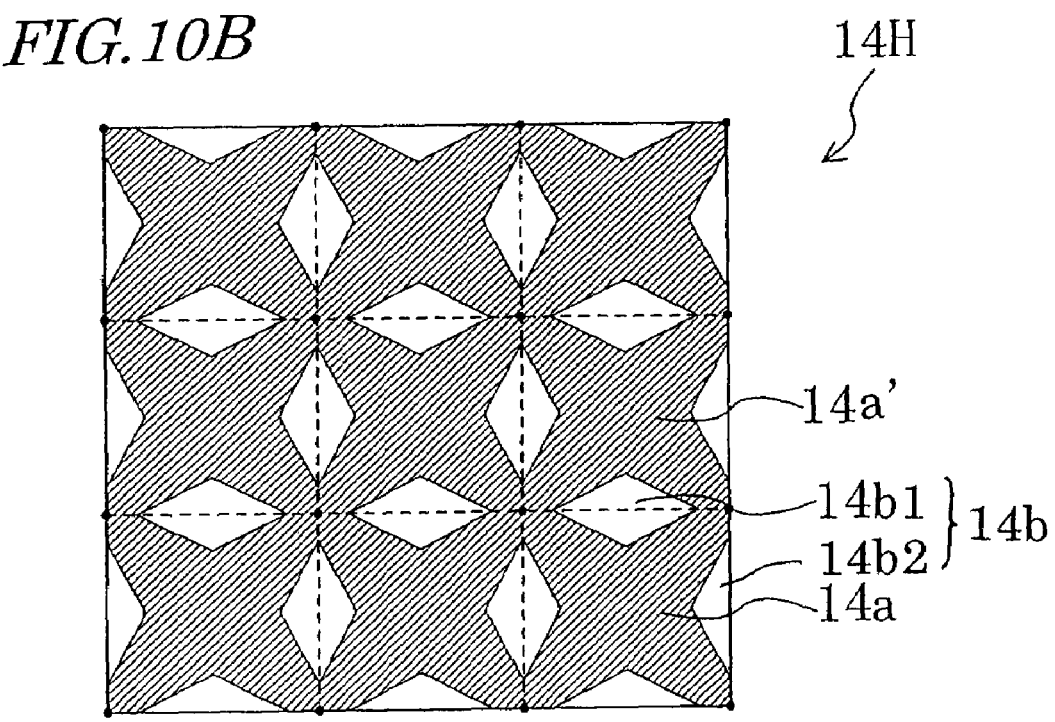

In view of the response speed, picture element electrodes 14G and 14H as illustrated in FIG. 10A and FIG. 10B respectively are also usable. The picture element electrode 14G illustrated in FIG. 10A is a variation of the picture element electrode 14C illustrated in FIG. 8A including generally square unit solid portions 14a'. In the picture element electrode 14G, the unit solid portions 14a' have a distorted square shape with acute angle corner portions. In the picture element electrode 14H illustrated in FIG. 10B, the unit solid portions 14a' have a generally star-like shape having eight sides (edges) with a four-fold rotation axis at the center thereof and also have four acute angle corner portions. The term "acute angle corner portion" as used herein refers to a corner or a rounded corner having an angle less than 90°.

When the unit solid portions 14a' have acute angle corner portions as illustrated in FIG. 10A and FIG. 10B, the number of edge portions in which an inclined electric field is generated is increased. Therefore, the inclined electric field acts on a greater number of liquid crystal molecules 30a. The number of liquid crystal molecules 30a that initially start inclining in response to an electric field is increased, thereby reducing the amount of time required for a radially-inclined orientation to be formed entirely across the picture element region. As a result, the response speed to the application of a voltage across the liquid crystal layer 30 is improved.

Moreover, when the unit solid portions 14a' have acute angle corner portions, the existence probability of the liquid crystal molecules 30a that are oriented in a particular azimuth angle direction can be increased (or decreased) as compared to the case where the unit solid portions 14a' have a generally circular shape or a generally rectangular shape. In other words, a high directivity can be introduced to the existence probabilities of the liquid crystal molecules 30a oriented in various azimuth angle directions. Therefore, when an acute angle corner is employed in the unit solid portions 14a' in an LCD including a polarization plate in which linearly-polarized light is incident upon the liquid crystal layer 30, it is possible to decrease the existence probability of the liquid crystal molecules 30a oriented vertical or horizontal to the polarization axis of the polarization plate, i.e., the liquid crystal molecules 30a that do not give a phase difference to the incident light. This improves the light transmittance and realizes a brighter display.

FIGS. 7A and 7B, 8A and 8B, 9A and 9B, and 10A and 10B illustrate a structure in which each picture element region includes a plurality of openings 14b1. Alternatively, as described with reference to FIG. 1B, a plurality of liquid crystal domains can be formed in each picture element region by providing one opening 14b1 in the picture element region, or by providing only a cut-out portions 14b2 with no opening 14b1. It is not absolutely necessary to form liquid crystal domains in region(s) corresponding to the opening(s) 14b1 of the picture element electrode 14. It is sufficient as long as liquid crystal domains taking a radially-inclined orientation are formed in correspondence with the solid portion 14a (unit solid portions 14a'). With this structure, even though the liquid crystal domains formed in correspondence with the openings 14b1 do not have a radially-inclined orientation, the continuity of the orientation of the liquid crystal molecules 30a is realized in the picture element region. Therefore, the radially-inclined orientation of the liquid crystal domains provided in correspondence with the solid portion 14a is stabilized. Especially when, as illustrated in FIG. 8A and FIG. 8B, the openings 14b1 have a small area, the degree of contribution of the openings 14b1 to the display is also small. Therefore, the decrease in the display quality caused by the absence of the liquid crystal domains taking a radially-inclined orientation in correspondence with the openings 14b1 is negligible.

Figure 11:
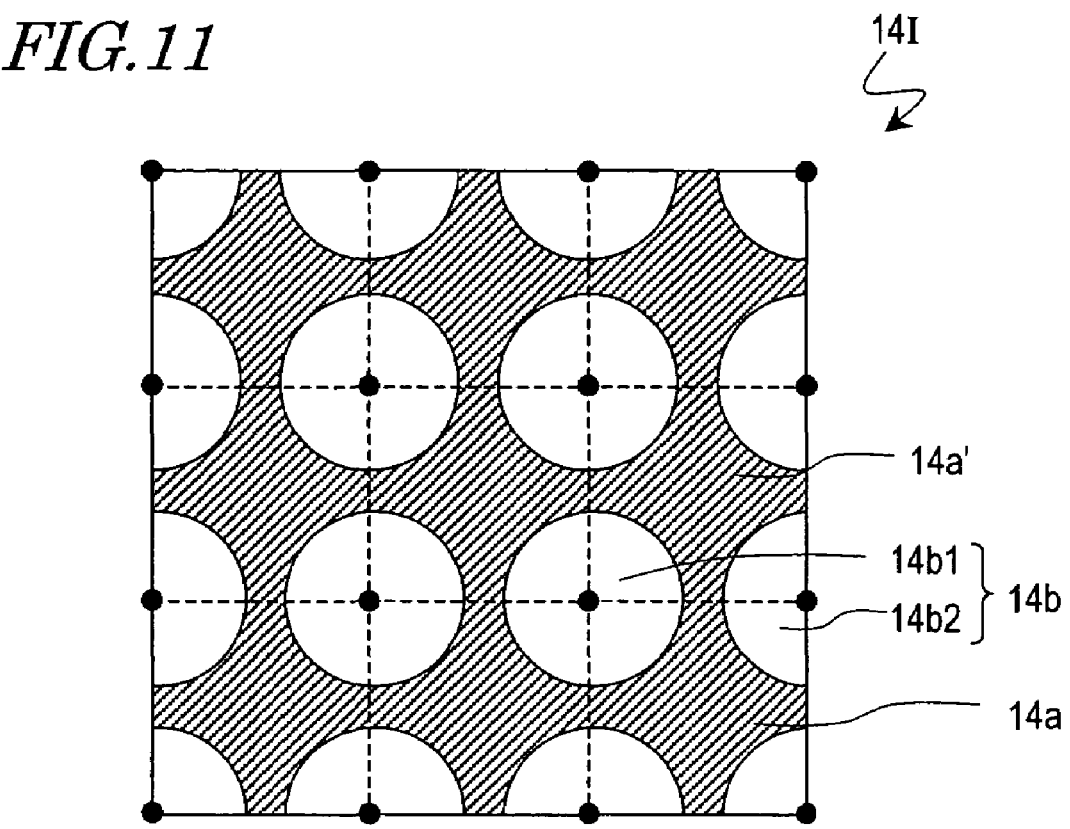
FIG. 11 is a plan view schematically illustrating still another picture element electrode usable in an LCD of the present invention.
Figure 12A:
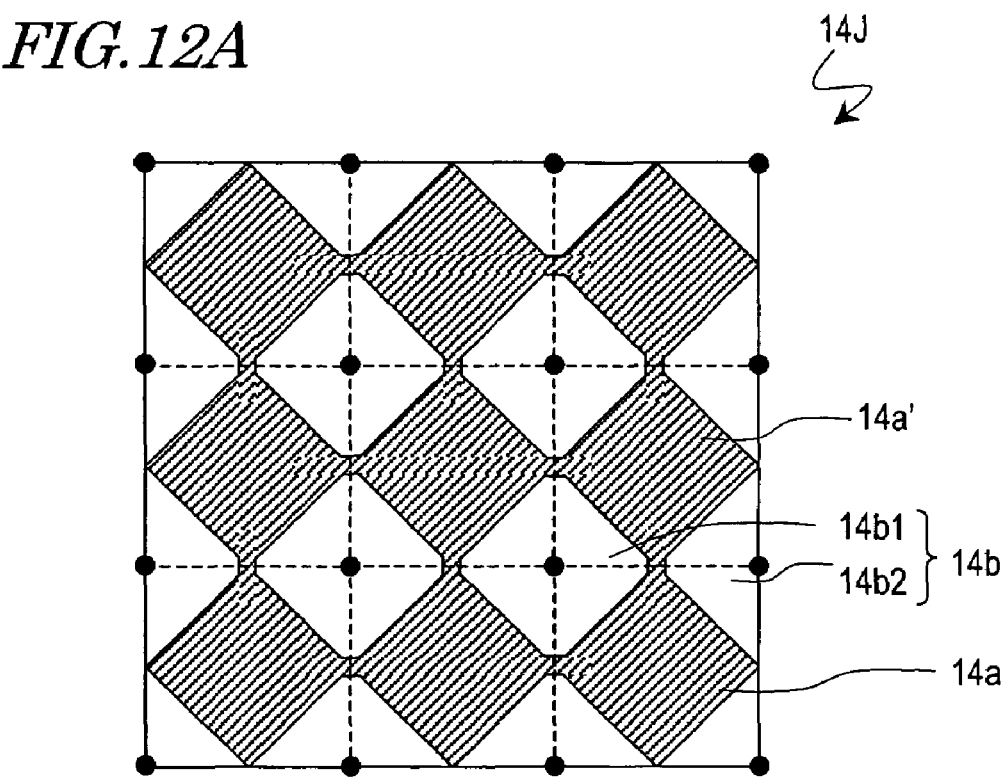
FIGS. 12A and 12B are plan views each schematically illustrating still another picture element electrode usable in an LCD of the present invention.
Figure 12B:
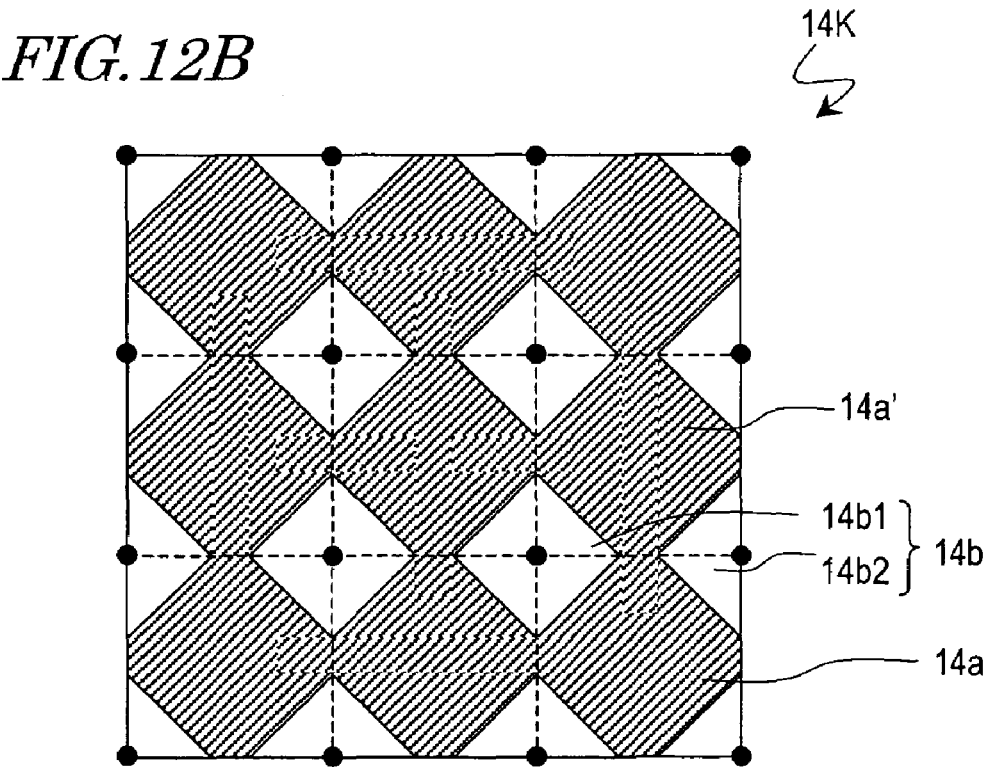

In the above-described examples, the openings 14b1 are generally star-shaped or generally cross-shaped and the unit solid portions 14a' are generally circular, generally elliptical, generally square (rectangular) or generally rectangular with rounded corners. Alternatively, the openings 14b1 and the unit solid portions 14a' may be inverted in a negative/positive manner. FIG. 11 is a plan view illustrating a picture element electrode 14I having a pattern in which the openings 14b1 and the unit solid portions 14a' of the picture element electrode 14 illustrated in FIG. 1A are inverted in a negative/positive manner. The picture element electrode 14I illustrated in FIG. 11 has substantially the same functions and effects as those of the picture element electrode 14 illustrated in FIG. 1A. FIG. 12A and FIG. 12B respectively illustrate a picture element electrode 14J and a picture element electrode 14K. The picture element electrode 14K has a pattern in which the openings 14b1 and the unit solid portions 14a' of the picture element electrode 14J are inverted in a negative/positive manner. Where the openings 14b1 and the unit solid portions 14a' are both generally square as in the case of the picture element electrodes 14J and 14K, the pattern obtained by the negative/positive inversion may result in the same pattern as the pre-inversion pattern.

Even in the case where the openings 14b1 and the unit solid portions 14a' in FIG. 1B are inverted as illustrated in FIG. 11, it is preferable to form cut-out portions 14b2 (each having a shape corresponding to about a half or a quarter of each opening 14b1) in the edge portions of the picture element electrode 14, such that the unit solid portions 14a' have rotational symmetry. With such a pattern, the effect by the inclined electric field is provided in the edge portions of the picture element region as in the central portions thereof, which realizes a stable radially-inclined orientation in the entirety of the picture element region.

With or without the negative/position inversion, the length of the boundary between the non-solid portion 14b and the solid portion 14a is the same. No difference is presented by the difference in these patterns in terms of the function of generating an inclined electric field. However, the area ratio of the unit solid portions 14a' with respect to the entire area of the picture element region may be different between these patterns. More specifically, the area of the unit solid portions 14a' for generating an electric field acting on the liquid crystal molecules 30a in the liquid crystal layer 30 (the area actually having the conductive film) may be different between these patterns.

The voltage applied across the liquid crystal domains formed in correspondence with the openings 14b1 is lower than the voltage applied across the liquid crystal domains formed in correspondence with the unit solid portions 14a'. Therefore, with a normally black display, the display provided by the liquid crystal domains in correspondence with the openings 14b1 is darker. Thus, it is preferable to decrease the area ratio of the non-solid portion 14b and increase the area ratio of the unit solid portions 14a' in each picture element region.

Now, the relationship between the shape of the unit solid portions 14a' with the stability of a radially-inclined orientation and the transmittance value will be described.

A research by the present inventor revealed that with the spacing (arrangement pitch) of the unit solid portions 14a' being constant, the orientation stability is higher as the shape of the unit solid portions 14a' is closer to a circle or an ellipse. This is because as the shape of the unit solid portions 14a' is closer to a circle or an ellipse, the continuity in the orientation direction of the liquid crystal molecules 30a in a radially-inclined orientation is higher.

It was also revealed that the transmittance is higher as the shape of the unit solid portions 14a' is closer to a rectangle such as a square or an oblong rectangle. This is because as the shape of the unit solid portions 14a' is closer to a rectangle, the area ratio of the unit solid portions 14a' is higher, thereby increasing the area of the liquid crystal layer that is directly influenced by the electric field produced by the electrodes (the area defined in the plane perpendicular to the substrate normal direction) and thus increasing the effective aperture ratio.

Therefore, the shape of the unit solid portion 14a' can be determined in view of the intended orientation stability and the intended transmittance.

When each unit solid portion 14a' has a generally square shape with generally arc-shaped corner portions, as illustrated in FIG. 9B, it is possible to realize both of a relatively high orientation stability and a relatively high transmittance. Of course, substantially the same effects can be obtained when the unit solid portions 14a' have a generally rectangular shape with generally arc-shaped corner portions. Note that due to limitations on the production process, the corner portions of the unit solid portions 14a' formed of a conductive film may not be arc-shaped strictly speaking, but may instead be an obtuse polygonal shape (a shape including a plurality of angles exceeding 90°), and the corner portions may have a slightly distorted arc shape (e.g., a portion of an ellipse) or a distorted polygonal shape, instead of a quarter-arc shape or a regular polygonal shape (e.g., a portion of a regular polygon).

Alternatively, the corner portions may have a shape that is a combination of curves and an obtuse angle. The term "generally arc shape" as used herein encompasses any of these shapes. Note that due to similar process-related reasons, the generally-circular unit solid portions 14a' as illustrated in FIG. 1A may have a polygonal shape or a distorted shape instead of a strictly circular shape.

For the LCD 100 in this embodiment, the same structure as that of a known vertical alignment type LCD can be adopted except that the picture element electrode 14 is patterned in a predetermined manner so as to include a solid portion 14a and a non-solid portion 14b and that the thickness $d_1$ of the liquid crystal layer 30 above the edge portion of the unit solid portion 14a' is smaller than the thickness $d_2$ of the liquid crystal layer 30 above the remaining portion of the unit solid portion 14a'. Thus, the LCD 100 can be produced using a known production method.

Typically, a vertical alignment film (not shown) as a vertical alignment layer is provided on one side of each of the picture element electrode 14 and the counter electrode 22 that is closer to the liquid crystal layer 30, so as to vertically align the liquid crystal molecules having a negative dielectric anisotropy.

The liquid crystal material may be a nematic liquid crystal material having a negative dielectric anisotropy. A guest-host mode LCD can be obtained by adding a dichroic dye to a nematic liquid crystal material having a negative dielectric anisotropy. A guest-host mode LCD does not require a polarization plate.

A so-called "vertical alignment type LCD", including a liquid crystal layer in which liquid crystal molecules having a negative dielectric anisotropy are vertically aligned in the absence of an applied voltage, is capable of displaying an image in various display modes. For example, a vertical alignment type LCD may be used in a birefringence mode in which an image is displayed by controlling the birefringence of the liquid crystal layer with an electric field, an optical rotation mode, or in a display mode that is a combination of an optical rotation mode and a birefringence mode. It is possible to obtain a birefringence-mode LCD by providing a pair of polarization plates on the outer side (the side away from the liquid crystal layer 30) of the pair of substrates (e.g., the TFT substrate and the counter substrate) of any of the LCDs described above. Moreover, a phase difference compensator (typically a phase plate) may be provided as necessary. In order to obtain a superb response characteristic by suppressing the two-step response behavior, it is preferable to use the display mode using circularly-polarized light mentioned above.

Embodiment 2

An LCD of the present embodiment is different from the LCD 100 of Embodiment 1 in that the counter substrate includes an orientation-regulating structure.

FIG. 13A to FIG. 13E each schematically illustrate a counter substrate 200b having an orientation-regulating structure 28. Each element having substantially the same function as that in the LCD 100 will be denoted by the same reference numeral and will not be further described.

Figure 13A:
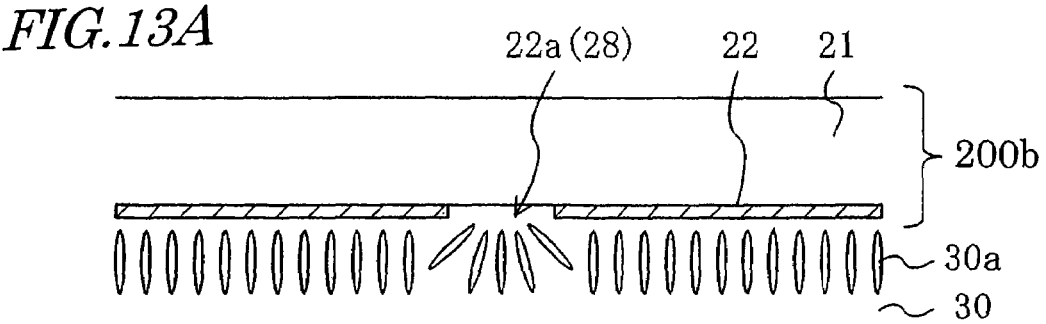
FIG. 13A to FIG. 13E each schematically illustrate a counter substrate 200b including an orientation-regulating structure 28.
Figure 13B:
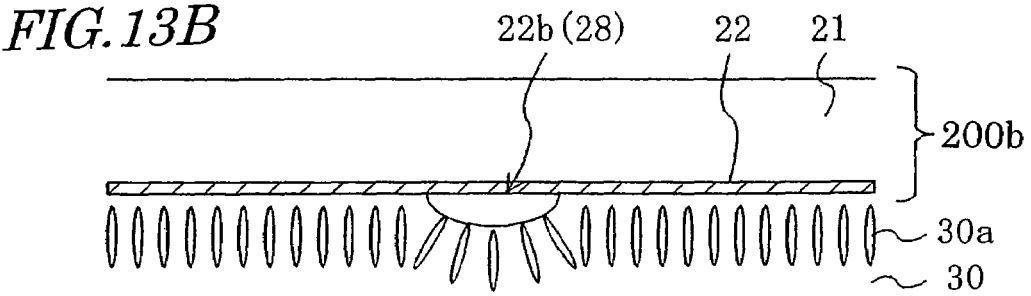
Figure 13C:
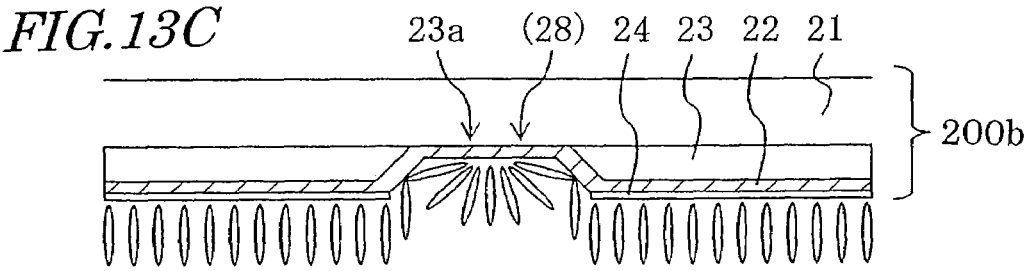
Figure 13D:
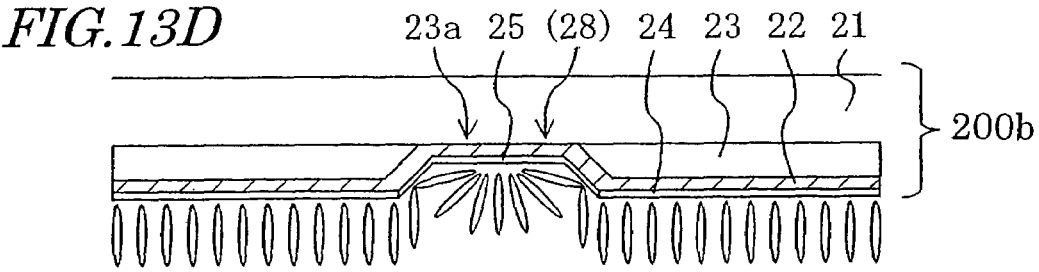
Figure 13E:
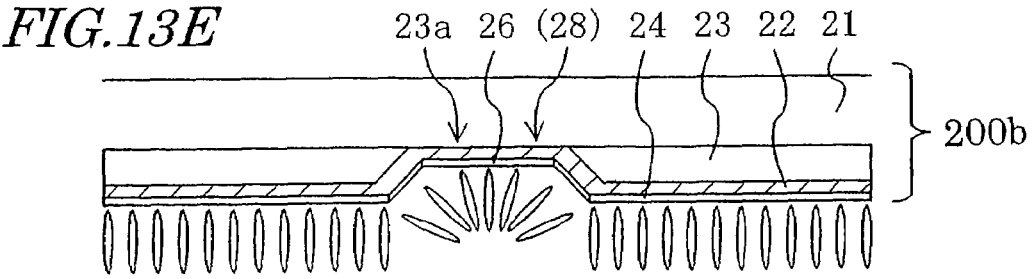

Each of the orientation-regulating structures 28 illustrated in FIG. 13A to FIG. 13E functions to orient the liquid crystal molecules 30a of the liquid crystal layer 30 into a radially-inclined orientation. Note that the orientation-regulating structure 28 illustrated in FIG. 13A to FIG. 13D and that illustrated in FIG. 13E are different in terms of the direction in which the liquid crystal molecules 30a are to be inclined.

The direction in which the liquid crystal molecules 30a are inclined by the orientation-regulating structures 28 illustrated in FIG. 13A to FIG. 13D is aligned with the orientation direction of the radially-inclined orientation of each liquid crystal domain that is formed in a region corresponding to the unit solid portion 14a' (see, for example, FIG. 1A and FIG. 1B) of the picture element electrode 14. In contrast, the direction in which the liquid crystal molecules 30a are inclined by the orientation-regulating structure 28 illustrated in FIG. 13E is aligned with the orientation direction of the radially-inclined orientation of each liquid crystal domain that is formed in a region corresponding to the opening 14b1 (see, for example, FIG. 1A and FIG. 1B) of the picture element electrode 14.

The orientation-regulating structure 28 illustrated in FIG. 13A is formed by an opening 22a of the counter electrode 22. A vertical alignment film (not shown) is provided on one surface of the counter substrate 200b that is closer to the liquid crystal layer 30.

The orientation-regulating structure 28 exerts an orientation-regulating force only in the presence of an applied voltage. Since the orientation-regulating structure 28 is only required to exert an orientation-regulating force upon the liquid crystal molecules 30a in each liquid crystal domain in a radially-inclined orientation formed by the electrode structure of the TFT substrate 100a, the size of the opening 22a is smaller than the opening 14b1 provided in the TFT substrate 100a, and is smaller than the unit solid portion 14a' (see, for example, FIG. 1A). A sufficient effect can be obtained, for example, only with an area less than or equal to one half of that of the opening 14b1 or the unit solid portion 14a'. When the opening 22a of the counter electrode 22 is provided so as to oppose the central portion of the unit solid portion 14a' of the picture element electrode 14, the continuity of the orientation of the liquid crystal molecules 30a increases, and the position of the central axis of the radially-inclined orientation can be fixed.

As described above, when a structure exerting an orientation-regulating force only in the presence of an applied voltage is employed as the orientation-regulating structure, substantially all of the liquid crystal molecules 30a of the liquid crystal layer 30 take a vertical alignment in the absence of an applied voltage. Therefore, when employing a normally black mode, substantially no light leakage occurs in a black display, thereby realizing a display with a desirable contrast ratio.

However, in the absence of an applied voltage, the orientation-regulating force is not exerted and thus the radially-inclined orientation is not formed. Moreover, when the applied voltage is low, there is only a weak orientation-regulating force. In a consequence, an after image may be observed when a considerably large stress is applied upon the liquid crystal panel.

Each of the orientation-regulating structures 28 illustrated in FIG. 13B to FIG. 13D exerts an orientation-regulating force regardless of the presence/absence of an applied voltage. Thus, a stable radially-inclined orientation can be obtained at any display gray level, and a high resistance to a stress is provided.

The orientation-regulating structure 28 illustrated in FIG. 13B includes a protrusion (rib) 22b that is provided on the counter electrode 22 so as to protrude into the liquid crystal layer 30. While there is no particular limitation on the material of the protrusion 22b, the protrusion 22b can be easily formed by using a dielectric material such as a resin. A vertical alignment film (not shown) is provided on one surface of the counter substrate 200b that is closer to the liquid crystal layer 30. The protrusion 22b orients the liquid crystal molecules 30a into a radially-inclined orientation by virtue of the configuration of the surface thereof (with a vertical alignment power). It is preferred to use a resin material that deforms by heat, in which case it is possible to easily form the protrusion 22b having a slightly-humped cross section as illustrated in FIG. 13B through a heat treatment after patterning. The protrusion 22b having a slightly-humped cross section with a vertex (e.g., a portion of a sphere) as illustrated in FIG. 13B or a conical protrusion provides a superb effect of fixing the central position of the radially-inclined orientation.

The orientation-regulating structure 28 illustrated in FIG. 13C is provided as a horizontal alignment surface, facing the liquid crystal layer 30, that is provided in an opening (or a depressed portion) 23a in a dielectric layer 23 formed under the counter electrode 22 (i.e., on one side of the counter electrode 22 that is closer to the substrate 21). The horizontal alignment surface is provided by forming a vertical alignment film 24 so as to cover one side of the counter substrate 200b that is closer to the liquid crystal layer 30 but not to cover a region corresponding to the opening 23a. Alternatively, a horizontal alignment film 25 may be provided only in the opening 23a as illustrated in FIG. 13D.

The horizontal alignment film illustrated in FIG. 13D may be provided by, for example, once providing the vertical alignment film 24 across the entire surface of the counter substrate 200b, and then selectively irradiating a portion of the vertical alignment film 24 in the opening 23a with UV light so as to reduce the vertical alignment power thereof. The horizontal orientation power required for the orientation-regulating structure 28 does not have to be so high that the resulting pretilt angle is as small as that resulting from an alignment film used in a TN type LCD. For example, a pretilt angle of 45° or less is sufficient.

As illustrated in FIG. 13C and FIG. 13D, on the horizontal orientation surface in the opening 23a, the liquid crystal molecules 30a are urged to be horizontal with respect to the substrate plane. As a result, the liquid crystal molecules 30a form an orientation that is continuous with the orientation of the surrounding, vertically aligned liquid crystal molecules 30a on the vertical alignment film 24, thereby obtaining a radially-inclined orientation as illustrated in FIG. 13C and FIG. 13D.

A radially-inclined orientation can be obtained only by selectively providing a horizontal orientation surface (e.g., the surface of the electrode, or a horizontal alignment film) on the flat surface of the counter electrode 22 without providing a depressed portion (that is formed by the opening in the dielectric layer 23) on the surface of the counter electrode 22. However, the radially-inclined orientation can be further stabilized by virtue of the surface configuration of the depressed portion.

It is preferred to use, for example, a color filter layer or an overcoat layer of a color filter layer as the dielectric layer 23 to form the depressed portion in the surface of the counter substrate 200b that is closer to the liquid crystal layer 30, because it does not increase the number of production steps. In the structures illustrated in FIG. 13C and FIG. 13D, the light utilization efficiency decreases very little because there is no region where a voltage is applied across the liquid crystal layer 30 via the protrusion 22b unlike in the structure illustrated in FIG. 13B.

In the orientation-regulating structure 28 illustrated in FIG. 13E, a depressed portion is formed on one side of the counter substrate 200b that is closer to the liquid crystal layer 30 by using the opening 23a of the dielectric layer 23, as in the orientation-regulating structure 28 illustrated in FIG. 13D, and a horizontal alignment film 26 is formed only in the bottom portion of the depressed portion. Instead of forming the horizontal alignment film 26, the surface of the counter electrode 22 may be exposed as illustrated in FIG. 13C.

Figure 14A:
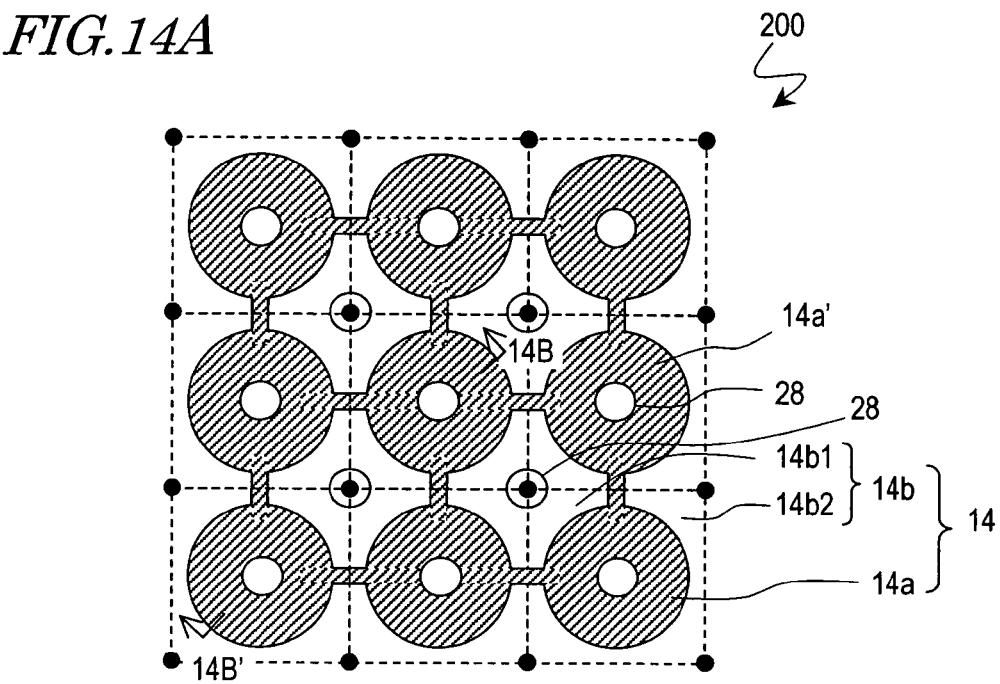
Figure 14B:
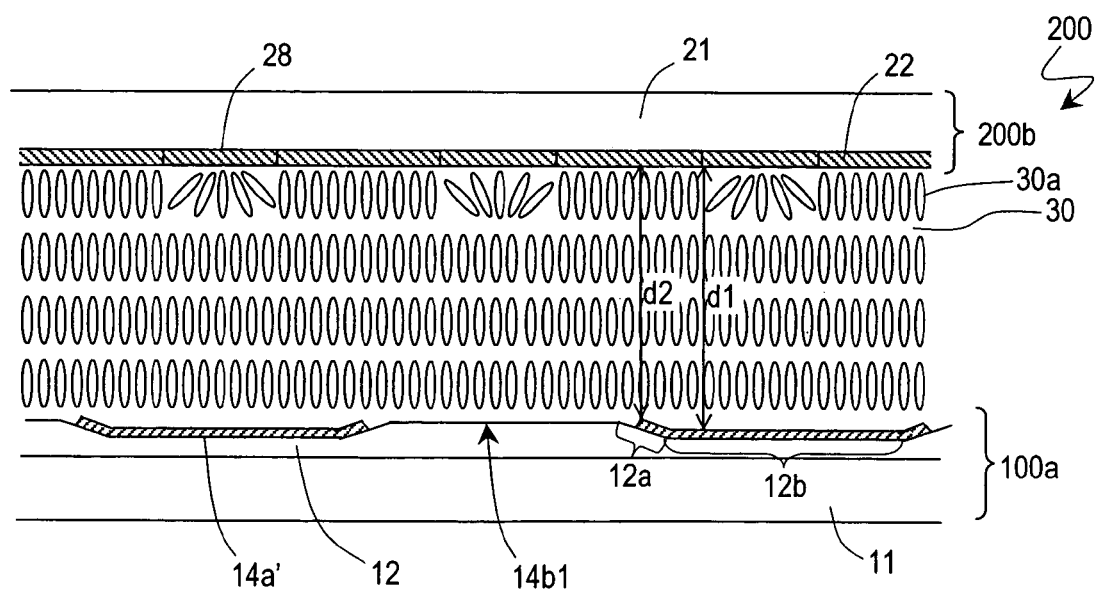

An LCD 200 having any of the orientation-regulating structures as described above is shown in FIG. 14A and FIG. 14B. FIG. 14A is a plan view, and FIG. 14B is a cross-sectional view taken along line 14A-14A' of FIG. 14A.

The LCD 200 includes the TFT substrate 100a having the picture element electrode 14 including a solid portion 14a and a non-solid portion 14b, and the counter substrate 200b having the orientation-regulating structure 28. The structure of the TFT substrate 100a is not limited to the structure illustrated here, but may be any other structure described above. Moreover, while a structure that exerts an orientation-regulating force even in the absence of an applied voltage (FIG. 13B to FIG. 13D and FIG. 13E) will be used as the orientation-regulating structure 28, the orientation-regulating structure 28 illustrated in FIG. 13B to FIG. 13D can be replaced with that illustrated in FIG. 13A.

Among the orientation-regulating structures 28 provided in the counter substrate 200b of the LCD 200, the orientation-regulating structure 28 provided around the center of a region opposing the solid portion 14a of the picture element electrode 14 is one of those illustrated in FIG. 13B to FIG. 13D, and the orientation-regulating structure 28 provided around the center of a region opposing the non-solid portion 14b of the picture element electrode 14 is the one illustrated in FIG. 13E.

Figure 15A:
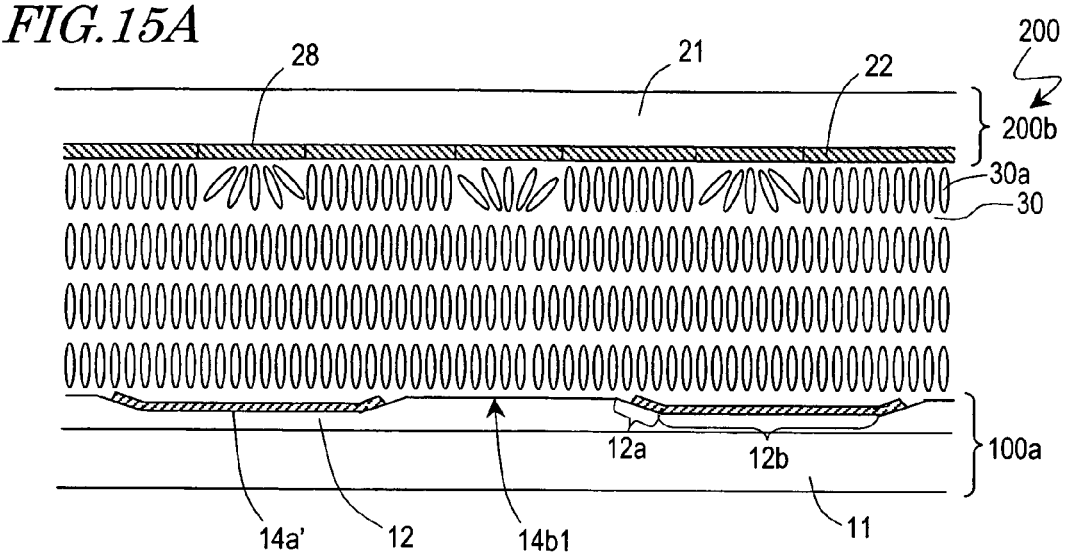
Figure 15B:
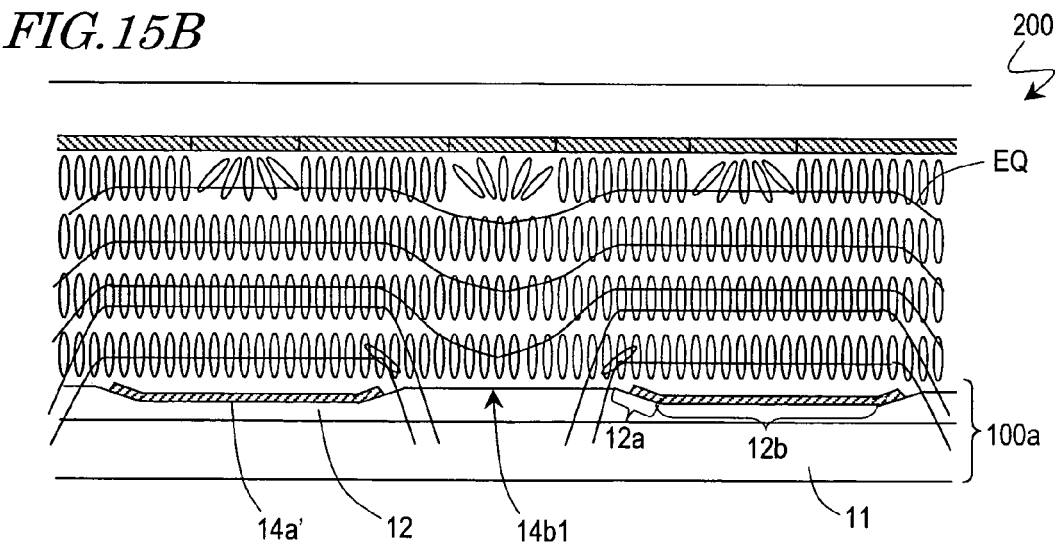
Figure 15C:
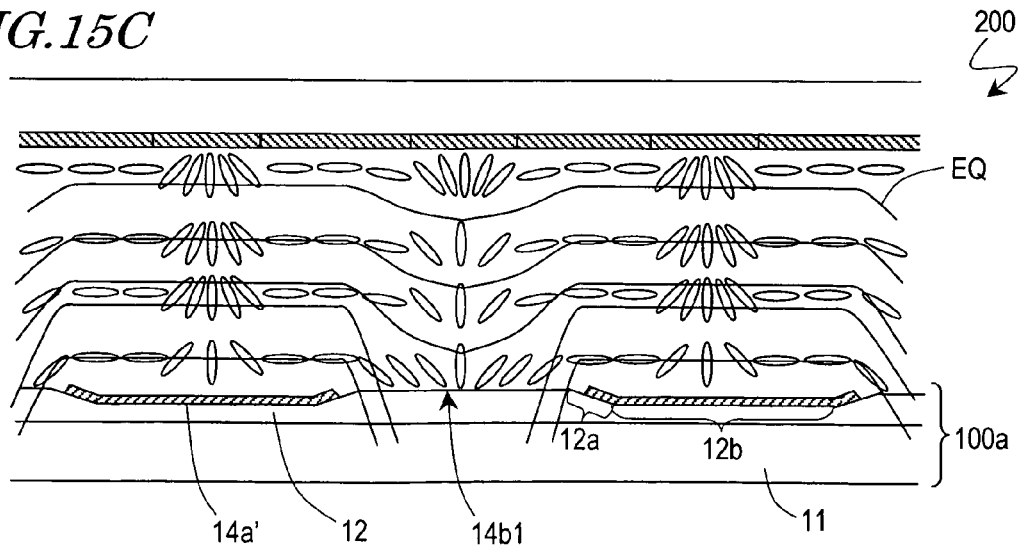

With such an arrangement, in the presence of an applied voltage across the liquid crystal layer 30, i.e., in the presence of an applied voltage between the picture element electrode 14 and the counter electrode 22, the direction of the radially-inclined orientation formed by the unit solid portion 14a' of the picture element electrode 14 is aligned with the direction of the radially-inclined orientation formed by the orientation-regulating structure 28, thereby stabilizing the radially-inclined orientation. This is schematically shown in FIG. 15A to FIG. 15C. FIG. 15A illustrates a state in the absence of an applied voltage, FIG. 15B illustrates a state where the orientation has just started to change (initial ON state) after application of a voltage, and FIG. 15C schematically illustrates a steady state during the voltage application.

As illustrated in FIG. 15A, the orientation-regulating force exerted by the orientation-regulating structure 28 (FIG. 13B to FIG. 13D) acts upon the liquid crystal molecules 30a in the vicinity thereof even in the absence of an applied voltage, thereby forming a radially-inclined orientation.

When voltage application begins, an electric field represented by equipotential lines EQ shown in FIG. 15B is produced (by the electrode structure of the TFT substrate 100a), and a liquid crystal domain in which the liquid crystal molecules 30a are in a radially-inclined orientation is formed in each region corresponding to the opening 14b1 and each region corresponding to the unit solid portion 14a', and the liquid crystal layer 30 reaches a steady state as illustrated in FIG. 15C. The inclination direction of the liquid crystal molecules 30a in each liquid crystal domain coincides with the direction in which the liquid crystal molecules 30a are inclined by the orientation-regulating force exerted by the orientation-regulating structure 28 that is provided in a corresponding region.

When a stress is applied upon the LCD 200 in a steady state, the radially-inclined orientation of the liquid crystal layer 30 once collapses, but upon removal of the stress, the radially-inclined orientation is restored because of the orientation-regulating forces by the unit solid portion 14a' and the orientation-regulating structure 28 acting upon the liquid crystal molecules 30a. Therefore, the occurrence of an after image due to a stress is suppressed. When the orientation-regulating force by the orientation-regulating structure 28 is excessively strong, retardation occurs even in the absence of an applied voltage due to the radially-inclined orientation, which may decrease the display contrast ratio. However, the orientation-regulating force by the orientation-regulating structure 28 does not have to be strong because it is only required to have an effect of stabilizing a radially-inclined orientation formed by an inclined electric field and fixing the central axis position thereof. Therefore, an orientation-regulating force that would not cause such a degree of retardation as to deteriorate the display quality is sufficient.

For example, when the protrusions (ribs) 22b illustrated in FIG. 13B are employed, each protrusion 22b may have a diameter of about 15 μm and a height (thickness) of about 1 μm for the unit solid portion 14a' having a diameter of about 30 μm to about 35 μm. With such protrusions, a sufficient orientation-regulating force can be obtained and the reduction in the contrast ratio due to retardation can be suppressed to a practical level.

Figure 16A:
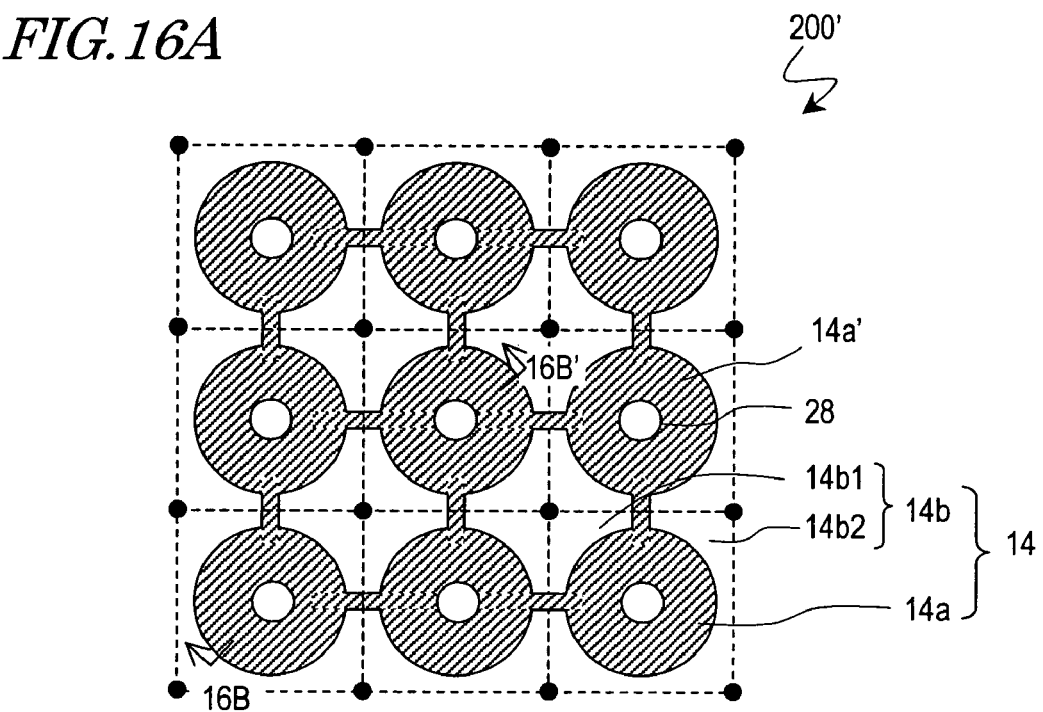
Figure 16B:
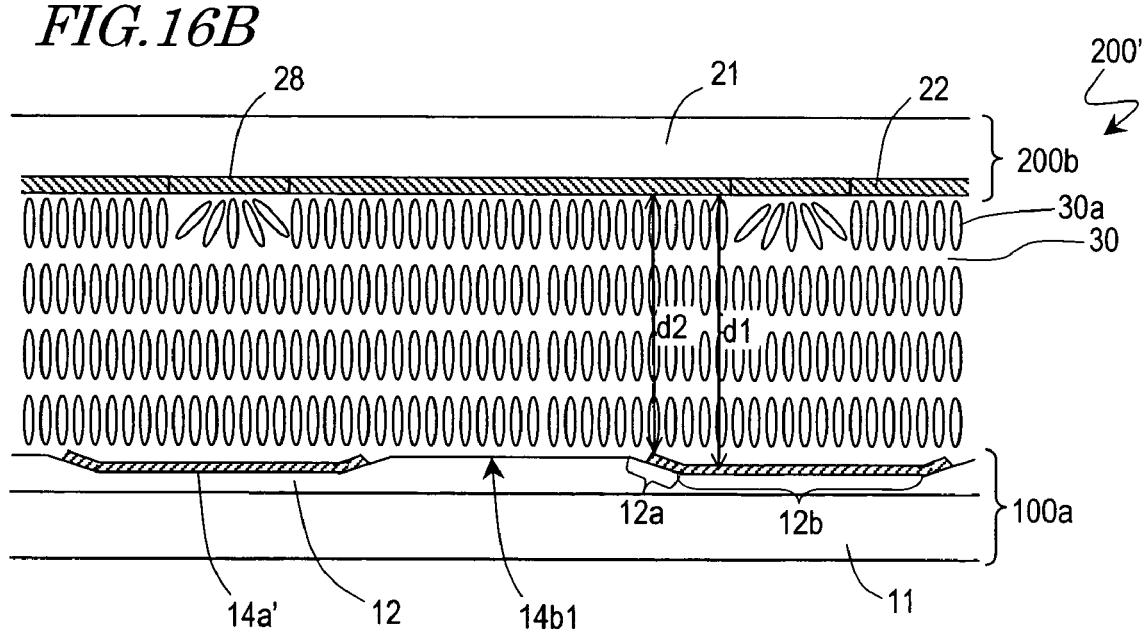

FIG. 16A and FIG. 16B illustrate another LCD 200' including an orientation-regulating structure.

The LCD 200' does not have the orientation-regulating structure in a region opposing the opening 14b1 of the picture element electrode 14. Formation of the orientation-regulating structure 28 illustrated in FIG. 13E which should be formed in a region opposing the opening 14b1 introduces difficulties into the process. Therefore, in view of the productivity, it is preferred to use only one of the orientation-regulating structures 28 illustrated in FIG. 13A to FIG. 13D. Particularly, the orientation-regulating structure 28 illustrated in FIG. 13B is preferred because it can be produced by a simple process.

Figure 17A:
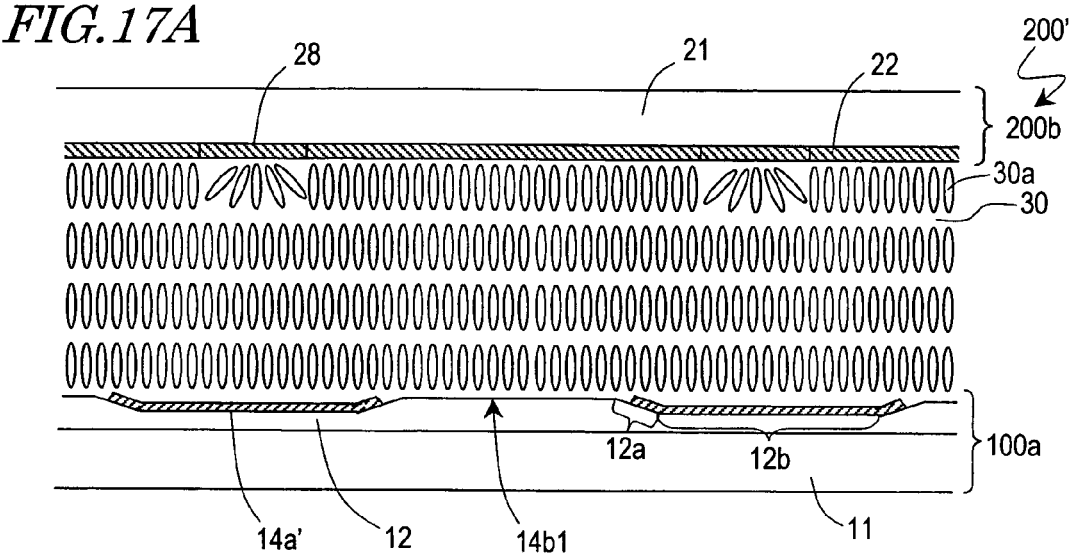
Figure 17B:
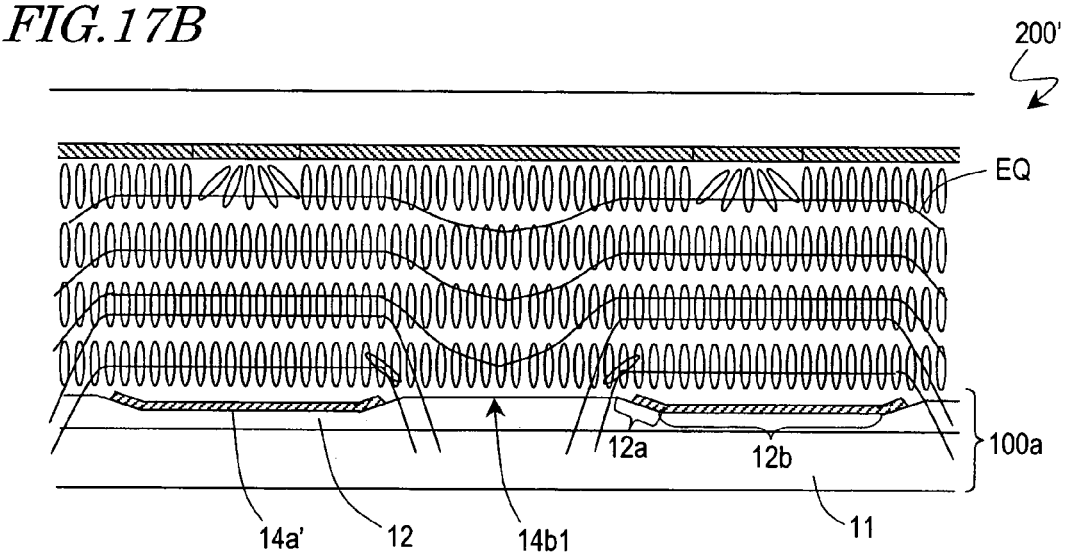
Figure 17C:
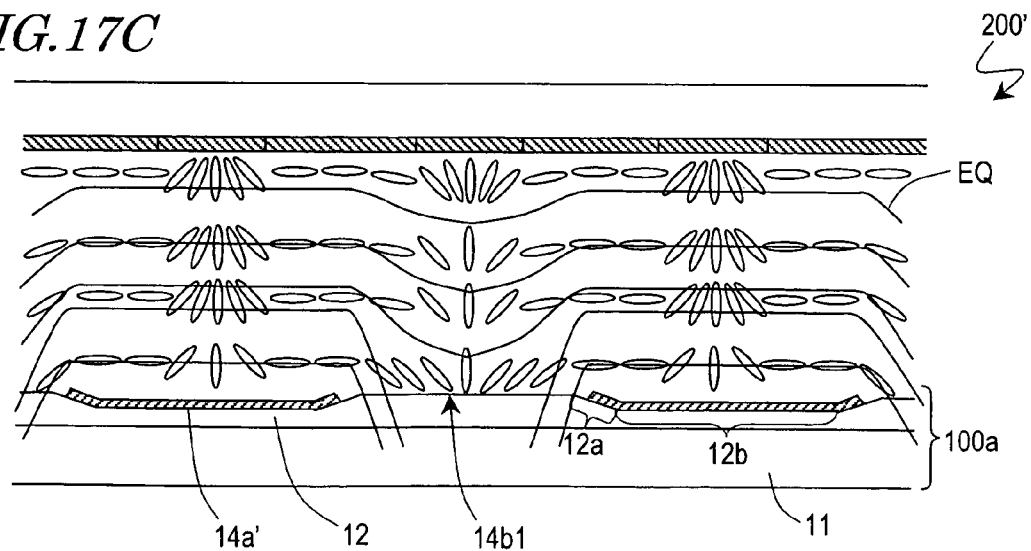

Even if no orientation-regulating structure is provided in a region corresponding to the opening 14b1 as in the LCD 200', substantially the same radially-inclined orientation as that of the LCD 200 is obtained, as schematically illustrated in FIG. 17A to FIG. 17C, and also the stress resistance thereof is at a practical level.

Figure 18A:
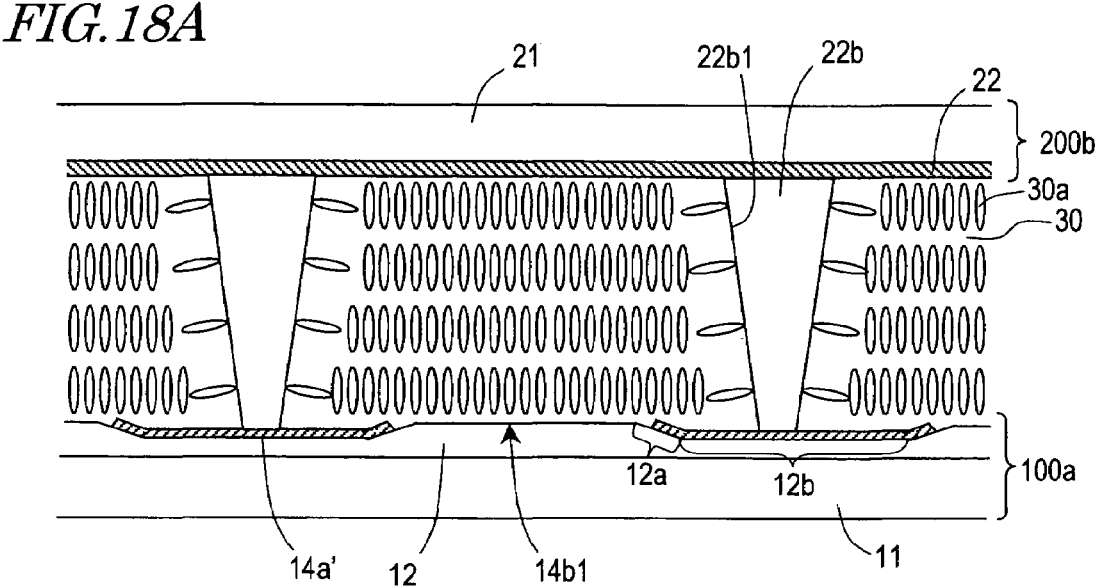

In a case where the protrusion 22b as illustrated in FIG. 13B is employed as the orientation-regulating structure 28, the thickness of the liquid crystal layer 30 may be defined by the protrusion 22b as illustrated in FIG. 18A. In other words, the protrusion 22b may function also as a spacer that controls the cell gap (the thickness of the liquid crystal layer 30). Such an arrangement is advantageous in that it is not necessary to separately provide a spacer for defining the thickness of the liquid crystal layer 30, thereby simplifying the production process.

In the illustrated example, the protrusion 22b has a truncated cone shape with a side surface 22b1 that is inclined by a taper angle θ less than 90° with respect to the substrate plane of the substrate 21. When the side surface 22b1 is inclined by an angle less than 90° with respect to the substrate plane, the side surface 22b1 of the protrusion 22b has an orientation-regulating force of the same direction as that of the orientation-regulating force exerted by the inclined electric field for the liquid crystal molecules 30a of the liquid crystal layer 30, thereby functioning to stabilize the radially-inclined orientation.

Figure 18B:
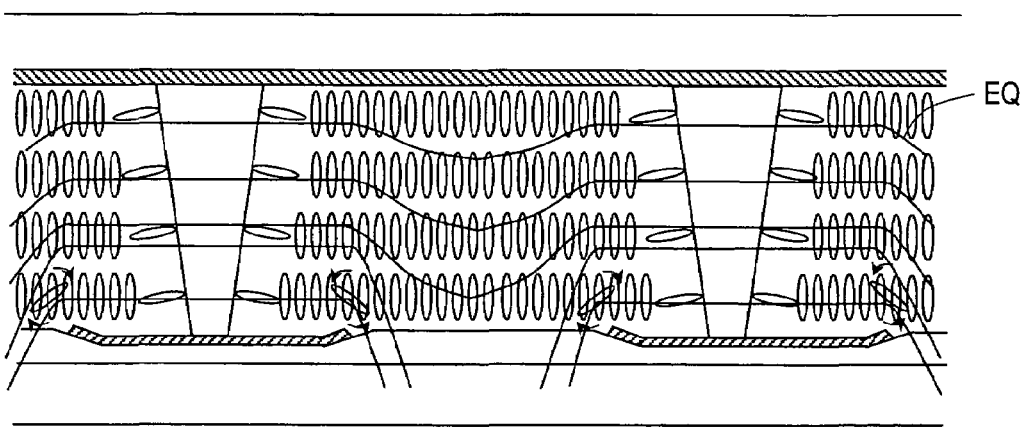
Figure 18C:
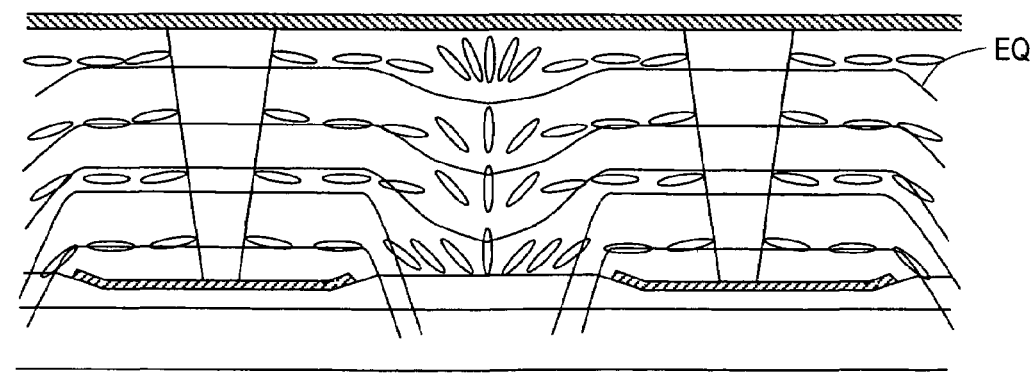

As schematically illustrated in FIG. 18A to FIG. 18C, a radially-inclined orientation similar to that obtained with the LCD 200' can be obtained also with the protrusion 22b that functions also as a spacer.

Figure 19:
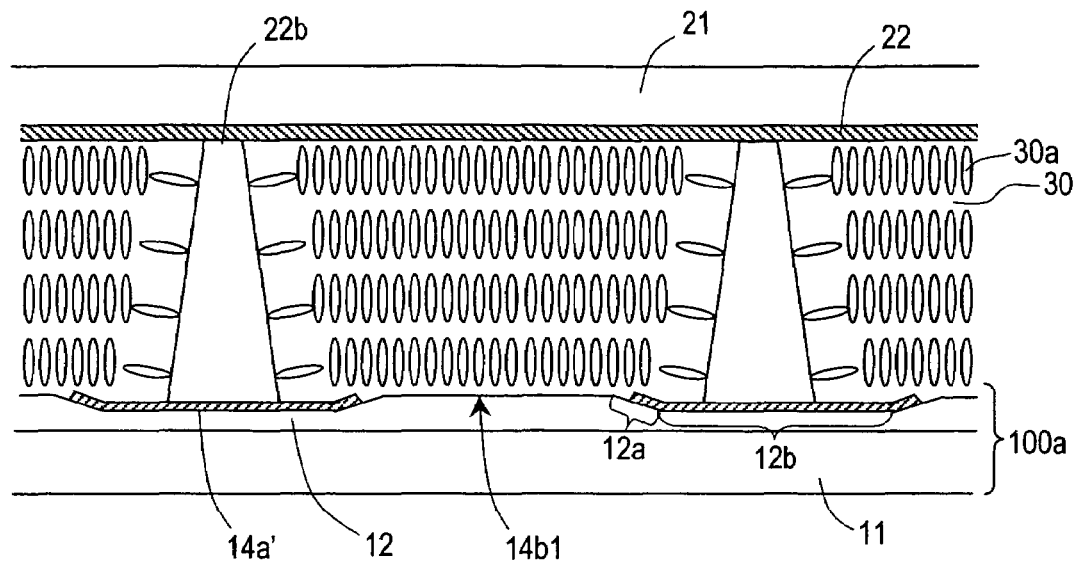
FIG. 19 is a cross-sectional view schematically illustrating protrusions having a side surface whose inclination angle with respect to the substrate plane significantly exceeds 90°.

While the protrusion 22b has the side surface 22b1 that is inclined by an angle less than 90° with respect to the substrate plane in the example illustrated in FIG. 18A to FIG. 18C, the protrusion 22b may alternatively have the side surface 22b1 that is inclined by an angle of 90° or more with respect to the substrate plane. In view of the stability of the radially-inclined orientation, the inclination angle of the side surface 22b1 preferably does not significantly exceed 90°, and more preferably is less than 90°. Even if the inclination angle exceeds 90°, as long as it is close to 90° (as long as it does not significantly exceed 90°), the liquid crystal molecules 30a in the vicinity of the side surface 22b1 of the protrusion 22b are inclined in a direction substantially parallel to the substrate plane and thus take a radially-inclined orientation conforming with the inclination direction of the liquid crystal molecules 30a at the edge portion, with only a slight twist. However, if the inclination angle of the side surface 22b1 of the protrusion 22b significantly exceeds 90° as illustrated in FIG. 19, the side surface 22b1 of the protrusion 22b will have an orientation-regulating force of the opposite direction to the orientation-regulating force exerted by the inclined electric field for the liquid crystal molecules 30a of the liquid crystal layer 30. This may result in unstable radially-inclined orientation.

Figure 20:
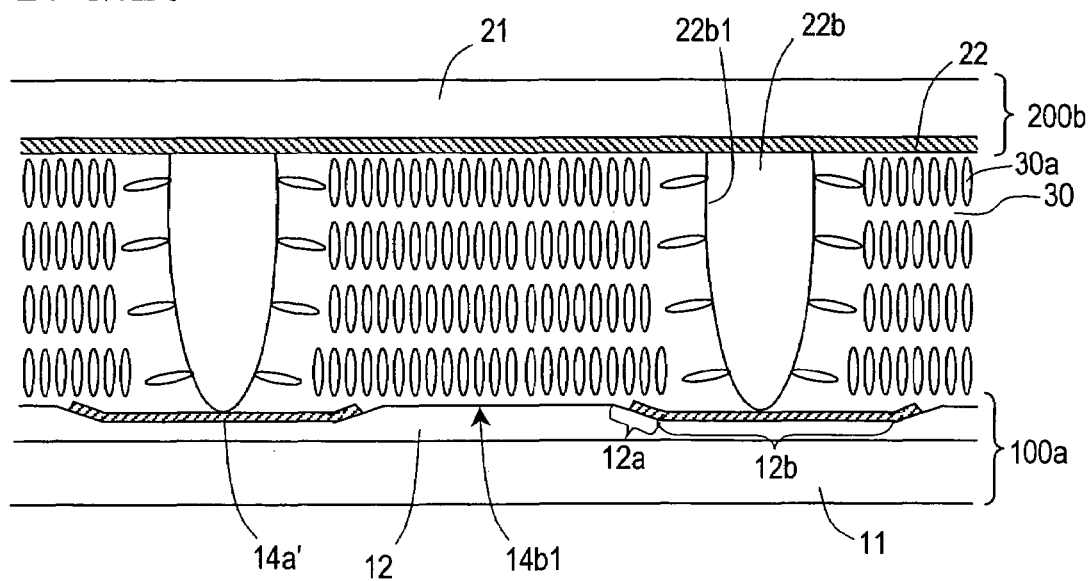
FIG. 20 is a cross-sectional view schematically illustrating a variation of protrusions that function also as spacers.

The protrusion 22b that functions also as a spacer is not limited to a protrusion having a truncated cone shape as illustrated in FIG. 18A to FIG. 18C. For example, the protrusion 22b may have a shape as illustrated in FIG. 20 such that the cross section thereof in a plane vertical to the substrate plane is a part of an ellipse (i.e., a shape such as a part of an elliptical sphere). In the protrusion 22b illustrated in FIG. 20, while the inclination angle (taper angle) of the side surface 22b1 with respect to the substrate plane varies along the thickness of the liquid crystal layer 30, the inclination angle of the side surface 22b1 is less than 90° regardless of the position along the thickness of the liquid crystal layer 30. Thus, the protrusion 22b having such a shape may suitably be used as a protrusion for stabilizing a radially-inclined orientation.

It is not necessary that all of the protrusions 22b provided in regions opposing the unit solid portions 14a' function as spacers. By forming some of the protrusions 22b to be lower than the other protrusions 22b that function as spacers, the occurrence of light leakage can be suppressed.

Embodiment 3

In Embodiments 1 and 2, a CPA type LCD to which the present invention is applied is described. In this embodiment, an MVA type LCD to which the present invention is applied will be described.

Figure 21:
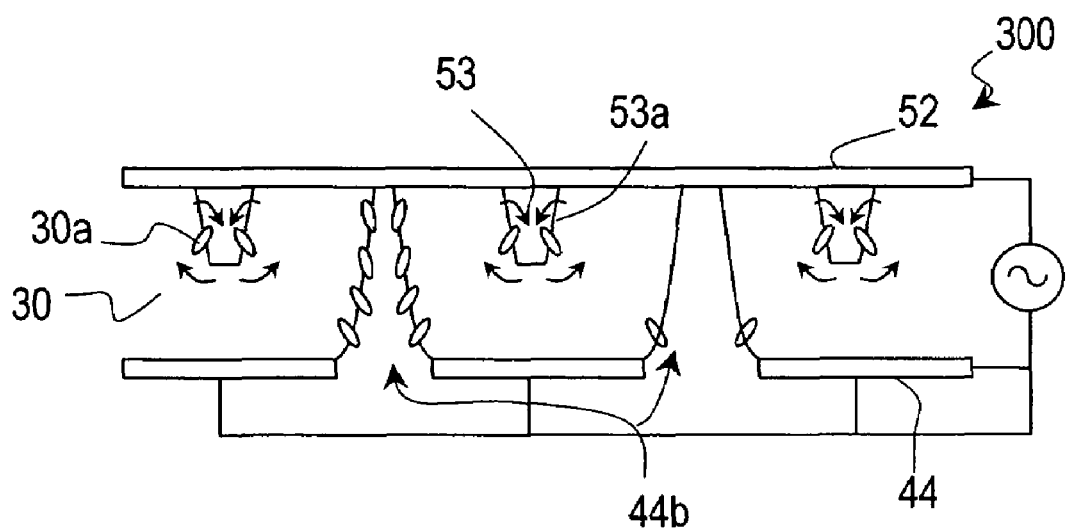
FIG. 21 is a cross-sectional view schematically showing a basic structure of an MVA type LCD 300 of the present invention.

With reference to FIG. 21, a basic structure of an MVA type LCD in this embodiment will be described.

An LCD 300 in this embodiment includes a plurality of picture element regions, each of which includes a first electrode 44, a second electrode 52 opposing the first electrode 44, and a vertical alignment type liquid crystal layer 30 provided between the first electrode 44 and the second electrode 52. In the vertical alignment type liquid crystal layer 30, liquid crystal molecules 30a having a negative dielectric anisotropy are oriented generally vertical (for example, at an angle of 87° or greater but 90° or less) to surfaces of the first electrode 44 and the second electrode 52 in an absence of an applied voltage. The vertical alignment type liquid crystal layer 30 is typically obtained by providing a vertical alignment layer (not shown) on one surface of each of the first electrode 44 and the second electrode 52 which is closer to the liquid crystal layer 30. In the case where ribs (protrusions) or the like are provided as orientation-regulating means, the liquid crystal molecules 30a are oriented generally vertical to a surface of the ribs or the like which is closer to the liquid crystal layer 30.

The first electrode 44 has slits 44b, and ribs 53 are provided on the surface of the second electrode 52 closer to the liquid crystal layer 30. In each of liquid crystal regions defined between the slits 44b and the ribs 53, the liquid crystal molecules 30a receive an orientation-regulating force by the slits 44b and the rib 53. When a voltage is applied between the first electrode 44 and the second electrode 52, the liquid crystal molecules 30a fall (are inclined) in the directions represented by the arrows in FIG. 21. Namely, in each liquid crystal region, the liquid crystal molecules 30a are inclined in a uniform direction. Each liquid crystal region having the liquid crystal molecules 30a inclined in a uniform direction is also referred to as a "liquid crystal domain". In a liquid crystal domain of a CPA type LCD, the liquid crystal molecules are oriented radially; whereas in a liquid crystal domain of an MVA type LCD, the liquid crystal molecules are oriented in one, uniform direction.

The slits 44b and the ribs 53 (also collectively referred to as "orientation-regulating means"; corresponding to the domain-regulating means described in Japanese Patent No. 2947350) are provided in a strip pattern in each picture element region. FIG. 21 is a cross-sectional view of the LCD 300 taken in a direction perpendicular to the direction in which the strip-shaped orientation-regulating means is extended. On both sides of each orientation-regulating means, liquid crystal regions (liquid crystal domains) in which the liquid crystal molecules 30a are inclined in directions different from each other by 180° are formed.

In the LCD 300, the slits 44b and the ribs 53 are extended in a strip pattern. When a potential difference is formed between the first electrode 44 and the second electrode 52, each slit 44b produces an inclined electric field at an edge portion of the slit 44b so as to orient the liquid crystal molecules 30a in a direction perpendicular to the direction in which the slit 44b is extended. Each rib 53 orients the liquid crystal molecules 30a generally vertical to a side surface 53a thereof, and thus orients the liquid crystal molecules 30a generally perpendicular to the direction in which the rib 53 is extended. The slits 44b and the ribs 53 are provided parallel to each other with a certain gap interposed therebetween. A liquid crystal region (liquid crystal domain) is formed between a slit 44b and a rib 53 which are adjacent to each other. Namely, the liquid crystal layer 30 is subjected to alignment division.

Figure 22:
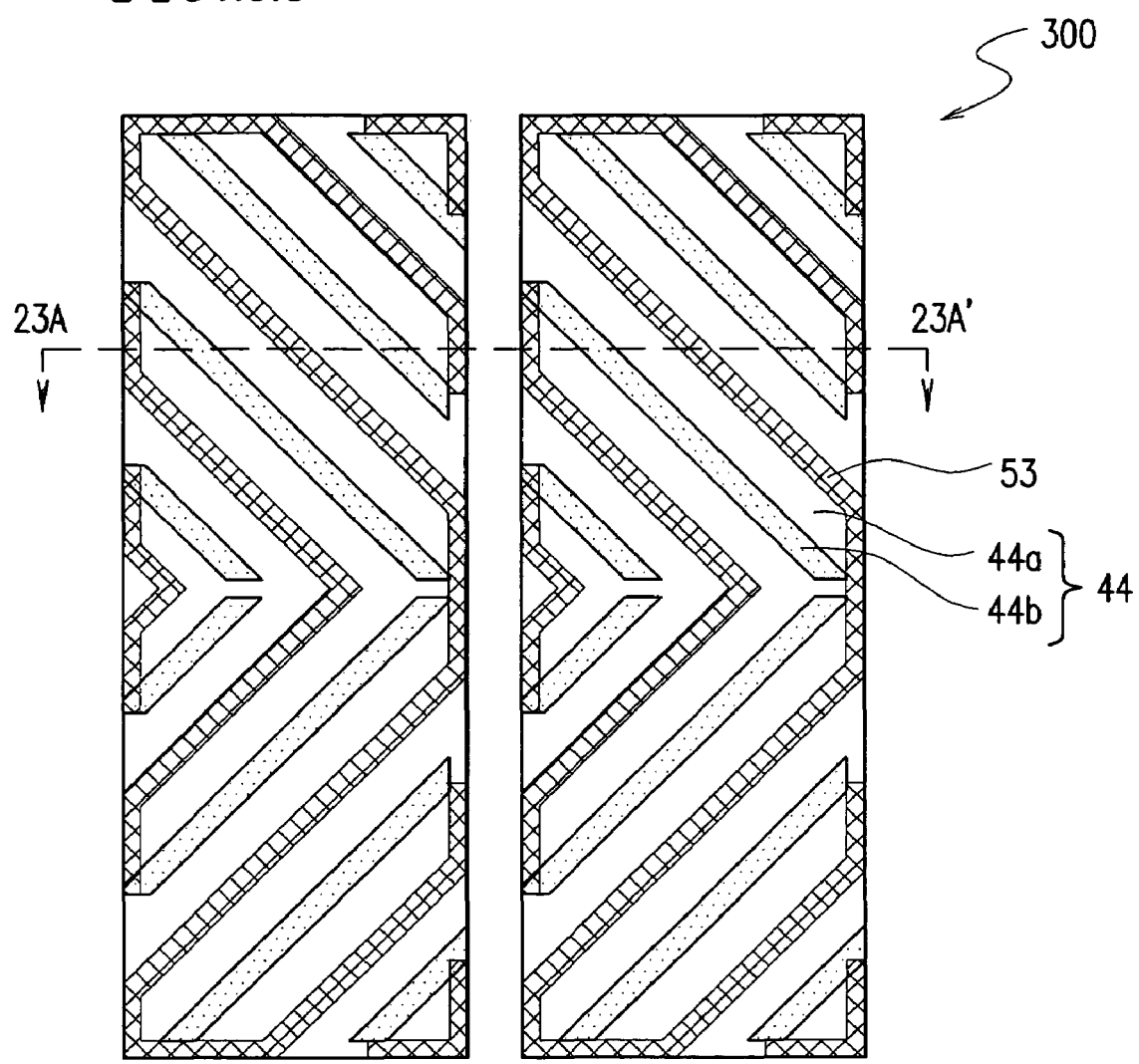
FIG. 22 is a plan view schematically showing a structure of two picture element regions of the LCD 300 of the present invention.
Figure 23:
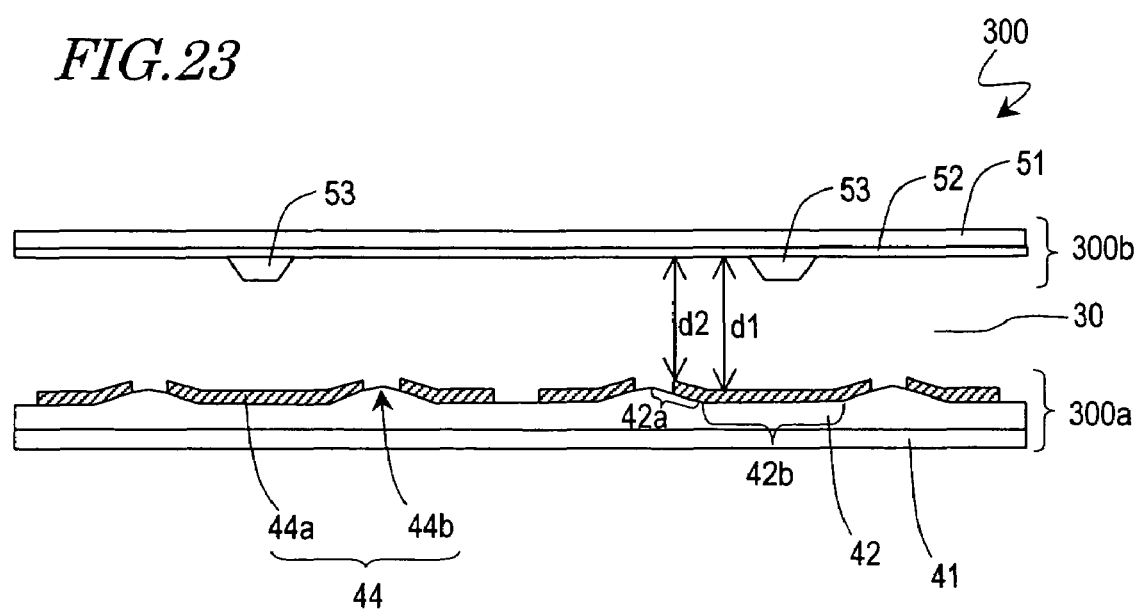
FIG. 23 is a cross-sectional view schematically showing a structure of the LCD 300 taken along line 23A-23A' of FIG. 22.

Next, with reference to FIG. 22 and FIG. 23, the structure of the LCD 300 will be described more specifically. FIG. 22 is a plan view schematically showing a structure of two picture element regions of the LCD 300, and FIG. 23 is a cross-sectional view of the LCD 300 taken along line 23A-23A' of FIG. 22.

The LCD 300 includes an active matrix substrate (hereinafter, referred to as a "TFT substrate") 300a, a counter substrate (also referred to as a "color filter substrate") 300b, and a vertical alignment type liquid crystal layer 30 provided between the TFT substrate 300a and the counter substrate 300b.

The TFT substrate 300a includes a transparent substrate (for example, a glass substrate) 41. On one surface of the transparent substrate 41 which is closer to the liquid crystal layer 30, gate bus lines (scanning lines; not shown), source bus lines (signal lines; not shown) and TFTs (not shown) are provided. An interlayer insulating film (transparent resin film) 42 covers the gate bus lines, the source bus lines and the TFTs. On the interlayer insulating film 42, the picture element electrode (first electrode) 44 is provided for each picture element region. The picture element electrode 44 is electrically connected to a corresponding TFT. In this example, the interlayer insulating film 42 is formed of a transparent resin film having a thickness of 1.5 μm or greater but 3.5 μm or less. Owing to such a structure, the picture element electrode 44 can partially overlap a gate bus line and/or a source bus line. This advantageously improves the numerical aperture.

The picture element electrode 44 includes a portion formed of a conductive film (i.e., a solid portion) 44a and a strip-shaped slit (i.e., a non-solid portion) 44b. The surface of the picture element electrode 44 which is closer to the liquid crystal layer 30 is substantially entirely covered with a vertical alignment film (not shown). As shown in FIG. 22, the slits 44b are extended in a strip pattern, and have a uniform width (the size in a direction perpendicular to the direction in which the slits 44b are extended). The slits 44b adjacent to each other are parallel with a uniform gap (pitch).

The counter substrate 300b has a transparent substrate (for example, a glass substrate) 51. The counter electrode (second electrode) 52 is provided on the transparent substrate 51. The ribs 53 are provided on the counter electrode 52. The surface of the counter electrode 52 which is closer to the liquid crystal layer 30, including the ribs 53b, is substantially entirely covered with a vertical alignment film (not shown). As shown in FIG. 22, the ribs 53 are extended in a strip pattern, and have a uniform width (the size in a direction perpendicular to the direction in which the ribs 53 are extended). The ribs 53 adjacent to each other are parallel. Each rib 53 is provided so as to divide a gap between two slits 44b adjacent thereto generally equally into two.

A strip-shaped liquid crystal region is defined between a strip-shaped slit 44b and a strip-shaped rib 53 provided parallel to each other. The orientation direction of the liquid crystal molecules 30a in each liquid crystal region is regulated by the slit 44b and the rib 53 defining the liquid crystal region. On both sides of each slit 44 and on both sides of each rib 53, liquid crystal regions in which the liquid crystal molecules 30a are inclined in directions different from each other by 180° are formed. In the LCD 300, as shown in FIG. 22, the slits 44b and the ribs 53 are extended in two directions which are different from each other by 90°. Thus, each picture element region includes four types of liquid crystal regions (liquid crystal domains), in which the orientation direction of the liquid crystal molecules 30a are different from one another by 90°. The arrangement of the slits 44b and the ribs 53 is not limited to the above-described arrangement, but this arrangement can provide a superb viewing angle characteristic.

A pair of polarization plates (not shown) provided externally to the TFT substrate 300a and the counter substrate 300b are arranged such that the transmission axes thereof are generally perpendicular to each other (in a cross Nicols state). It is preferable to provide the polarization plates such that the transmission axis of each polarization plate makes an angle of 45° with the orientation direction of the liquid crystal molecules 30a in each of the four types of liquid crystal regions having orientation directions different by 90°. With such an arrangement, a change in retardation caused by the liquid crystal region can be utilized most efficiently. In other words, it is preferable to provide the polarization plates such that the transmission axis of each polarization plate makes an angle of about 45° with the direction in which the slits 44b and the ribs 53 are extended. In the case of a display apparatus, the viewing direction to which is often moved horizontally with respect to the display plane, such as a TV, the polarization plates are preferably provided such that one of the transmission axes is horizontal with respect to the display plane, in order to suppress the viewing angle dependence of the display quality.

The MVA type LCD 300 having the above-described structure can display images with a superb viewing angle characteristic. In addition, in the LCD 300 according to the present invention, as shown in FIG. 23, a portion of the liquid crystal layer 30 which is above the solid portion 44*a* of the picture element electrode 44 includes a first region having a first thickness $d_1$ and a second region having a second thickness $d_2$ which is smaller than the first thickness $d_1$. The second region is located in the vicinity of the slit 44*b*, more specifically, between the first region and the slit 44*b*. The response speed of the second region having a relatively small thickness $d_2$ is higher than the response speed of the first region having a relatively large thickness $d_1$. The liquid crystal molecules 30*a* in the second region located in the vicinity of the slit 44*b* trigger the formation of a liquid crystal domain. Therefore, when the response speed of the liquid crystal molecules 30*a* in the vicinity of the slit 44*b* is higher, a liquid crystal domain is formed more quickly. As a result, the response speed of the entire liquid crystal layer 30 is increased. Thus, the LCD 300 according to the present invention has a superb response characteristic.

According to the present invention, the cell gap is not reduced in the entire picture element region but is reduced only in a portion thereof. Therefore, the response speed can be sufficiently improved with no need to increase the refractive index anisotropy (Δn) of the liquid crystal material. Specifically, in order to sufficiently improve the response speed, the difference between the thickness $d_1$ of the first region and the thickness $d_2$ of the second region is preferably 0.5 μm or greater, more preferably 1 μm or greater, and further preferably 1.5 μm or greater.

In this embodiment, as shown in FIG. 23, the cell gap in the vicinity of the slit 44*b* is made smaller by setting a surface of a portion of the solid portion 44*a* in the vicinity of the slit 44*b* (corresponding to the second region) to be higher than a surface of the remaining portion of the solid portion 44*a* (corresponding to the first region). More specifically, an interlayer insulating film 42 is provided between the picture element electrode 44 and the transparent substrate 41, and the height of the surface of the interlayer insulating film 42 is locally changed, such that the surface of the solid portion 44*a* formed thereon is higher in the portion in the vicinity of the slit 44*b* than in the remaining portion.

The interlayer insulating film 42 includes an inclining region 42*a* where a height of one surface thereof which is closer to the liquid crystal layer 30 changes continuously and a flat region 42*b* where the height of the surface thereof which is closer to the liquid crystal layer 30 is substantially constant. The portion of the solid portion 44*a* in the vicinity of the slit 44*b* (corresponding to the second region) is located on the inclining region 42*a*, and the remaining portion of the solid portion 44*a* (corresponding to the first region) is located on the flat region 42*b*.

In view of the display quality, the inclination angle of the inclining region 42*a* of the interlayer insulating film 42 (the inclination angle with respect to the surface of the substrate 41) is preferably small, and the interlayer insulating film 42 preferably has a gentle slope. Specifically, the inclination angle of the inclining region 42*a* of the interlayer insulating film 42 with respect to the surface of the substrate 41 is preferably 30° or less, and more preferably 20° or less.

Note that if the height of the surface of the solid portion 44*a* changes continuously across the entire solid portion 44*a*, the retardation of the liquid crystal layer 30 is no longer constant across the solid portion 44*a*, which may deteriorate the display quality. In such a case, it is difficult to suitably compensate for the phase difference by using a phase difference compensator or the like. In the case where the interlayer insulating film 42 includes the flat region 42*b* where the height of the surface thereof which is closer to the liquid crystal layer 30 is substantially constant, as in the present embodiment, generation of such a problem can be suppressed.

The interlayer insulating film 42 having a gentle slope as described above can be formed by, for example, treating a photosensitive transparent resin film with a half exposure process.

In this embodiment, the liquid crystal layer 30 above the solid portion 44*a* of the picture element electrode 44 includes the second region having a relatively small thickness $d_2$ in the vicinity of the slit 44*b*, but not in the vicinity of an outer periphery of the picture element electrode 44. With such a structure, the orientation in the liquid crystal layer 30 can further be stabilized and the response speed can be further improved. The reason for this will be described with reference to FIG. 24.

Figure 24:
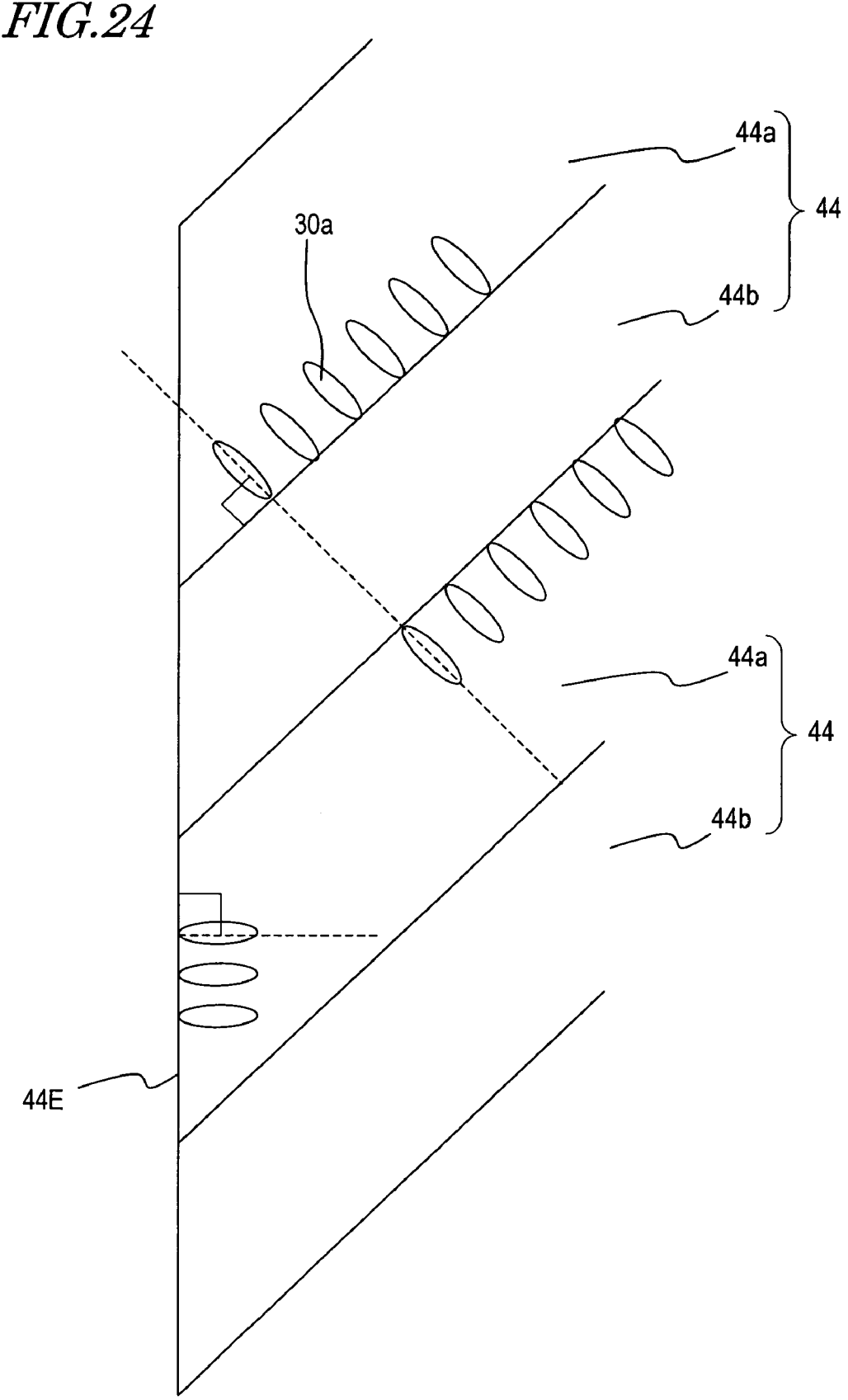
FIG. 24 schematically shows the orientation of liquid crystal molecules in the vicinity of a slit and in the vicinity of the outer periphery of a picture element electrode.

FIG. 24 schematically shows the orientation of the liquid crystal layer 30*a* in the vicinity of the slit 44*b* and in the vicinity of an outer periphery 44E of the picture element electrode 44. Among the liquid crystal molecules 30*a* above the solid portion 44*a* of the picture element electrode 44, the liquid crystal molecules 30*a* in the vicinity of the slit 44*b* are influenced by the inclined electric field to be inclined in a direction perpendicular to the direction in which the slit 44*b* is extended. By contrast, the liquid crystal molecules 30*a* influenced by the inclined electric field in the vicinity of the outer periphery 44E of the picture element electrode 44 are inclined in a different direction from those in the vicinity of the slit 44*b*. Namely, the liquid crystal molecules 30*a* in the vicinity of the outer periphery 44E of the picture element electrode 44 are inclined in a direction different from the predetermined direction which is defined by the orientation-regulating force of the slit 44*b*, and thus disturb the orientation of the liquid crystal molecules 30*a* in the liquid crystal domain. Thus, if the cell gap in the vicinity of the outer periphery 44E of the picture element electrode 44 is reduced as the cell gap in the vicinity of the slit 44*b*, the orientation-regulating force acting to disturb the orientation of the liquid crystal molecules 30*a* in the liquid crystal domain is strengthened. As a result, the orientation in the liquid crystal domain is unstabilized and the response characteristic is deteriorated. By contrast, with a structure of this embodiment, in which the cell gap in the vicinity of the outer periphery 44E of the picture element electrode 44 is not reduced, the orientation can be stabilized and the response characteristic can be improved.

In this embodiment, a display mode using linearly-polarized light is used. Alternatively, a display mode using circularly-polarized light may be used in order to suppress the influence of the two-step response behavior described above with reference to FIG. 5.

Embodiment 4

Figure 25:
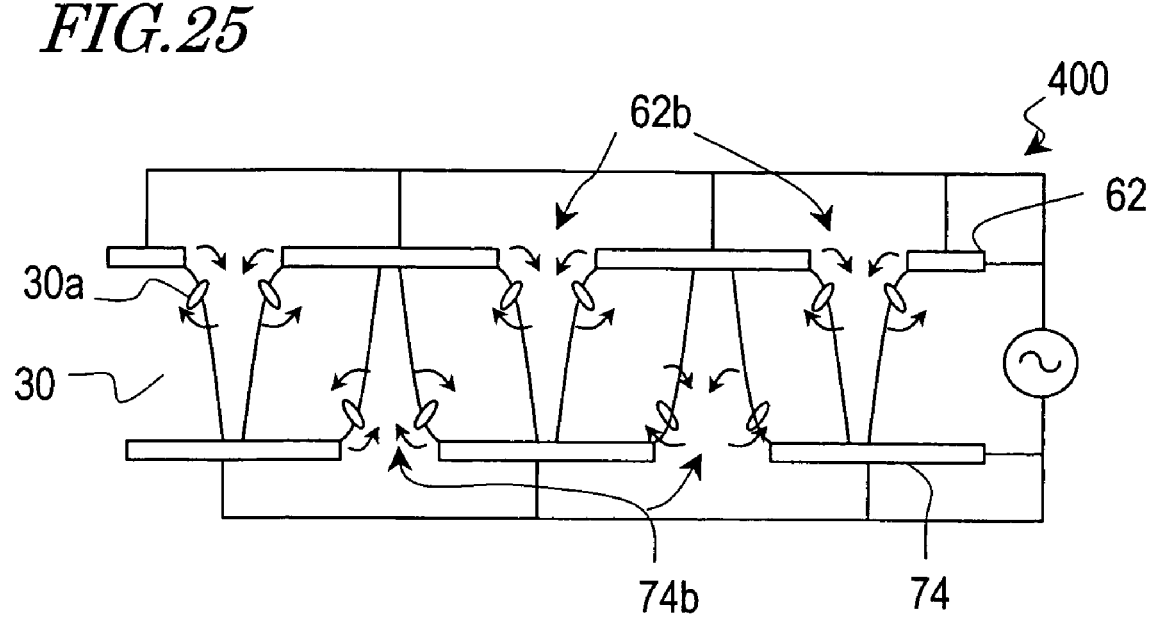
FIG. 25 is a cross-sectional view schematically showing a basic structure of another MVA type LCD 400 of the present invention.

A basic structure of an MVA type LCD 400 in this embodiment will be described with reference to FIG. 25.

Whereas the LCD 300 shown in FIG. 21 has the slits 44*b* and the ribs 53 as the orientation-regulating means, the LCD 400 in this embodiment has slits 62*b* and slits 74*b* as the orientation-regulating means. When a potential difference is formed between a first electrode 62 and a second electrode 74, each of the slits 62*b* and the slits 74*b* produces an inclined electric field in a portion of the liquid crystal layer 30 in the vicinity thereof so as to orient the liquid crystal molecules 30*a* in a direction perpendicular to the direction in which the slits 62*b* and the slits 74*b* are extended. The slits 62*b* and the slits 74*b* are provided parallel to each other with a certain gap interposed therebetween. A liquid crystal region (liquid crystal domain) is formed between a slit 62*b* and a slit 74*b* which are adjacent to each other. An MVA type LCD including the slits 62*b* and the slits 74*b* as the orientation-regulating means, such as the LCD 400, is also referred to as a PVA (Patterned Vertical Alignment) type LCD.

Figure 26:
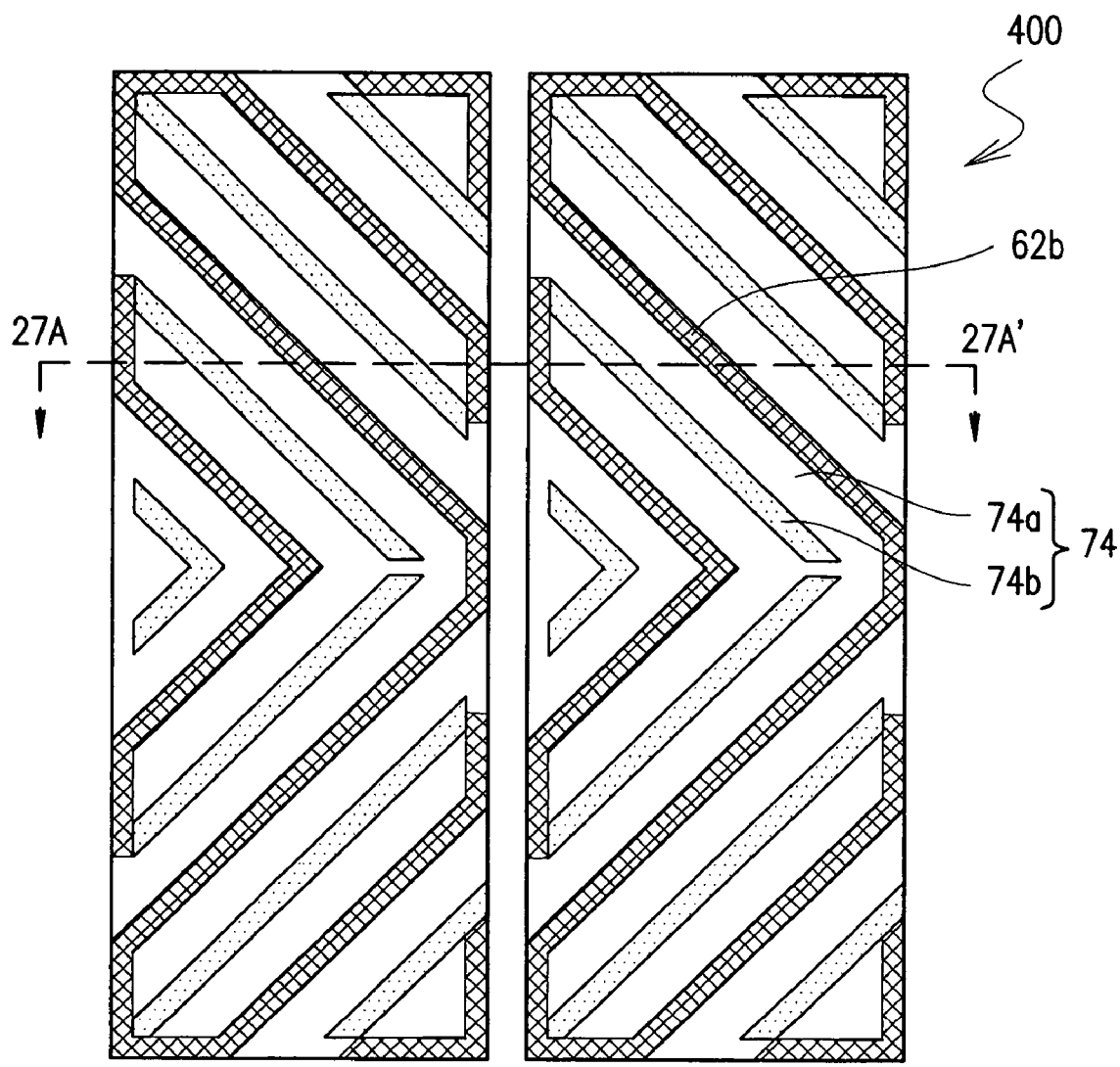
FIG. 26 is a plan view schematically showing a structure of two picture element regions of the LCD 400 of the present invention.
Figure 27:
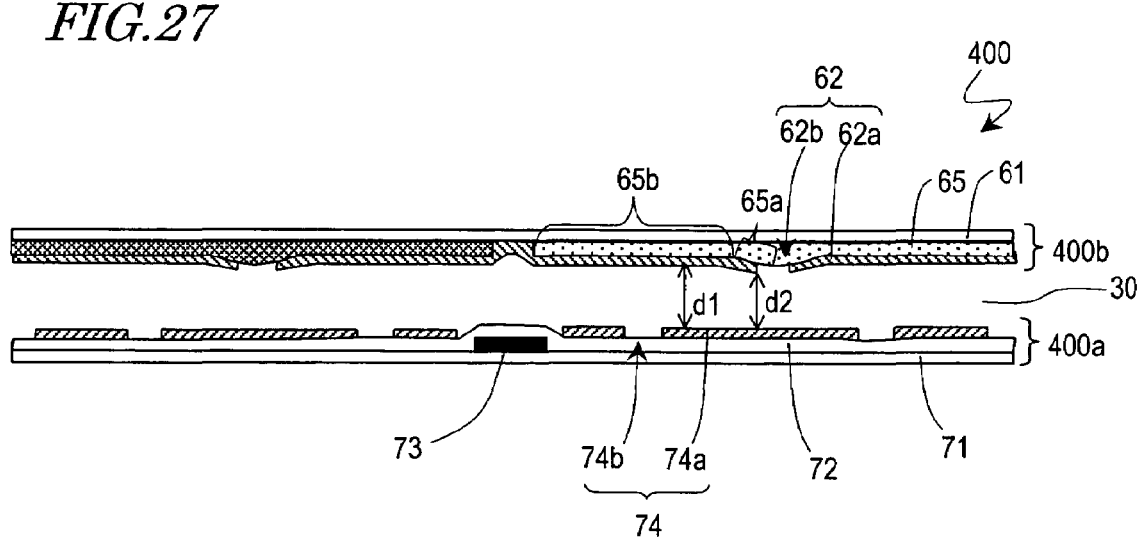
FIG. 27 is a cross-sectional view schematically showing a structure of the LCD 400 taken along line 27A-27A' of FIG. 26.

Next, with reference to FIG. 26 and FIG. 27, the structure of the LCD 400 will be described more specifically. FIG. 26 is a plan view schematically showing a structure of two picture element regions of the LCD 400, and FIG. 27 is a cross-sectional view of the LCD 400 taken along line 27A-27A' of FIG. 26.

The LCD 400 includes an active matrix substrate (hereinafter, referred to as a "TFT substrate") 400*a*, a counter substrate (also referred to as a "color filter substrate") 400*b*, and a vertical alignment type liquid crystal layer 30 provided between the TFT substrate 400*a* and the counter substrate 400*b*.

The TFT substrate 400*a* includes a transparent substrate (for example, a glass substrate) 71. On the surface of the transparent substrate 71 which is closer to the liquid crystal layer 30, gate bus lines (scanning lines; not shown), source bus lines (signal lines; not shown) and TFTs (not shown) are provided. An interlayer insulating film (transparent resin film) 72 covers the gate bus lines, the source bus lines and the TFTs. On the interlayer insulating film 72, the picture element electrode (second electrode) 74 is provided for each picture element region. The picture element electrode 74 is electrically connected to a corresponding TFT.

The picture element electrode 74 includes a portion formed of a conductive film (i.e., a solid portion) 74*a* and a strip-shaped slit (i.e., a non-solid portion) 74*b*. One surface of the picture element electrode 74 which is closer to the liquid crystal layer 30 is substantially entirely covered with a vertical alignment film (not shown). As shown in FIG. 26, the slits 74*b* are extended in a strip pattern, and have a uniform width (the size in a direction perpendicular to the direction in which the slits 74*b* are extended). The slits 74*b* adjacent to each other are parallel with a uniform gap (pitch).

The counter substrate 400*b* has a transparent substrate (for example, a glass substrate) 61. A color filter layer 65 is provided on the transparent substrate 61. The counter electrode (first electrode) 62 is provided on the color filter layer 65. The counter electrode 62, like the picture element electrode 74, includes a portion formed of a conductive film (i.e., a solid portion) 62*a* and a strip-shaped slit (i.e., a non-solid portion) 62*b*. One surface of the counter electrode 62 which is closer to the liquid crystal layer 30 is substantially entirely covered with a vertical alignment film (not shown). As shown in FIG. 26, the slits 62*b* are extended in a strip pattern, and have a uniform width (the size in a direction perpendicular to the direction in which the slits 62*b* are extended). The slits 62*b* adjacent to each other are parallel. Each slit 62*b* is provided so as to divide a gap between two slits 74*b* adjacent thereto generally equally into two.

A strip-shaped liquid crystal region is defined between a strip-shaped slit 62*b* and a strip-shaped slit 74*b* provided parallel to each other. The orientation direction of the liquid crystal molecules 30*a* in each liquid crystal region is regulated by the slit 62*b* and the slit 74*b* defining the liquid crystal region. On both sides of each slit 62*b* and on both sides of each slit 74*b*, liquid crystal regions in which the liquid crystal molecules 30*a* are inclined in directions different from each other by 180° are formed. In the LCD 400, as shown in FIG. 26, the slits 62*b* and the slits 74*b* are extended in two directions which are different from each other by 90°. Thus, each picture element region includes four types of liquid crystal regions (liquid crystal domains), in which the orientation direction of the liquid crystal molecules 30*a* are different from one another by 90°. The arrangement of the slits 62*b* and the slits 74*b* is not limited to the above-described arrangement, but this arrangement can provide a superb viewing angle characteristic.

A pair of polarization plates (not shown) provided externally to the TFT substrate 400*a* and the counter substrate 400*b* are arranged such that the transmission axes thereof are generally perpendicular to each other (in a cross Nicols state). It is preferable to provide the polarization plates such that the transmission axis of each polarization plate makes an angle of 45° with the orientation direction of the liquid crystal molecules 30*a* in each of the four types of liquid crystal regions having orientation directions different by 90°. With such an arrangement, a change in retardation caused by the liquid crystal region can be utilized most efficiently. In other words, it is preferable to provide the polarization plates such that the transmission axis of each polarization plate makes an angle of about 45° with the direction in which the slits 62*b* and the slits 74*b* are extended. In the case of a display apparatus, the viewing direction to which is often moved horizontally with respect to the display plane, such as a TV, the polarization plates are preferably provided such that one of the transmission axes is horizontal with respect to the display plane, in order to suppress the viewing angle dependence of the display quality.

The MVA type LCD 400 having the above-described structure can display images with a superb viewing angle characteristic. In addition, in the LCD 400 according to the present invention, as shown in FIG. 27, a portion of the liquid crystal layer 30 which is above the solid portion 62*a* of the counter electrode 62 includes a first region having a first thickness $d_1$ and a second region having a second thickness $d_2$ which is smaller than the first thickness $d_1$. The second region is located in the vicinity of the slit 62*b*, more specifically, between the first region and the slit 62*b*. The response speed of the second region having a relatively small thickness $d_2$ is higher than the response speed of the first region having a relatively large thickness $d_1$. The liquid crystal molecules 30*a* in the second region located in the vicinity of the slit 62*b* trigger the formation of a liquid crystal domain. Therefore, when the response speed of the liquid crystal molecules 30*a* in the vicinity of the slit 62*b* is higher, a liquid crystal domain is formed more quickly. As a result, the response speed of the entire liquid crystal layer 30 is increased. Thus, the LCD 400 according to the present invention has a superb response characteristic.

According to the present invention, the cell gap is not reduced in the entire picture element region but is reduced only in a portion thereof. Therefore, the response speed can be sufficiently improved with no need to increase the refractive index anisotropy (Δn) of the liquid crystal material. Specifically, in order to sufficiently improve the response speed, the difference between the thickness $d_1$ of the first region and the thickness $d_2$ of the second region is preferably 0.5 μm or greater, more preferably 1 μm or greater, and further preferably 1.5 μm or greater.

In this embodiment, as shown in FIG. 27, the cell gap in the vicinity of the slit 62*b* is made smaller by setting a surface of a portion of the solid portion 62*a* in the vicinity of the slit 62*b*

(corresponding to the second region) to be higher, from the transparent substrate 61, than a surface of the remaining portion of the solid portion 62a (corresponding to the first region). More specifically, the height of the color filter layer 65 provided between the counter electrode 62 and the transparent substrate 61 is locally changed, such that the surface of the solid portion 62a formed thereon is higher in the portion in the vicinity of the slit 62b than in the remaining portion from the transparent substrate 61.

The color filter layer 65 includes an inclining region 65a where a height of one surface thereof which is closer to the liquid crystal layer 30 changes continuously and a flat region 65b where the height of the surface thereof which his closer to the liquid crystal layer 30 is substantially constant. The portion of the solid portion 65a in the vicinity of the slit 62b (corresponding to the second region) is located on the inclining region 65a, and the remaining portion of the solid portion 62a (corresponding to the first region) is located on the flat region 65b.

In view of the display quality, the inclination angle of the inclining region 65a of the color filter layer 65 (the inclination angle with respect to the surface of the substrate 61) is preferably small, and the color filter layer 65 preferably has a gentle slope. Specifically, the inclination angle of the inclining region 65a of the color filter layer 65 with respect to the surface of the substrate 61 is preferably 30° or less, and more preferably 20° or less.

Note that if the height of the surface of the solid portion 62a changes continuously across the entire solid portion 62a, the retardation of the liquid crystal layer 30 is no longer constant across the solid portion 62a, which may deteriorate the display quality. In such a case, it is difficult to suitably compensate for the phase difference by using a phase difference compensator or the like. In the case where the color filter layer 65 includes the flat region 65b where the height of the surface which is closer to the liquid crystal layer 30 is substantially constant, as in the present embodiment, generation of such a problem can be suppressed.

The color filter layer 65 having a gentle slope as described above can be formed by, for example, treating a photosensitive transparent resin film containing a pigment with a half exposure process. Alternatively, the color filter layer 65 as described above may be obtained by first forming an underlying layer on a portion of the transparent substrate 61 corresponding to the non-solid portion 62b and then forming a color filter layer thereon.

In this embodiment, the cell gap in the vicinity of the slit 62b of the counter electrode 62 is reduced. Alternatively, the cell gap in the vicinity of the slit 74b of the picture element electrode 74 may be reduced, or both the cell gap in the vicinity of the slit 62b of the counter electrode 62 and the cell gap in the vicinity of the slit 74b of the picture element electrode 74 may be reduced. For further improving the response characteristic, it is preferable to reduce both the cell gap in the vicinity of the slit 62b of the counter electrode 62 and the cell gap in the vicinity of the slit 74b of the picture element electrode 74. For restricting an increase in the number of production steps and thus the production cost, it is preferable to reduce one of the cell gaps.

Embodiment 5

Figure 29:
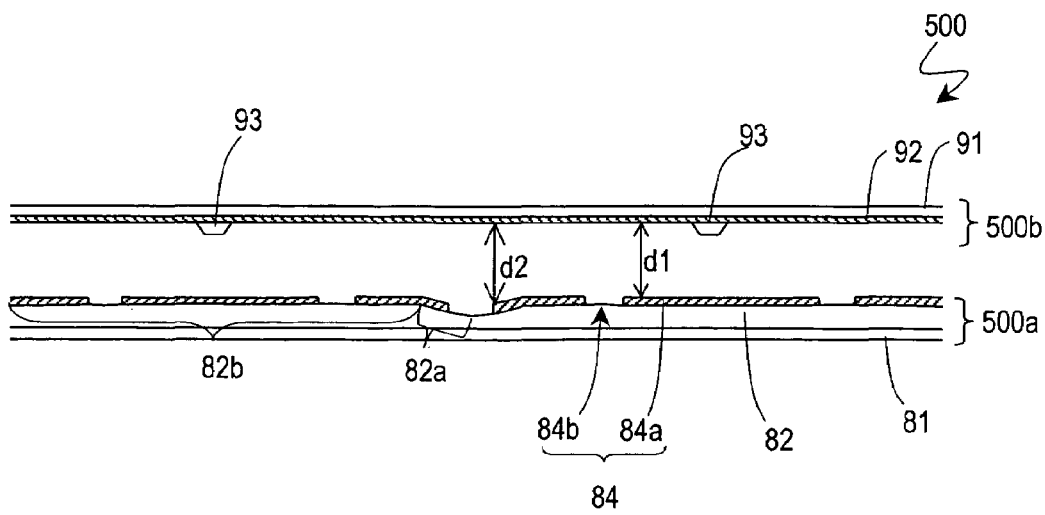
FIG. 29 is a cross-sectional view schematically showing a structure of the LCD 500 taken along line 28A-28A' of FIG. 28.
Figure 28:
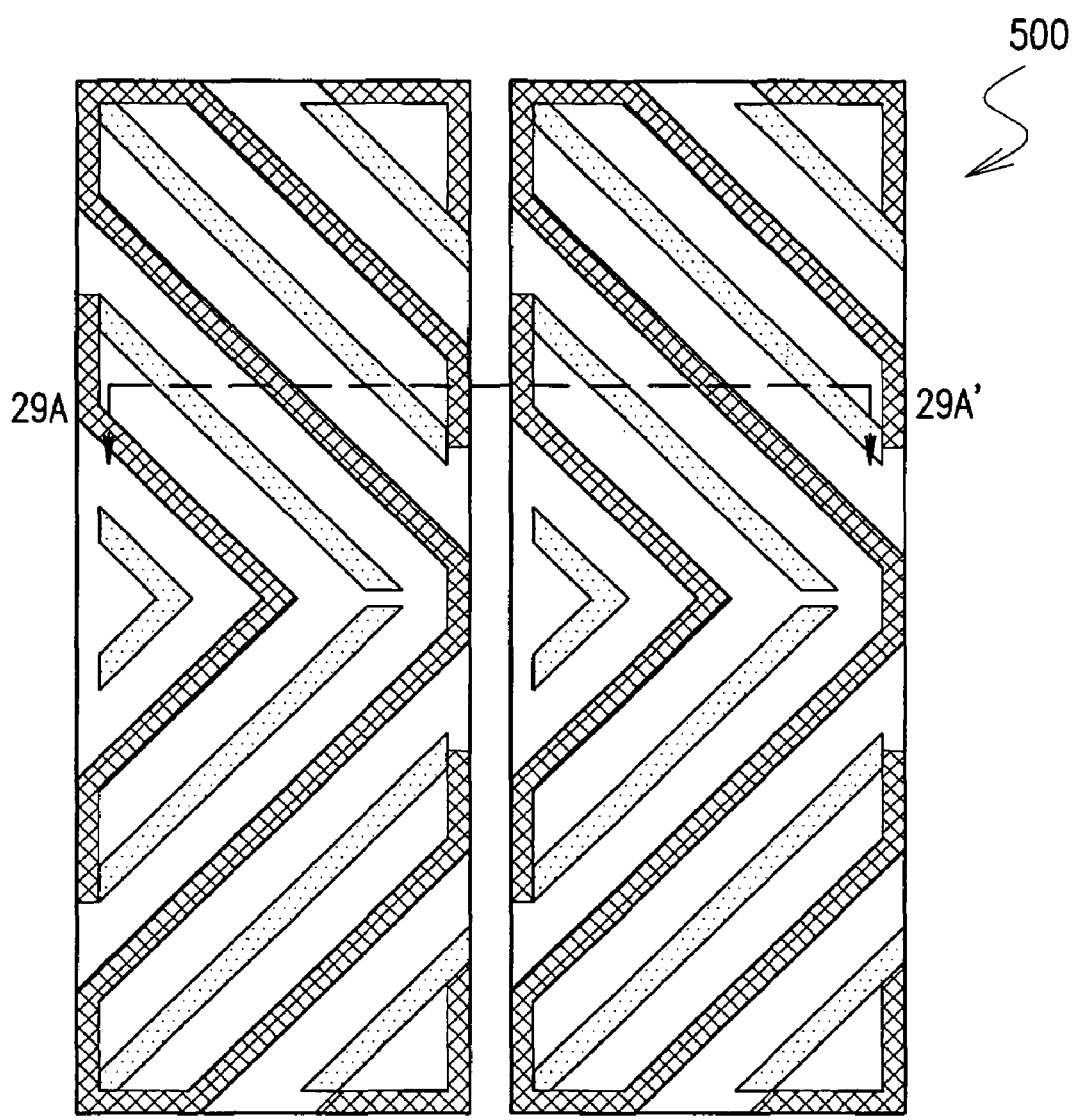
FIG. 28 is a plan view schematically showing a structure of two picture element regions of still another MVA type LCD 500 of the present invention.

A MVA type LCD 500 in this embodiment will be described with reference to FIG. 28 and FIG. 29. FIG. 28 is a plan view schematically showing a structure of two picture element regions of the LCD 500, and FIG. 29 is a cross-sectional view of the LCD 500 taken along line 29A-29A' of FIG. 28.

The MVA type LCD 500 in this embodiment has slits 84b and ribs 93 as the orientation-regulating means. The basic orientation mechanism is the same as that of the LCD 300 shown in FIG. 21.

The LCD 500 includes a TFT substrate 500a, a counter substrate 500b, and a vertical alignment type liquid crystal layer 30 provided between the TFT substrate 500a and the counter substrate 500b. The TFT substrate 500a includes a transparent substrate (for example, a glass substrate) 81, an interlayer insulating film (transparent resin film) 82, and a picture element electrode 84. The picture element electrode 84 includes a portion formed of a conductive film (i.e., a solid portion) 84a and a strip-shaped slit (i.e., a non-solid portion) 84b. The counter substrate 500b includes a transparent substrate (for example, a glass substrate) 91. A counter electrode 92 is provided on the transparent substrate 91, and the ribs 93 are provided on the counter electrode 92.

The planar positional relationship between the slits 84b and the ribs 93b (the positional relationship when seen in the substrate normal direction) is the same as that of the slits 44b and the ribs 53 of the LCD 300. When a voltage is applied, four types of liquid crystal regions (liquid crystal domains) are formed, in which the orientation direction of the liquid crystal molecules 30a are different from one another by 90°.

A portion of the liquid crystal layer 30 which is above the solid portion 84a of the picture element electrode 84 includes a first region having a first thickness $d_1$ and a second region having a second thickness $d_2$ which is larger than the first thickness $d_1$. The second region is located in the vicinity of the outer periphery of the picture element electrode 84, and the first region is located inner to the second region. Namely, in the LCD 500, the cell gap in the vicinity of the outer periphery of the picture element electrode 84 is selectively made large.

As described above with reference to FIG. 24, the liquid crystal molecules 30a in the vicinity of the outer periphery of the picture element electrode would be inclined in a direction different from the predetermined direction defined by the orientation-regulating force of the slits 84b and thus disturb the orientation of the liquid crystal molecules 30a in the liquid crystal domain. In this embodiment, however, the thickness of the liquid crystal layer 30 in the vicinity of the outer periphery of the picture element electrode 84 is selectively made large. This structure can weaken the orientation-regulating force in the vicinity of the outer periphery of the picture element electrode 84 (which is not aligned with the orientation-regulating force provided by the slits 84b). As a result, the orientation can be stabilized and the response characteristic can be improved.

As a technique for reducing the orientation-regulating force in the vicinity of the outer periphery of the picture element electrode 84, it is conceivable to reduce the pitch of the picture element electrodes 84. However, this increases the possibility of shortcircuiting occurring between adjacent picture element electrodes 84, and thus declines the reliability of the LCD. By contrast, the LCD 500 according to the present invention does not have such a problem.

The effect of reducing the orientation-regulating force in the vicinity of the outer periphery of the picture element electrode 84 is greater as the thickness $d_2$ of the second region is greater and also as the difference between the thickness $d_1$ of the first region and the thickness $d_2$ of the second region is greater. Specifically, in order to sufficiently weaken the orientation-regulating force in the vicinity of the outer periphery of the picture element electrode 84, the difference between the thickness $d_1$ of the first region and the thickness $d_2$ of the second region is preferably 0.5 μm or greater, more preferably 1 μm or greater, and further preferably 1.5 μm or greater.

In this embodiment, as shown in FIG. 29, the cell gap in the vicinity of the outer periphery of the picture element electrode 84 is made larger by setting a surface of a portion of the solid portion 84a in the vicinity of the outer periphery of the picture element electrode 84 (corresponding to the second region) to be lower than a surface of the remaining portion of the solid portion 84a (corresponding to the first region). More specifically, the height of the interlayer insulating film 82 provided between the picture element electrode 84 and the transparent substrate 81 is locally changed, such that the surface of the solid portion 84a formed thereon is lower in the portion in the vicinity of the outer periphery of the picture element electrode 84 than in the remaining portion.

The interlayer insulating film 82 includes an inclining region 82a where a height of one surface thereof which is closer to the liquid crystal layer 30 changes continuously and a flat region 82b where the height of the surface thereof which is closer to the liquid crystal layer 30 is substantially constant. The portion of the solid portion 84a in the vicinity of the outer periphery of the picture element electrode 84 (corresponding to the second region) is located on the inclining region 82a, and the remaining portion of the solid portion 84a (corresponding to the first region) is located on the flat region 82b.

In view of the display quality, the inclination angle of the inclining region 82a of the interlayer insulating film 82 (the inclination angle with respect to the surface of the substrate 81) is preferably small, and the interlayer insulating film 82 preferably has a gentle slope. Specifically, the inclination angle of the inclining region 82a of the interlayer insulating film 82 with respect to the surface of the substrate 81 is preferably 30° or less, and more preferably 20° or less.

Note that if the height of the surface of the solid portion 84a changes continuously across the entire solid portion 84a, the retardation of the liquid crystal layer 30 is no longer constant across the solid portion 84a, which may deteriorate the display quality. In such a case, it is difficult to suitably compensate for the phase difference by using a phase difference compensator or the like. In the case where the interlayer insulating film 82 includes the flat region 82b where the height of the surface which is closer to the liquid crystal layer 30 is substantially constant, as in the present embodiment, generation of such a problem can be suppressed.

The interlayer insulating film 82 having a gentle slope as described above can be formed by, for example, treating a photosensitive transparent resin film with a half exposure process.

According to the present invention, the response characteristic of an alignment-divided vertical alignment type LCD can be improved in a simple manner. The present invention is preferably usable in a CPA type LCD and an MVA type LCD.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This non-provisional application claims priority under 35 USC § 119(a) on Patent Application No. 2004-129248 filed in Japan on Apr. 26, 2004, the entire contents of which are hereby incorporated by reference.

What is claimed is:

1. A liquid crystal display device, comprising:
   a first substrate;
   a second substrate; and
   a vertical alignment type liquid crystal layer provided between the first substrate and the second substrate, wherein:
   a plurality of picture element regions are each defined by a first electrode provided on one surface of the first substrate which is closer to the liquid crystal layer and a second electrode provided on the second substrate and opposing the first electrode with the liquid crystal layer therebetween;
   in each of the plurality of picture element regions, the first electrode includes a solid portion formed of a conductive film and a non-solid portion with no conductive film provided, and the liquid crystal layer has an orientation which is regulated by an inclined electric field produced above the non-solid portion of the first electrode when a voltage is applied between the first electrode and the second electrode;
   a portion of the liquid crystal layer above the solid portion of the first electrode includes a first region having a first thickness $d_1$ and a second region having a second thickness $d_2$ which is smaller than the first thickness $d_1$, the second region being located in the vicinity of the non-solid portion; and
   wherein the first substrate includes a transparent substrate and an interlayer insulating layer provided between at least the transparent substrate and at least a majority of each of the solid portions of the first electrode, and wherein the interlayer insulating layer includes an inclining region where a height of one surface thereof closer to the liquid crystal layer changes substantially continuously, and wherein an edge portion of the solid portion of the first electrode in the second region is located on the inclining region.

2. The liquid crystal display device according to claim 1, wherein when a voltage is applied between the first electrode and the second electrode, the liquid crystal layer forms a plurality of first liquid crystal domains each taking a radially-inclined orientation above the solid portion by the inclined electric field.

3. The liquid crystal display device according to claim 2, wherein:
   the solid portion of the first electrode includes a plurality of unit solid portions, above each of which a respective first liquid crystal domain of the plurality of first liquid crystal domains is formed; and
   the second region of the portion of the liquid crystal layer above the solid portion is located above an edge portion of at least one unit solid portion of the plurality of unit solid portions.

4. The liquid crystal display device according to claim 3, wherein a height of a surface of a portion of the at least one unit solid portion corresponding to the second region is higher than a height of a surface of a portion of the at least one unit solid portion corresponding to the first region.

5. The liquid crystal display device according to claim 4, wherein:
   the interlayer insulating film includes a flat region where the height of the surface thereof closer to the liquid crystal layer is substantially constant; and
   the portion of the at least one unit solid portion corresponding to the first region is located on the flat region.

6. The liquid crystal display device according to claim 4, wherein the interlayer insulating film is formed of a photosensitive transparent resin.

7. The liquid crystal display device according to claim 3, wherein light incident on the liquid crystal layer is circularly-polarized light, and display is provided by modulating the circularly-polarized light by the liquid crystal layer.

8. The liquid crystal display device according to claim 3, wherein an orientation in the plurality of first liquid crystal domains and an orientation in a portion of the liquid crystal layer above the non-solid portion are continuous with each other.

9. The liquid crystal display device according to claim 3, wherein the plurality of unit solid portions each have a shape having rotational symmetry.

10. The liquid crystal display device according to claim 9, wherein the plurality of unit solid portions are each generally circular.

11. The liquid crystal display device according to claim 9, wherein the plurality of unit solid portions are each generally rectangular.

12. The liquid crystal display device according to claim 9, wherein the plurality of unit solid portions are each generally rectangular with rounded corners.

13. The liquid crystal display device according to claim 9, wherein the plurality of unit solid portions each have a shape with acute angle corner portions.

14. The liquid crystal display device according to claim 2, wherein when a voltage is applied between the first electrode and the second electrode, the liquid crystal layer forms at least one second liquid crystal domain taking a radially-inclined orientation above the non-solid portion by the inclined electric field.

15. The liquid crystal display device according to claim 14, wherein an orientation in the plurality of first liquid crystal domains and an orientation in the at least one second liquid crystal domain are continuous with each other.

16. The liquid crystal display device according to claim 2, wherein the non-solid portion of the first electrode has at least one opening.

17. The liquid crystal display device according to claim 16, wherein the at least one opening includes a plurality of openings, and at least a part of the plurality of openings have substantially the same shape and substantially the same size and form at least one unit lattice which is arranged so as to have rotational symmetry.

18. The liquid crystal display device according to claim 17, wherein the at least a part of the plurality of openings each have a shape having rotational symmetry.

19. The liquid crystal display device according to claim 2, wherein the non-solid portion of the first electrode has at least one cut-out portion.

20. The liquid crystal display device according to claim 19, wherein the at least one cut-out portion includes a plurality of cut-out portions, and the plurality of cut-out portions are regularly arranged.

21. The liquid crystal display device according to claim 2, wherein in each of the plurality of picture element regions, an area of the non-solid portion of the first electrode is smaller than an area of the solid portion of the first electrode.

22. The liquid crystal display device according to claim 2, wherein the second substrate has an orientation-regulating structure in a region corresponding to at least one first liquid crystal domain of the plurality of first liquid crystal domains, the orientation-regulating structure exerting an orientation-regulating force for placing the liquid crystal molecules in the at least one first liquid crystal domain into a radially-inclined orientation at least in the presence of an applied voltage.

23. The liquid crystal display device according to claim 22, wherein the orientation-regulating structure is provided in a region corresponding to a central portion of the at least one first liquid crystal domain.

24. The liquid crystal display device according to claim 22, wherein the orientation-regulating structure exerts an orientation-regulating force for placing the liquid crystal molecules into a radially-inclined orientation also in the absence of an applied voltage.

25. The liquid crystal display device according to claim 24, wherein the orientation-regulating structure is a protrusion protruding from the second substrate through the liquid crystal layer.

26. The liquid crystal display device according to claim 25, wherein a thickness of the liquid crystal layer is defined by the protrusion protruding from the second substrate through the liquid crystal layer.

27. The liquid crystal display device according to claim 1, wherein the non-solid portion of the first electrode is a slit provided in the first electrode.

28. The liquid crystal display device according to claim 27, wherein a height of a surface of a portion of the solid portion of the first electrode corresponding to the second region is higher than a height of a surface of a portion of the solid portion corresponding to the first region.

29. The liquid crystal display device according to claim 28, wherein:
    the interlayer insulating film includes a flat region where the height of the surface thereof closer to the liquid crystal layer is substantially constant; and
    the portion of the solid portion of the first electrode corresponding to the first region is located on the flat region.

30. The liquid crystal display device according to claim 28, wherein the interlayer insulating film is formed of a photosensitive transparent resin.

31. The liquid crystal display device according to claim 28, wherein:
    the first substrate includes a transparent substrate and a color filter layer provided between the transparent substrate and the first electrode;
    the color filter layer includes an inclining region where a height of one surface thereof closer to the liquid crystal layer continuously changes; and
    the portion of the solid portion of the first electrode corresponding to the second region is located on the inclining region.

32. The liquid crystal display device according to claim 31, wherein:
    the color filter layer includes a flat region where the height of the surface thereof closer to the liquid crystal layer is substantially constant; and
    the portion of the solid portion of the first electrode corresponding to the first region is located on the flat region.

33. The liquid crystal display device according to claim 27, wherein light incident on the liquid crystal layer is circularly-polarized light, and display is provided by modulating the circularly-polarized light by the liquid crystal layer.

34. The liquid crystal display device according to claim 27, further comprising a pair of polarization plates opposing each other with the liquid crystal layer therebetween, the pair of polarization plates have transmission axes generally perpendicular to each other, one of the transmission axes is located horizontal to a display plane, and the slit is extended in a direction which is inclined with respect to the one of the transmission axes.

35. The liquid crystal display device according to claim 34, wherein the slit is extended in a direction which makes an angle of about 45° with the one of the transmission axes.

36. The liquid crystal display device according to claim 27, wherein the second substrate has an orientation-regulating structure exerting an orientation-regulating force which is aligned with the orientation-regulating force provided by the inclined electric field at least in the presence of an applied voltage.

37. The liquid crystal display device according to claim 36, wherein the orientation-regulating structure of the second substrate is a rib.

38. The liquid crystal display device according to claim 36, wherein the orientation-regulating structure of the second substrate is a slit provided in the second electrode.

39. The liquid crystal display device according to claim 27, wherein:
the first substrate further includes a switching element provided in correspondence with each of the plurality of picture element regions; and
the first electrode is a picture element electrode provided in correspondence with each of the plurality of picture element regions and electrically connected to the switching element, and the second electrode is at least one counter electrode opposing the plurality of picture element electrodes.

40. The liquid crystal display device according to claim 39, wherein a portion of the liquid crystal layer above the solid portion of the picture element electrode does not have the second region in the vicinity of an outer periphery of the picture element electrode.

41. A liquid crystal display device, comprising:
a first substrate;
a second substrate; and
a vertical alignment type liquid crystal layer provided between the first substrate and the second substrate, wherein:
a plurality of picture element regions are each defined by a first electrode provided on one surface of the first substrate which is closer to the liquid crystal layer and a second electrode provided on the second substrate and opposing the first electrode with the liquid crystal layer therebetween;
in each of the plurality of picture element regions, the first electrode includes a solid portion formed of a conductive film and a non-solid portion with no conductive film provided, and when a voltage is applied between the first electrode and the second electrode, the liquid crystal layer forms a plurality of first liquid crystal domains each taking a radially-inclined orientation above the solid portion by an inclined electric field produced above the non-solid portion of the first electrode;
the solid portion of the first electrode includes a plurality of unit solid portions, above each of which a respective first liquid crystal domain of the plurality of first liquid crystal domains is formed;
a portion of the liquid crystal layer above at least one unit solid portion of the plurality of unit solid portions includes a first region having a first thickness $d_1$ and a second region having a second thickness $d_2$ which is smaller than the first thickness $d_1$, the second region being located above an edge portion of the unit solid portion; and
wherein the first substrate includes a transparent substrate and an interlayer insulating layer provided between at least the transparent substrate and at least a majority of each of the solid portions of the first electrode, and wherein the interlayer insulating layer includes an inclining region where a height of one surface thereof closer to the liquid crystal layer changes substantially continuously, and wherein an edge portion of the solid portion of the first electrode in the second region is located on the inclining region.

42. A liquid crystal display device, comprising:
a first substrate;
a second substrate; and
a vertical alignment type liquid crystal layer provided between the first substrate and the second substrate, wherein:
a plurality of picture element regions are each defined by a first electrode provided on one surface of the first substrate which is closer to the liquid crystal layer and a second electrode provided on the second substrate and opposing the first electrode with the liquid crystal layer therebetween;
in each of the plurality of picture element regions, the first electrode includes a solid portion formed of a conductive film and a slit, and the liquid crystal layer has an orientation which is regulated by an inclined electric field produced above the slit of the first electrode when a voltage is applied between the first electrode and the second electrode;
a portion of the liquid crystal layer above the solid portion of the first electrode includes a first region having a first thickness $d_1$ and a second region having a second thickness $d_2$ which is smaller than the first thickness $d_1$, the second region being located in the vicinity of the slit; and
wherein the first substrate includes a transparent substrate and an interlayer insulating layer provided between at least the transparent substrate and at least a majority of each of the solid portions of the first electrode, and wherein the interlayer insulating layer includes an inclining region where a height of one surface thereof closer to the liquid crystal layer changes substantially continuously, and wherein an edge portion of the solid portion of the first electrode in the second region is located on the inclining region.

43. A liquid crystal display device, comprising:
a first substrate;
a second substrate; and
a vertical alignment type liquid crystal layer provided between the first substrate and the second substrate, wherein:
a plurality of picture element regions are each defined by a first electrode provided on one surface of the first substrate which is closer to the liquid crystal layer and a second electrode provided on the second substrate and opposing the first electrode with the liquid crystal layer therebetween;
in each of the plurality of picture element regions, the first electrode includes a solid portion formed of a conductive film and a slit, and the liquid crystal layer has an orientation which is regulated by an inclined electric field produced above the slit of the first electrode when a voltage is applied between the first electrode and the second electrode;
the first substrate further includes a switching element provided in correspondence with each of the plurality of picture element regions;
the first electrode is a picture element electrode provided in correspondence with each of the plurality of picture element regions and electrically connected to the switching element, and the second electrode is at least one counter electrode opposing the plurality of picture element electrodes; and a portion of the liquid crystal layer above the solid portion of the picture element electrode includes a first region having a first thickness $d_1$ and a second region having a second thickness $d_2$ which is larger than the first thickness $d_1$, the second region being located in the vicinity of an outer periphery of the picture element electrode.

44. The liquid crystal display device according to claim 43, wherein a height of a surface of a portion of the solid portion corresponding to the second region is lower than a height of a surface of a portion of the solid portion corresponding to the first region.

45. The liquid crystal display device according to claim 44, wherein:

the first substrate includes a transparent substrate and an interlayer insulating film provided between the transparent substrate and the first electrode;

the interlayer insulating layer includes an inclining region where a height of one surface thereof closer to the liquid crystal layer continuously changes; and the portion of the solid portion corresponding to the second region is located on the inclining region.

46. The liquid crystal display device according to claim 45, wherein:

the interlayer insulating film includes a flat region where the height of the surface thereof closer to the liquid crystal layer is substantially constant; and the portion of the solid portion corresponding to the first region is located on the flat region.

47. The liquid crystal display device according to claim 45, wherein the interlayer insulating film is formed of a photosensitive transparent resin.

48. The liquid crystal display device according to claim 43, further comprising a pair of polarization plates opposing each other with the liquid crystal layer therebetween, the pair of polarization plates have transmission axes generally perpendicular to each other, one of the transmission axes is located horizontal to a display plane, and the slit is extended in a direction which is inclined with respect to the one of the transmission axes.

49. The liquid crystal display device according to claim 48, wherein the slit is extended in a direction which makes an angle of about 45° with the one of the transmission axes.

* * * * *